(12) United States Patent
Aufranc et al.

(10) Patent No.: US 7,657,118 B2
(45) Date of Patent: Feb. 2, 2010

(54) GENERATING AND DISPLAYING SPATIALLY OFFSET SUB-FRAMES USING IMAGE DATA CONVERTED FROM A DIFFERENT COLOR SPACE

(75) Inventors: Richard E. Aufranc, Albany, OR (US); David C. Collins, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 726 days.

(21) Appl. No.: 10/864,125

(22) Filed: Jun. 9, 2004

(65) Prior Publication Data

US 2005/0275642 A1 Dec. 15, 2005

(51) Int. Cl.
*G06K 9/36* (2006.01)
(52) U.S. Cl. .................. 382/276; 348/571; 345/204
(58) Field of Classification Search .............. None
See application file for complete search history.

(56) References Cited

U.S. PATENT DOCUMENTS

| | | | |
|---|---|---|---|
| 4,373,784 A | 2/1983 | Nonomura et al. | |
| 4,662,746 A | 5/1987 | Hornbeck | |
| 4,811,003 A | 3/1989 | Strathman et al. | |
| 4,956,619 A | 9/1990 | Hornbeck | |
| 5,061,049 A | 10/1991 | Hornbeck | |
| 5,083,857 A | 1/1992 | Hornbeck | |
| 5,146,356 A | 9/1992 | Carlson | |
| 5,317,409 A | 5/1994 | Macocs | |
| 5,386,253 A | 1/1995 | Fielding | |
| 5,490,009 A * | 2/1996 | Venkateswar et al. | ....... 359/291 |
| 5,530,482 A | 6/1996 | Gove et al. | |
| 5,557,353 A | 9/1996 | Stahl | |
| 5,689,283 A | 11/1997 | Shirochi | |
| 5,729,245 A | 3/1998 | Gove et al. | |
| 5,742,274 A | 4/1998 | Henry et al. | |
| 5,757,355 A | 5/1998 | Ogura et al. | |
| 5,912,773 A | 6/1999 | Barnett et al. | |
| 5,920,365 A | 7/1999 | Eriksson | |
| 5,953,148 A | 9/1999 | Moseley et al. | |
| 5,978,518 A | 11/1999 | Oliyide et al. | |
| 6,025,951 A | 2/2000 | Swart et al. | |

(Continued)

FOREIGN PATENT DOCUMENTS

EP 0 712 243 A2 5/1996

(Continued)

OTHER PUBLICATIONS

Michal Irani et al. "Improving Resolution by Image Registration," Graphical Models and Image Processing, vol. 53, No. 3, May 1991.*

(Continued)

*Primary Examiner*—Bhavesh M Mehta
*Assistant Examiner*—Sean Motsinger

(57) ABSTRACT

A method of displaying an image with a display device is provided. The method comprises receiving first image data for the image where the first image data is associated with a first color space, converting the first image data to second image data associated with a second color space, generating first and second sub-frames using the second image data, and alternating between displaying the first sub-frame in a first position and displaying the second sub-frame in a second position spatially offset from the first position.

24 Claims, 29 Drawing Sheets

U.S. PATENT DOCUMENTS

| | | | |
|---|---|---|---|
| 6,067,143 A | 5/2000 | Tomita | |
| 6,104,375 A | 8/2000 | Lam | |
| 6,118,584 A | 9/2000 | Van Berkel et al. | |
| 6,141,039 A | 10/2000 | Poetsch | |
| 6,184,969 B1 | 2/2001 | Fergason | |
| 6,219,017 B1* | 4/2001 | Shimada et al. | 345/88 |
| 6,239,783 B1 | 5/2001 | Hill et al. | |
| 6,243,055 B1 | 6/2001 | Fergason | |
| 6,313,888 B1 | 11/2001 | Tabata | |
| 6,340,994 B1* | 1/2002 | Margulis et al. | 348/625 |
| 6,384,816 B1 | 5/2002 | Tabata | |
| 6,393,145 B2 | 5/2002 | Betrisey et al. | |
| 6,456,340 B1* | 9/2002 | Margulis | 348/745 |
| 6,522,356 B1 | 2/2003 | Watanabe | |
| 6,657,603 B1 | 12/2003 | Demetrescu et al. | |
| 6,825,835 B2 | 11/2004 | Sano et al. | |
| 6,927,890 B2* | 8/2005 | Allen | 359/237 |
| 6,963,319 B2* | 11/2005 | Pate et al. | 345/30 |
| 7,003,177 B1* | 2/2006 | Mendlovic et al. | 382/299 |
| 7,030,894 B2* | 4/2006 | Allen et al. | 345/698 |
| 7,034,811 B2* | 4/2006 | Allen | 345/204 |
| 7,052,142 B2* | 5/2006 | Gupta | 353/46 |
| 7,106,914 B2* | 9/2006 | Tipping et al. | 382/299 |
| 7,109,981 B2* | 9/2006 | Damera-Venkata et al. | 345/204 |
| 7,154,508 B2* | 12/2006 | Childers | 345/589 |
| 7,190,380 B2* | 3/2007 | Damera-Venkata et al. | 345/698 |
| 7,218,751 B2* | 5/2007 | Reed et al. | 382/100 |
| 7,218,796 B2* | 5/2007 | Bishop et al. | 382/299 |
| 7,224,411 B2* | 5/2007 | Gibbon et al. | 348/757 |
| 7,239,428 B2* | 7/2007 | Solecki | 358/3.01 |
| 2002/0075202 A1 | 6/2002 | Fergason | |
| 2003/0011614 A1 | 1/2003 | Itoh et al. | |
| 2003/0020809 A1 | 1/2003 | Gibbon et al. | |
| 2003/0076325 A1 | 4/2003 | Thrasher | |
| 2003/0090597 A1 | 5/2003 | Katoh et al. | |
| 2003/0133060 A1 | 7/2003 | Shimada | |
| 2004/0027363 A1* | 2/2004 | Allen | 345/698 |
| 2005/0025388 A1* | 2/2005 | Damera-Venkata et al. | 382/300 |
| 2005/0068335 A1* | 3/2005 | Tretter et al. | 345/619 |
| 2005/0093894 A1* | 5/2005 | Tretter et al. | 345/694 |
| 2005/0093895 A1* | 5/2005 | Damera-Venkata | 345/698 |
| 2005/0147321 A1* | 7/2005 | Damera-Venkata et al. | 382/275 |
| 2005/0168493 A1* | 8/2005 | Damera-Venkata | 345/690 |
| 2005/0168494 A1* | 8/2005 | Damera-Venkata | 345/690 |
| 2005/0225568 A1* | 10/2005 | Collins | 345/635 |
| 2005/0225570 A1* | 10/2005 | Collins | 345/660 |
| 2005/0225571 A1* | 10/2005 | Collins et al. | 345/660 |
| 2005/0225732 A1* | 10/2005 | Conner et al. | 353/31 |
| 2005/0275642 A1* | 12/2005 | Aufranc et al. | 345/204 |
| 2005/0275669 A1* | 12/2005 | Collins et al. | 345/698 |
| 2005/0276517 A1* | 12/2005 | Collins et al. | 382/300 |
| 2006/0044294 A1* | 3/2006 | Damera-Venkata | 345/204 |
| 2006/0061604 A1* | 3/2006 | Ulichney et al. | 345/694 |
| 2006/0082561 A1* | 4/2006 | Allen et al. | 345/204 |
| 2006/0109286 A1* | 5/2006 | Damera-Venkata et al. | 345/690 |
| 2006/0110072 A1* | 5/2006 | Domera-Venkata | 382/299 |

FOREIGN PATENT DOCUMENTS

| | | |
|---|---|---|
| EP | 1001306 A2 | 5/2000 |
| EP | 1 388 838 A2 | 2/2004 |
| WO | WO 03/034380 A2 | 4/2003 |

OTHER PUBLICATIONS

JP Patent 7-284002.

Christopher Jaynes et al; "Super-Resolution Composition in Multi-Projector Displays".

Dean S. Messing et al; "Subpixel Rendering on Non-Striped Colour Matrix Displays", 2003 IEEE.

L.M. Chen and S. Hasagawa, "Visual Resolution Limits for Color Matrix Displays", "One Panel Projectors" Displays, Technologies, and Applications, vol. 13, pp. 221-226, 1992.

A. Yasuda et al., "FLC Wobbling for High-Resolution Projectors", Journal of the SID 5/3 1997, pp. 299-305.

T. Tokita et al., "P-108: FLC Resolution-Enhancing Device for Projection Display", SID 02 Digest 2002, pp. 638-641.

D.H. Kelly, "Motion and Vision—II. Stabilized Spatio-Temporal Threshold Surface," Journal of the Optical Society of America, vol. 69, No. 10, Oct. 1979.

Candice H. Brown Elliot et al., "Color Subpixel Rendering Projectors and Flat Panel Displays"; SMPTE Advanced Motion Imaging Conference; Feb. 27-Mar. 1, 2003; pp. 1-4.

Diana C. Chen, "Display Resolution Enhancement with Optical Scanners" Applied Optics, vol. 40, No. 5, Feb. 10, 2001, pp. 636-643.

* cited by examiner

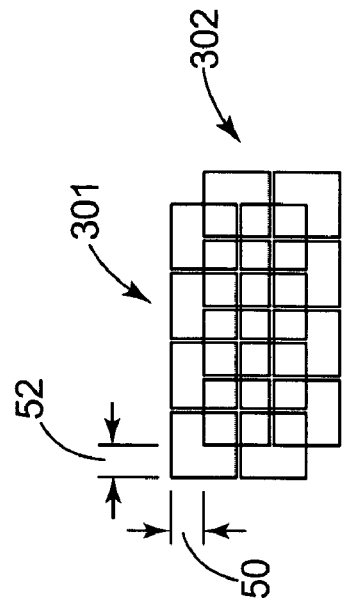
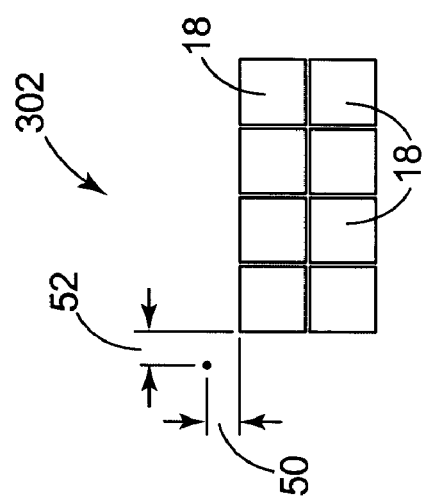
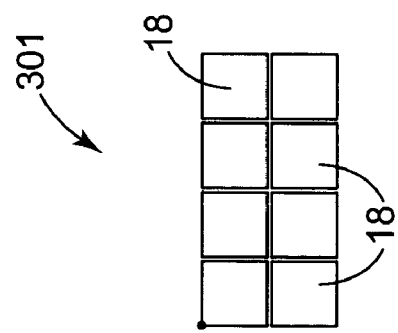

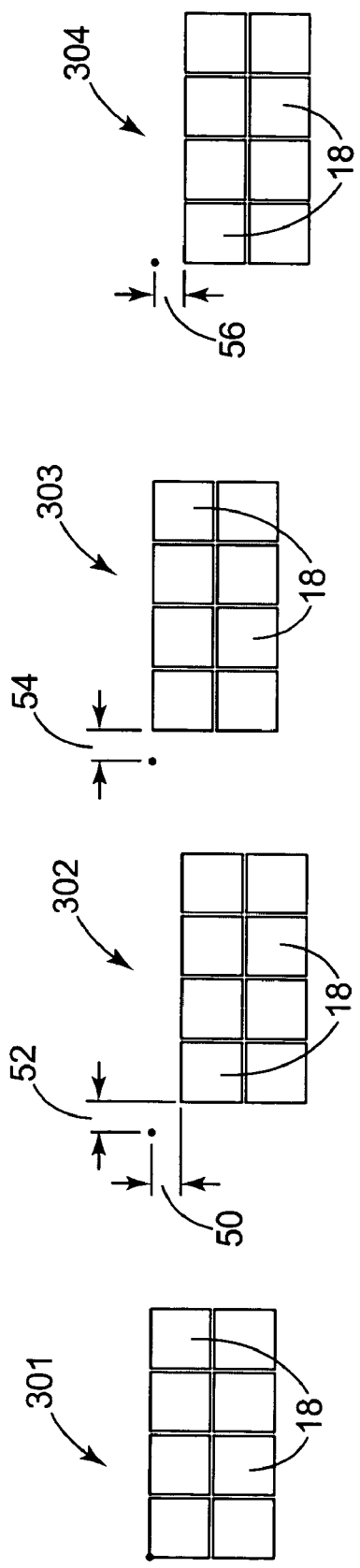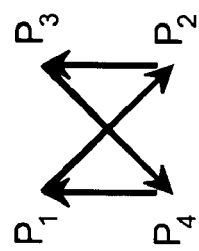

(NEAREST NEIGHBOR)

(BILINEAR)

GENERATING AND DISPLAYING SPATIALLY OFFSET SUB-FRAMES USING IMAGE DATA CONVERTED FROM A DIFFERENT COLOR SPACE

CROSS-REFERENCE TO RELATED APPLICATIONS

This application is related to U.S. patent application Ser. No. 10/213,555, filed on Aug. 7, 2002, entitled IMAGE DISPLAY SYSTEM AND METHOD, now U.S. Pat. No. 7,030,894; U.S. patent application Ser. No. 10/242,195, filed on Sep. 11, 2002, entitled IMAGE DISPLAY SYSTEM AND METHOD, now U.S. Pat. No. 7,034,811; U.S. patent application Ser. No. 10/242,545, filed on Sep. 11, 2002, entitled IMAGE DISPLAY SYSTEM AND METHOD, now U.S. Pat. No. 6,963,319; U.S. patent application Ser. No. 10/631,681, filed Jul. 31, 2003, entitled GENERATING AND DISPLAYING SPATIALLY OFFSET SUB-FRAMES, now U.S. Pat. No. 7,109,981; U.S. patent application Ser. No. 10/632,042, filed Jul. 31, 2003, entitled GENERATING AND DISPLAYING SPATIALLY OFFSET SUB-FRAMES; U.S. patent application Ser. No. 10/672,845, filed Sep. 26, 2003, entitled GENERATING AND DISPLAYING SPATIALLY OFFSET SUB-FRAMES, now U.S. Pat. No. 7,190,380; U.S. patent application Ser. No. 10/672,544, filed Sep. 26, 2003, entitled GENERATING AND DISPLAYING SPATIALLY OFFSET SUB-FRAMES, now U.S. Pat. No. 7,253,811; U.S. patent application Ser. No. 10/697,605, filed Oct. 30, 2003, entitled GENERATING AND DISPLAYING SPATIALLY OFFSET SUB-FRAMES ON A DIAMOND GRID; U.S. patent application Ser. No. 10/696,888, filed Oct. 30, 2003, entitled GENERATING AND DISPLAYING SPATIALLY OFFSET SUB-FRAMES ON DIFFERENT TYPES OF GRIDS; U.S. patent application Ser. No. 10/697,830, filed Oct. 30, 2003, entitled IMAGE DISPLAY SYSTEM AND METHOD, now U.S. Pat. No. 6,927,890; U.S. patent application Ser. No. 10/750,591, filed Dec. 31, 2003, entitled DISPLAYING SPATIALLY OFFSET SUB-FRAMES WITH A DISPLAY DEVICE HAVING A SET OF DEFECTIVE DISPLAY PIXELS; U.S. patent application Ser. No. 10/768,621, filed Jan. 30, 2004, entitled GENERATING AND DISPLAYING SPATIALLY OFFSET SUB-FRAMES; U.S. patent application Ser. No. 10/768,215, filed Jan. 30, 2004, entitled DISPLAYING SUB-FRAMES AT SPATIALLY OFFSET POSITIONS ON A CIRCLE; U.S. patent application Ser. No. 10/821,135, filed Apr. 8, 2004, entitled GENERATING AND DISPLAYING SPATIALLY OFFSET SUB-FRAMES; U.S. patent application Ser. No. 10/821,130, filed Apr. 8, 2004, entitled GENERATING AND DISPLAYING SPATIALLY OFFSET SUB-FRAMES; and U.S. patent application Ser. No. 10/820,952, filed Apr. 8, 2004, entitled GENERATING AND DISPLAYING SPATIALLY OFFSET SUB-FRAMES. Each of the above U.S. patent applications is assigned to the assignee of the present invention, and is hereby incorporated by reference herein.

BACKGROUND

A conventional system or device for displaying an image, such as a display, projector, or other imaging system, produces a displayed image by addressing an array of individual picture elements or pixels arranged in horizontal rows and vertical columns. A resolution of the displayed image is defined as the number of horizontal rows and vertical columns of individual pixels forming the displayed image. The resolution of the displayed image is affected by a resolution of the display device itself as well as a resolution of the image data processed by the display device and used to produce the displayed image.

Typically, to increase a resolution of the displayed image, the resolution of the display device as well as the resolution of the image data used to produce the displayed image must be increased. Increasing a resolution of the display device, however, increases a cost and complexity of the display device. In addition, higher resolution image data may not be available and/or may be difficult to generate.

It would be desirable to be able to enhance the display of various types of graphical images including natural images and high contrast images such as business graphics. It would be desirable to reduce the amount of image processing associated with generating and displaying graphical images.

SUMMARY

One form of the present invention provides a method of displaying an image with a display device. The method comprises receiving first image data for the image where the first image data is associated with a first color space, converting the first image data to second image data associated with a second color space, generating first and second sub-frames using the second image data, and alternating between displaying the first sub-frame in a first position and displaying the second sub-frame in a second position spatially offset from the first position.

BRIEF DESCRIPTION OF THE DRAWINGS

FIGS. 2A-2C are schematic diagrams illustrating the display of two sub-frames according to one embodiment of the present invention.

FIGS. 3A-3E are schematic diagrams illustrating the display of four sub-frames according to one embodiment of the present invention.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Spatial and Temporal Shifting of Sub-frames

Some display systems, such as some digital light projectors, may not have sufficient resolution to display some high resolution images. Such systems can be configured to give the appearance to the human eye of higher resolution images by displaying spatially and temporally shifted lower resolution images. The lower resolution images are referred to as sub-frames. A problem of sub-frame generation, which is addressed by embodiments of the present invention, is to determine appropriate values for the sub-frames so that the displayed sub-frames are close in appearance to how the high-resolution image from which the sub-frames were derived would appear if directly displayed.

One embodiment of a display system that provides the appearance of enhanced resolution through temporal and spatial shifting of sub-frames is described in the above-cited U.S. patent applications, and is summarized below with reference to FIGS. 1-4E.

Figure 1:
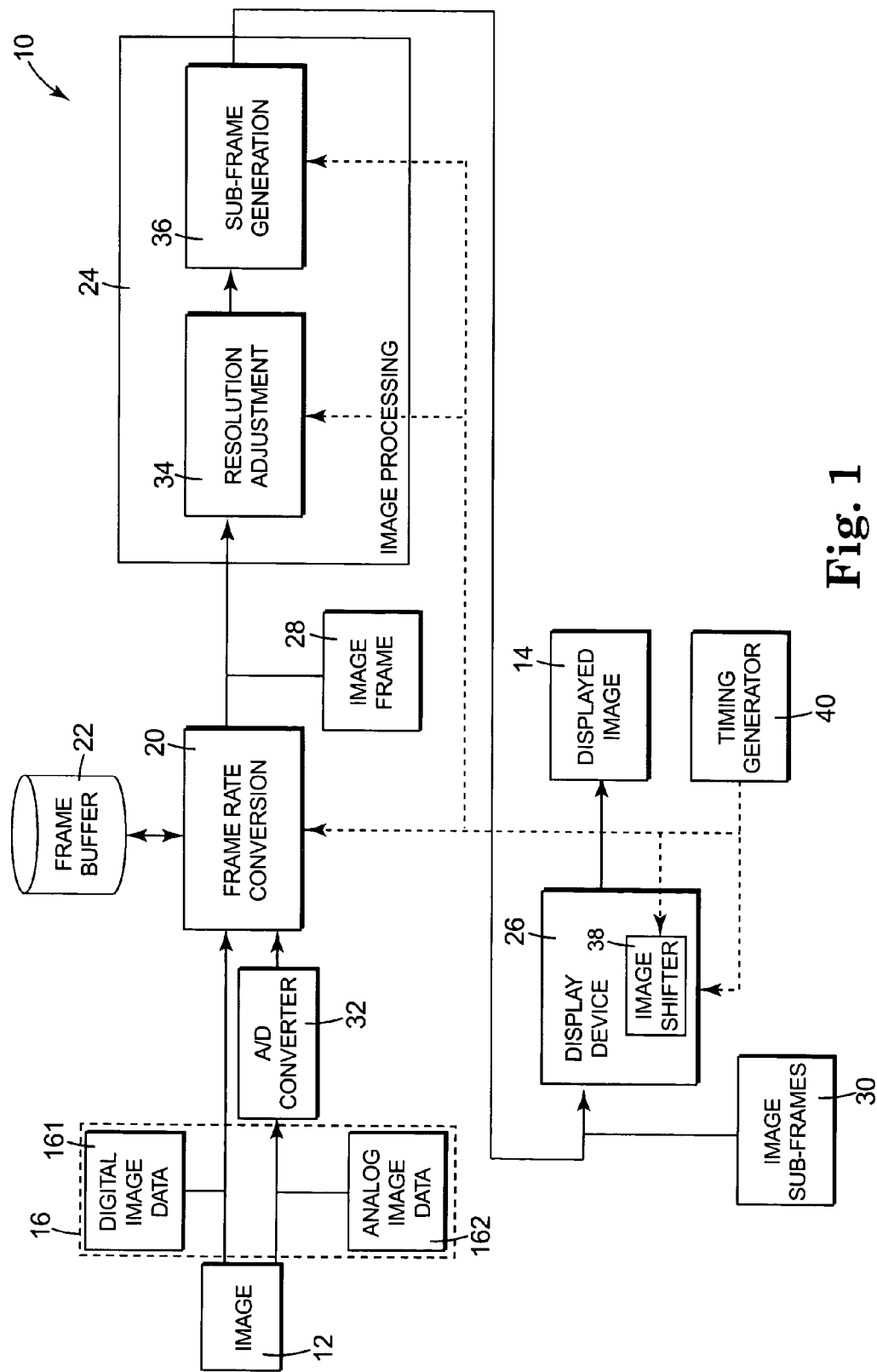
FIG. 1 is a block diagram illustrating an image display system according to one embodiment of the present invention.

FIG. 1 is a block diagram illustrating an image display system 10 according to one embodiment of the present invention. Image display system 10 facilitates processing of an image 12 to create a displayed image 14. Image 12 is defined to include any pictorial, graphical, and/or textural characters, symbols, illustrations, and/or other representation of information. Image 12 is represented, for example, by image data 16. Image data 16 includes individual picture elements or pixels of image 12. While one image is illustrated and described as being processed by image display system 10, it is understood that a plurality or series of images may be processed and displayed by image display system 10.

In one embodiment, image display system 10 includes a frame rate conversion unit 20 and an image frame buffer 22, an image processing unit 24, and a display device 26. As described below, frame rate conversion unit 20 and image frame buffer 22 receive and buffer image data 16 for image 12 to create an image frame 28 for image 12. Image processing unit 24 processes image frame 28 to define one or more image sub-frames 30 for image frame 28, and display device 26 temporally and spatially displays image sub-frames 30 to produce displayed image 14.

Image display system 10, including frame rate conversion unit 20 and/or image processing unit 24, includes hardware, software, firmware, or a combination of these. In one embodiment, one or more components of image display system 10, including frame rate conversion unit 20 and/or image processing unit 24, are included in a computer, computer server, or other microprocessor-based system capable of performing a sequence of logic operations. In addition, processing can be distributed throughout the system with individual portions being implemented in separate system components.

Image data 16 may include digital image data 161 or analog image data 162. To process analog image data 162, image display system 10 includes an analog-to-digital (A/D) converter 32. As such, A/D converter 32 converts analog image data 162 to digital form for subsequent processing. Thus, image display system 10 may receive and process digital image data 161 and/or analog image data 162 for image 12.

Frame rate conversion unit 20 receives image data 16 for image 12 and buffers or stores image data 16 in image frame buffer 22. More specifically, frame rate conversion unit 20 receives image data 16 representing individual lines or fields of image 12 and buffers image data 16 in image frame buffer 22 to create image frame 28 for image 12. Image frame buffer 22 buffers image data 16 by receiving and storing all of the image data for image frame 28, and frame rate conversion unit 20 creates image frame 28 by subsequently retrieving or extracting all of the image data for image frame 28 from image frame buffer 22. As such, image frame 28 is defined to include a plurality of individual lines or fields of image data 16 representing an entirety of image 12. Thus, image frame 28 includes a plurality of columns and a plurality of rows of individual pixels representing image 12.

Frame rate conversion unit 20 and image frame buffer 22 can receive and process image data 16 as progressive image data and/or interlaced image data. With progressive image data, frame rate conversion unit 20 and image frame buffer 22 receive and store sequential fields of image data 16 for image 12. Thus, frame rate conversion unit 20 creates image frame 28 by retrieving the sequential fields of image data 16 for image 12. With interlaced image data, frame rate conversion unit 20 and image frame buffer 22 receive and store odd fields and even fields of image data 16 for image 12. For example, all of the odd fields of image data 16 are received and stored and all of the even fields of image data 16 are received and stored. As such, frame rate conversion unit 20 de-interlaces image data 16 and creates image frame 28 by retrieving the odd and even fields of image data 16 for image 12.

Image frame buffer 22 includes memory for storing image data 16 for one or more image frames 28 of respective images 12. Thus, image frame buffer 22 constitutes a database of one or more image frames 28. Examples of image frame buffer 22 include non-volatile memory (e.g., a hard disk drive or other persistent storage device) and may include volatile memory (e.g., random access memory (RAM)).

By receiving image data 16 at frame rate conversion unit 20 and buffering image data 16 with image frame buffer 22, input timing of image data 16 can be decoupled from a timing requirement of display device 26. More specifically, since image data 16 for image frame 28 is received and stored by image frame buffer 22, image data 16 can be received as input at any rate. As such, the frame rate of image frame 28 can be converted to the timing requirement of display device 26. Thus, image data 16 for image frame 28 can be extracted from image frame buffer 22 at a frame rate of display device 26.

In one embodiment, image processing unit 24 includes a resolution adjustment unit 34 and a sub-frame generation unit 36. As described below, resolution adjustment unit 34 receives image data 16 for image frame 28 and adjusts a resolution of image data 16 for display on display device 26, and sub-frame generation unit 36 generates a plurality of image sub-frames 30 for image frame 28. More specifically, image processing unit 24 receives image data 16 for image frame 28 at an original resolution and processes image data 16 to increase, decrease, and/or leave unaltered the resolution of image data 16. Accordingly, with image processing unit 24, image display system 10 can receive and display image data 16 of varying resolutions.

Sub-frame generation unit 36 receives and processes image data 16 for image frame 28 to define a plurality of image sub-frames 30 for image frame 28. If resolution adjustment unit 34 has adjusted the resolution of image data 16, sub-frame generation unit 36 receives image data 16 at the adjusted resolution. The adjusted resolution of image data 16 may be increased, decreased, or the same as the original resolution of image data 16 for image frame 28. Sub-frame generation unit 36 generates image sub-frames 30 with a resolution which matches the resolution of display device 26. Image sub-frames 30 are each of an area equal to image frame 28. Sub-frames 30 each include a plurality of columns and a plurality of rows of individual pixels representing a subset of image data 16 of image 12, and have a resolution that matches the resolution of display device 26.

Each image sub-frame 30 includes a matrix or array of pixels for image frame 28. Image sub-frames 30 are spatially offset from each other such that each image sub-frame 30 includes different pixels and/or portions of pixels. As such, image sub-frames 30 are offset from each other by a vertical distance and/or a horizontal distance, as described below.

Display device 26 receives image sub-frames 30 from image processing unit 24 and sequentially displays image sub-frames 30 to create displayed image 14. More specifically, as image sub-frames 30 are spatially offset from each other, display device 26 displays image sub-frames 30 in different positions according to the spatial offset of image sub-frames 30, as described below. As such, display device 26 alternates between displaying image sub-frames 30 for image frame 28 to create displayed image 14. Accordingly, display device 26 displays an entire sub-frame 30 for image frame 28 at one time.

In one embodiment, display device 26 performs one cycle of displaying image sub-frames 30 for each image frame 28. Display device 26 displays image sub-frames 30 so as to be spatially and temporally offset from each other. In one embodiment, display device 26 optically steers image sub-frames 30 to create displayed image 14. As such, individual pixels of display device 26 are addressed to multiple locations.

In one embodiment, display device 26 includes an image shifter 38. Image shifter 38 spatially alters or offsets the position of image sub-frames 30 as displayed by display device 26. More specifically, image shifter 38 varies the position of display of image sub-frames 30, as described below, to produce displayed image 14.

In one embodiment, display device 26 includes a light modulator for modulation of incident light. The light modulator includes, for example, a plurality of micro-mirror devices arranged to form an array of micro-mirror devices. As such, each micro-mirror device constitutes one cell or pixel of display device 26. Display device 26 may form part of a display, projector, or other imaging system.

In one embodiment, image display system 10 includes a timing generator 40. Timing generator 40 communicates, for example, with frame rate conversion unit 20, image processing unit 24, including resolution adjustment unit 34 and sub-frame generation unit 36, and display device 26, including image shifter 38. As such, timing generator 40 synchronizes buffering and conversion of image data 16 to create image frame 28, processing of image frame 28 to adjust the resolution of image data 16 and generate image sub-frames 30, and positioning and displaying of image sub-frames 30 to produce displayed image 14. Accordingly, timing generator 40 controls timing of image display system 10 such that entire sub-frames of image 12 are temporally and spatially displayed by display device 26 as displayed image 14.

In one embodiment, as illustrated in FIGS. 2A and 2B, image processing unit 24 defines two image sub-frames 30 for image frame 28. More specifically, image processing unit 24 defines a first sub-frame 301 and a second sub-frame 302 for image frame 28. As such, first sub-frame 301 and second sub-frame 302 each include a plurality of columns and a plurality of rows of individual pixels 18 of image data 16. Thus, first sub-frame 301 and second sub-frame 302 each constitute an image data array or pixel matrix of a subset of image data 16.

In one embodiment, as illustrated in FIG. 2B, second sub-frame 302 is offset from first sub-frame 301 by a vertical distance 50 and a horizontal distance 52. As such, second sub-frame 302 is spatially offset from first sub-frame 301 by a predetermined distance. In one illustrative embodiment, vertical distance 50 and horizontal distance 52 are each approximately one-half of one pixel.

As illustrated in FIG. 2C, display device 26 alternates between displaying first sub-frame 301 in a first position and displaying second sub-frame 302 in a second position spatially offset from the first position. More specifically, display device 26 shifts display of second sub-frame 302 relative to display of first sub-frame 301 by vertical distance 50 and horizontal distance 52. As such, pixels of first sub-frame 301 overlap pixels of second sub-frame 302. In one embodiment, display device 26 performs one cycle of displaying first sub-frame 301 in the first position and displaying second sub-frame 302 in the second position for image frame 28. Thus, second sub-frame 302 is spatially and temporally displayed relative to first sub-frame 301. The display of two temporally and spatially shifted sub-frames in this manner is referred to herein as two-position processing.

In another embodiment, as illustrated in FIGS. 3A-3D, image processing unit 24 defines four image sub-frames 30 for image frame 28. More specifically, image processing unit 24 defines a first sub-frame 301, a second sub-frame 302, a third sub-frame 303, and a fourth sub-frame 304 for image frame 28. As such, first sub-frame 301, second sub-frame 302, third sub-frame 303, and fourth sub-frame 304 each include a plurality of columns and a plurality of rows of individual pixels 18 of image data 16.

In one embodiment, as illustrated in FIGS. 3B-3D, second sub-frame 302 is offset from first sub-frame 301 by a vertical distance 50 and a horizontal distance 52, third sub-frame 303 is offset from first sub-frame 301 by a horizontal distance 54, and fourth sub-frame 304 is offset from first sub-frame 301 by a vertical distance 56. As such, second sub-frame 302, third sub-frame 303, and fourth sub-frame 304 are each spatially offset from each other and spatially offset from first sub-frame 301 by a predetermined distance. In one illustrative embodiment, vertical distance 50, horizontal distance 52, horizontal distance 54, and vertical distance 56 are each approximately one-half of one pixel.

As illustrated schematically in FIG. 3E, display device 26 alternates between displaying first sub-frame 301 in a first position $P_1$, displaying second sub-frame 302 in a second position $P_2$ spatially offset from the first position, displaying third sub-frame 303 in a third position $P_3$ spatially offset from the first position, and displaying fourth sub-frame 304 in a fourth position $P_4$ spatially offset from the first position. More specifically, display device 26 shifts display of second sub-frame 302, third sub-frame 303, and fourth sub-frame 304 relative to first sub-frame 301 by the respective predetermined distance. As such, pixels of first sub-frame 301, second sub-frame 302, third sub-frame 303, and fourth sub-frame 304 overlap each other.

In one embodiment, display device 26 performs one cycle of displaying first sub-frame 301 in the first position, displaying second sub-frame 302 in the second position, displaying third sub-frame 303 in the third position, and displaying fourth sub-frame 304 in the fourth position for image frame 28. Thus, second sub-frame 302, third sub-frame 303, and fourth sub-frame 304 are spatially and temporally displayed relative to each other and relative to first sub-frame 301. The display of four temporally and spatially shifted sub-frames in this manner is referred to herein as four-position processing.

Figure 4E:
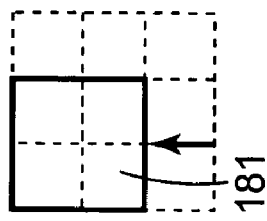
FIGS. 4A-4E are schematic diagrams illustrating the display of a pixel with an image display system according to one embodiment of the present invention.
Figure 4D:
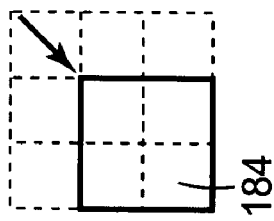
Figure 4C:
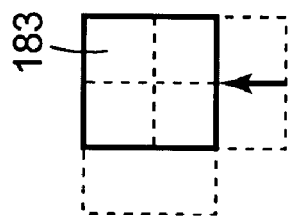
Figure 4B:
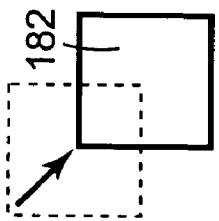
Figure 4A:
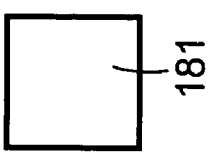

FIGS. 4A-4E illustrate one embodiment of completing one cycle of displaying a pixel 181 from first sub-frame 301 in the first position, displaying a pixel 182 from second sub-frame 302 in the second position, displaying a pixel 183 from third sub-frame 303 in the third position, and displaying a pixel 184 from fourth sub-frame 304 in the fourth position. More specifically, FIG. 4A illustrates display of pixel 181 from first sub-frame 301 in the first position, FIG. 4B illustrates display of pixel 182 from second sub-frame 302 in the second position (with the first position being illustrated by dashed lines), FIG. 4C illustrates display of pixel 183 from third sub-frame 303 in the third position (with the first position and the second position being illustrated by dashed lines), FIG. 4D illustrates display of pixel 184 from fourth sub-frame 304 in the fourth position (with the first position, the second position, and the third position being illustrated by dashed lines), and FIG. 4E illustrates display of pixel 181 from first sub-frame 301 in the first position (with the second position, the third position, and the fourth position being illustrated by dashed lines).

Sub-frame generation unit 36 (FIG. 1) generates sub-frames 30 based on image data in image frame 28. It will be understood by a person of ordinary skill in the art that functions performed by sub-frame generation unit 36 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

In one form of the invention, sub-frames 30 have a lower resolution than image frame 28. Thus, sub-frames 30 are also referred to herein as low resolution images 30, and image frame 28 is also referred to herein as a high resolution image 28. It will be understood by persons of ordinary skill in the art that the terms low resolution and high resolution are used herein in a comparative fashion, and are not limited to any particular minimum or maximum number of pixels. In one embodiment, sub-frame generation unit 36 is configured to generate sub-frames 30 based on one or more of ten algorithms. These ten algorithms are referred to herein as the following: (1) nearest neighbor; (2) bilinear; (3) spatial domain; (4) frequency domain; (5) adaptive multi-pass; (6) center adaptive multi-pass; (7) simplified center adaptive multi-pass; (8) adaptive multi-pass with history; (9) simplified center adaptive multi-pass with history; and (10) center adaptive multi-pass with history.

The nearest neighbor algorithm and the bilinear algorithm according to one form of the invention generate sub-frames 30 by combining pixels from a high resolution image 28. The spatial domain algorithm and the frequency domain algorithm according to one form of the invention generate sub-frames 30 based on the minimization of a global error metric that represents a difference between a simulated high resolution image and a desired high resolution image 28. The adaptive multi-pass algorithm, center adaptive multi-pass algorithm, simplified center adaptive multi-pass algorithm, adaptive multi-pass algorithm with history, simplified center adaptive multi-pass algorithm with history, and center adaptive multi-pass algorithm with history according to various forms of the invention generate sub-frames 30 based on the minimization of a local error metric. In one embodiment, sub-frame generation unit 36 includes memory for storing a relationship between sub-frame values and high resolution image values, wherein the relationship is based on minimization of an error metric between the high resolution image values and a simulated high resolution image that is a function of the sub-frame values. Embodiments of each of these ten algorithms are described below with reference to FIGS. 5-32.

II. Nearest Neighbor

Figure 5:
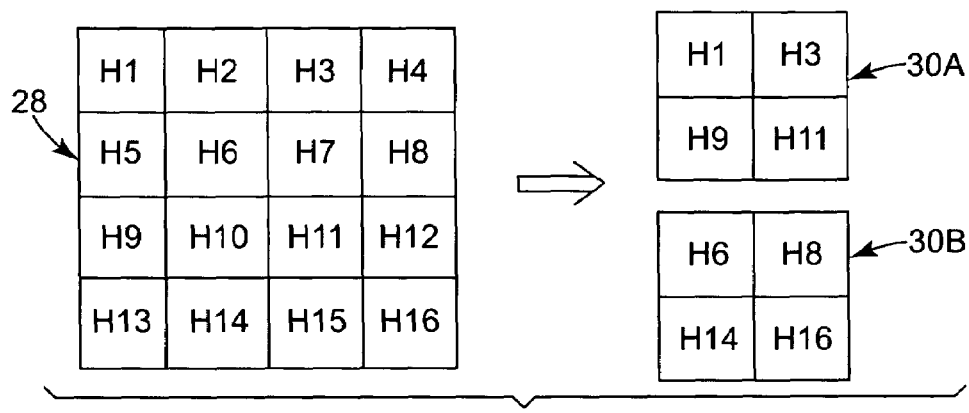
FIG. 5 is a diagram illustrating the generation of low resolution sub-frames from an original high resolution image using a nearest neighbor algorithm according to one embodiment of the present invention.

FIG. 5 is a diagram illustrating the generation of low resolution sub-frames 30A and 30B (collectively referred to as sub-frames 30) from an original high resolution image 28 using a nearest neighbor algorithm according to one embodiment of the present invention. In the illustrated embodiment, high resolution image 28 includes four columns and four rows of pixels, for a total of sixteen pixels H1-H16. In one embodiment of the nearest neighbor algorithm, a first sub-frame 30A is generated by taking every other pixel in a first row of the high resolution image 28, skipping the second row of the high resolution image 28, taking every other pixel in the third row of the high resolution image 28, and repeating this process throughout the high resolution image 28. Thus, as shown in FIG. 5, the first row of sub-frame 30A includes pixels H1 and H3, and the second row of sub-frame 30A includes pixels H9 and H11. In one form of the invention, a second sub-frame 30B is generated in the same manner as the first sub-frame 30A, but the process begins at a pixel H6 that is shifted down one row and over one column from the first pixel H1. Thus, as shown in FIG. 5, the first row of sub-frame 30B includes pixels H6 and H8, and the second row of sub-frame 30B includes pixels H14 and H16.

In one embodiment, the nearest neighbor algorithm is implemented with a 2×2 filter with three filter coefficients of "0" and a fourth filter coefficient of "1" to generate a weighted sum of the pixel values from the high resolution image. Displaying sub-frames 30A and 30B using two-position processing as described above gives the appearance of a higher resolution image. The nearest neighbor algorithm is also applicable to four-position processing, and is not limited to images having the number of pixels shown in FIG. 5.

III. Bilinear

Figure 6:
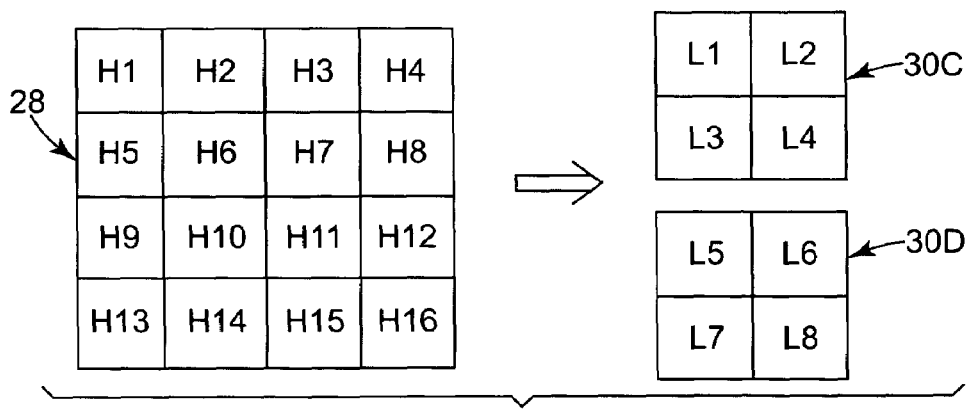
FIG. 6 is a diagram illustrating the generation of low resolution sub-frames from an original high resolution image using a bilinear algorithm according to one embodiment of the present invention.

FIG. 6 is a diagram illustrating the generation of low resolution sub-frames 30C and 30D (collectively referred to as sub-frames 30) from an original high resolution image 28 using a bilinear algorithm according to one embodiment of the present invention. In the illustrated embodiment, high resolution image 28 includes four columns and four rows of pixels, for a total of sixteen pixels H1-H16. Sub-frame 30C includes two columns and two rows of pixels, for a total of four pixels L1-L4. And sub-frame 30D includes two columns and two rows of pixels, for a total of four pixels L5-L8.

In one embodiment, the values for pixels L1-L8 in sub-frames 30C and 30D are generated from the pixel values H1-H16 of image 28 based on the following Equations I-VIII:

$$L1=(4H1+2H2+2H5)/8 \qquad \text{Equation I}$$

$$L2=(4H3+2H4+2H7)/8 \qquad \text{Equation II}$$

$$L3=(4H9+2H10+2H13)/8 \qquad \text{Equation III}$$

$$L4=(4H11+2H12+2H15)/8 \qquad \text{Equation IV}$$

$$L5=(4H6+2H2+2H5)/8 \qquad \text{Equation V}$$

$$L6=(4H8+2H4+2H7)/8 \qquad \text{Equation VI}$$

$$L7=(4H14+2H10+2H13)/8 \qquad \text{Equation VII}$$

$$L8=(4H16+2H12+2H15)/8 \qquad \text{Equation VIII}$$

As can be seen from the above Equations I-VIII, the values of the pixels L1-L4 in sub-frame 30C are influenced the most by the values of pixels H1, H3, H9, and H11, respectively, due to the multiplication by four. But the values for the pixels L1-L4 in sub-frame 30C are also influenced by the values of diagonal neighbors of pixels H1, H3, H9, and H11. Similarly, the values of the pixels L5-L8 in sub-frame 30D are influenced the most by the values of pixels H6, H8, H14, and H16, respectively, due to the multiplication by four. But the values for the pixels L5-L8 in sub-frame 30D are also influenced by the values of diagonal neighbors of pixels H6, H8, H14, and H16.

In one embodiment, the bilinear algorithm is implemented with a 2×2 filter with one filter coefficient of "0" and three filter coefficients having a non-zero value (e.g., 4, 2, and 2) to generate a weighted sum of the pixel values from the high resolution image. In another embodiment, other values are used for the filter coefficients. Displaying sub-frames 30C and 30D using two-position processing as described above gives the appearance of a higher resolution image. The bilinear algorithm is also applicable to four-position processing, and is not limited to images having the number of pixels shown in FIG. 6.

In one form of the nearest neighbor and bilinear algorithms, sub-frames 30 are generated based on a linear combination of pixel values from an original high resolution image as described above. In another embodiment, sub-frames 30 are generated based on a non-linear combination of pixel values from an original high resolution image. For example, if the original high resolution image is gamma-corrected, appropriate non-linear combinations are used in one embodiment to undo the effect of the gamma curve.

IV. Systems for Generating Simulated High Resolution Images

FIGS. 7-10, 20, and 22 illustrate systems for generating simulated high resolution images. Based on these systems, spatial domain, frequency domain, adaptive multi-pass, center adaptive multi-pass, and simplified center adaptive multi-pass algorithms for generating sub-frames are developed, as described in further detail below.

Figure 7:
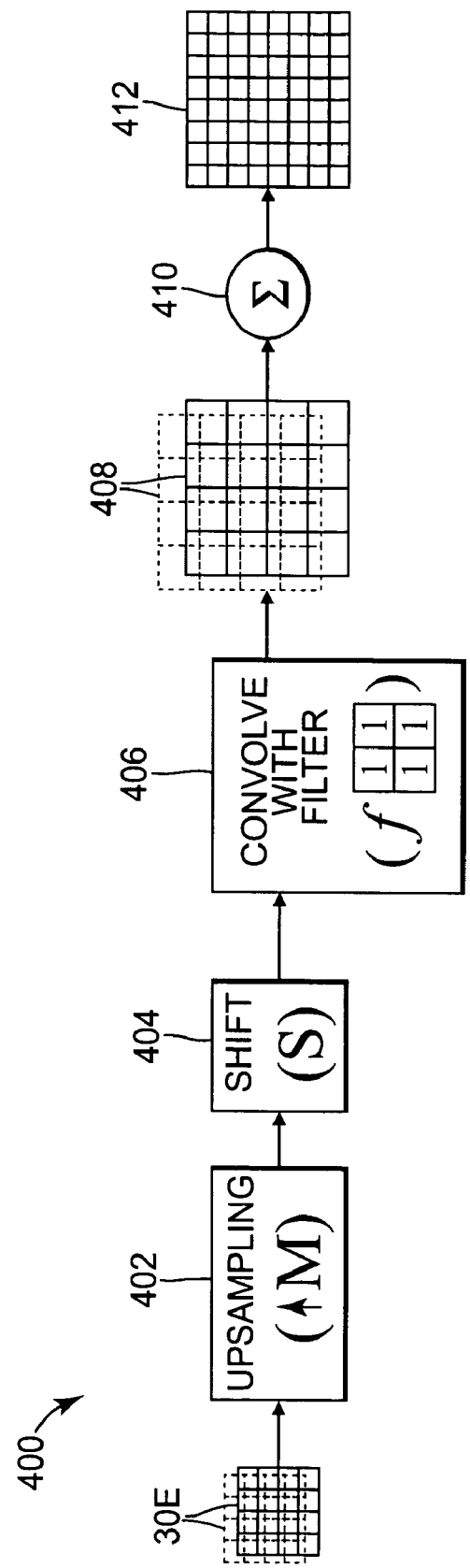
FIG. 7 is a block diagram illustrating a system for generating a simulated high resolution image according to one embodiment of the present invention.

FIG. 7 is a block diagram illustrating a system 400 for generating a simulated high resolution image 412 from two 4×4 pixel low resolution sub-frames 30E according to one embodiment of the present invention. System 400 includes upsampling stage 402, shifting stage 404, convolution stage 406, and summation stage 410. Sub-frames 30E are upsampled by upsampling stage 402 based on a sampling matrix, M, thereby generating upsampled images. The upsampled images are shifted by shifting stage 404 based on a spatial shifting matrix, S, thereby generating shifted upsampled images. The shifted upsampled images are convolved with an interpolating filter at convolution stage 406, thereby generating blocked images 408. In the illustrated embodiment, the interpolating filter is a 2×2 filter with filter coefficients of "1", and with the center of the convolution being the upper left position in the 2×2 matrix. The interpolating filter simulates the superposition of low resolution sub-frames on a high resolution grid. The low resolution sub-frame pixel data is expanded so that the sub-frames can be represented on a high resolution grid. The interpolating filter fills in the missing pixel data produced by upsampling. The blocked images 408 are weighted and summed by summation block 410 to generate the 8×8 pixel simulated high resolution image 412.

Figure 8:
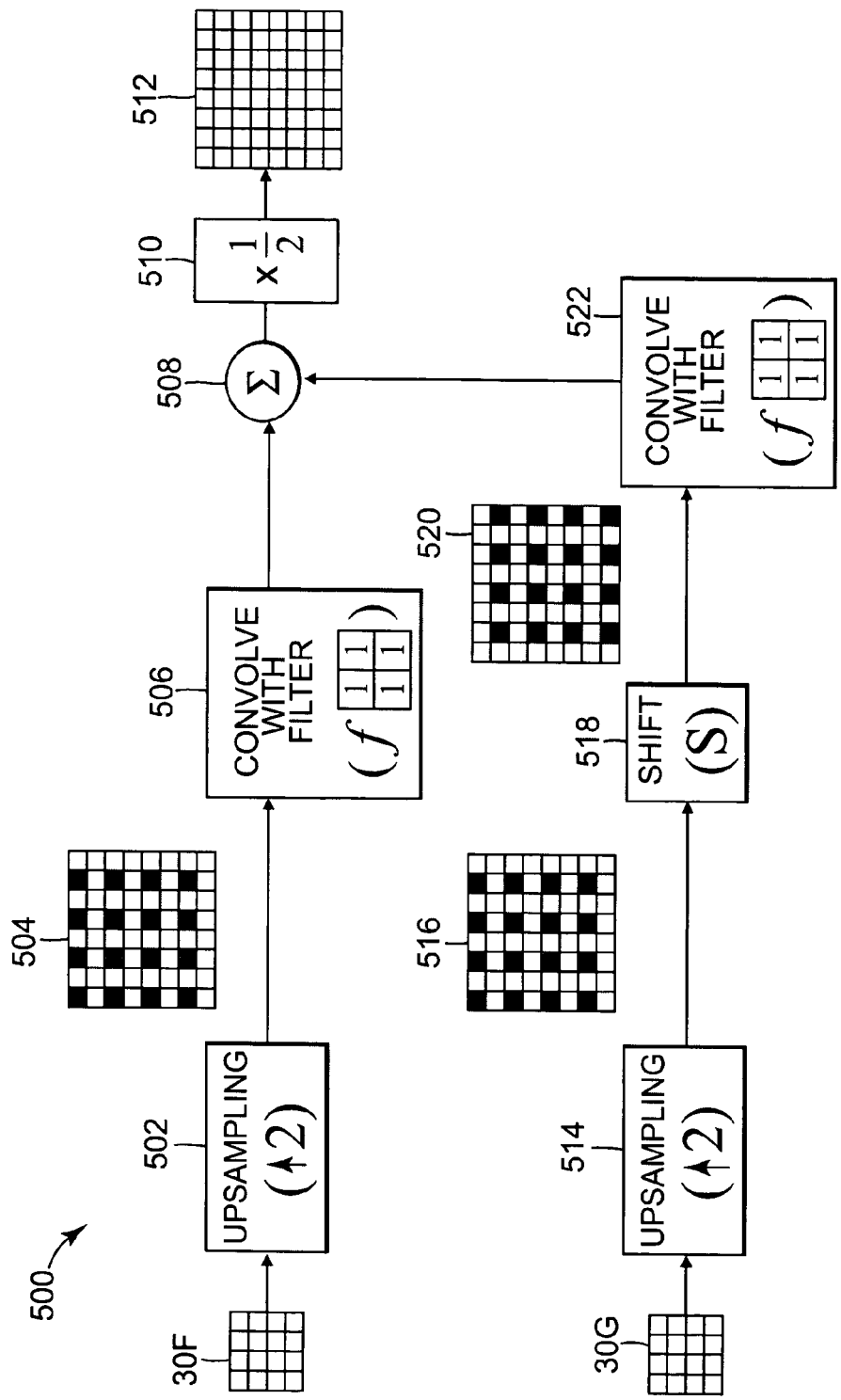
FIG. 8 is a block diagram illustrating a system for generating a simulated high resolution image for two-position processing based on separable upsampling according to one embodiment of the present invention.

FIG. 8 is a block diagram illustrating a system 500 for generating a simulated high resolution image 512 for two-position processing based on separable upsampling of two 4×4 pixel low resolution sub-frames 30F and 30G according to one embodiment of the present invention. System 500 includes upsampling stages 502 and 514, shifting stage 518, convolution stages 506 and 522, summation stage 508, and multiplication stage 510. Sub-frame 30F is upsampled by a factor of two by upsampling stage 502, thereby generating an 8×8 pixel upsampled image 504. The dark pixels in upsampled image 504 represent the sixteen pixels from sub-frame 30F, and the light pixels in upsampled image 504 represent zero values. Sub-frame 30G is upsampled by a factor of two by upsampling stage 514, thereby generating an 8×8 pixel upsampled image 516. The dark pixels in upsampled image 516 represent the sixteen pixels from sub-frame 30G, and the light pixels in upsampled image 516 represent zero values. In one embodiment, upsampling stages 502 and 514 upsample sub-frames 30F and 30G, respectively, using a diagonal sampling matrix.

The upsampled image 516 is shifted by shifting stage 518 based on a spatial shifting matrix, S, thereby generating shifted upsampled image 520. In the illustrated embodiment, shifting stage 518 performs a one pixel diagonal shift. Images 504 and 520 are convolved with an interpolating filter at convolution stages 506 and 522, respectively, thereby generating blocked images. In the illustrated embodiment, the interpolating filter at convolution stages 506 and 522 is a 2×2 filter with filter coefficients of "1", and with the center of the convolution being the upper left position in the 2×2 matrix. The blocked images generated at convolution stages 506 and 522 are summed by summation block 508, and multiplied by a factor of 0.5 at multiplication stage 510, to generate the 8×8 pixel simulated high resolution image 512. The image data is multiplied by a factor of 0.5 at multiplication stage 510 because, in one embodiment, each of the sub-frames 30F and 30G is displayed for only half of the time slot per period allotted to a color. In another embodiment, rather than multiplying by a factor of 0.5 at multiplication stage 510, the filter coefficients of the interpolating filter at stages 506 and 522 are reduced by a factor of 0.5.

In one embodiment, as shown in FIG. 8 and described above, the low resolution sub-frame data is represented by two separate sub-frames 30F and 30G, which are separately upsampled based on a diagonal sampling matrix (i.e., separable upsampling). In another embodiment, as described below with reference to FIG. 9, the low resolution sub-frame data is represented by a single sub-frame, which is upsampled based on a non-diagonal sampling matrix (i.e., non-separable upsampling).

Figure 9:
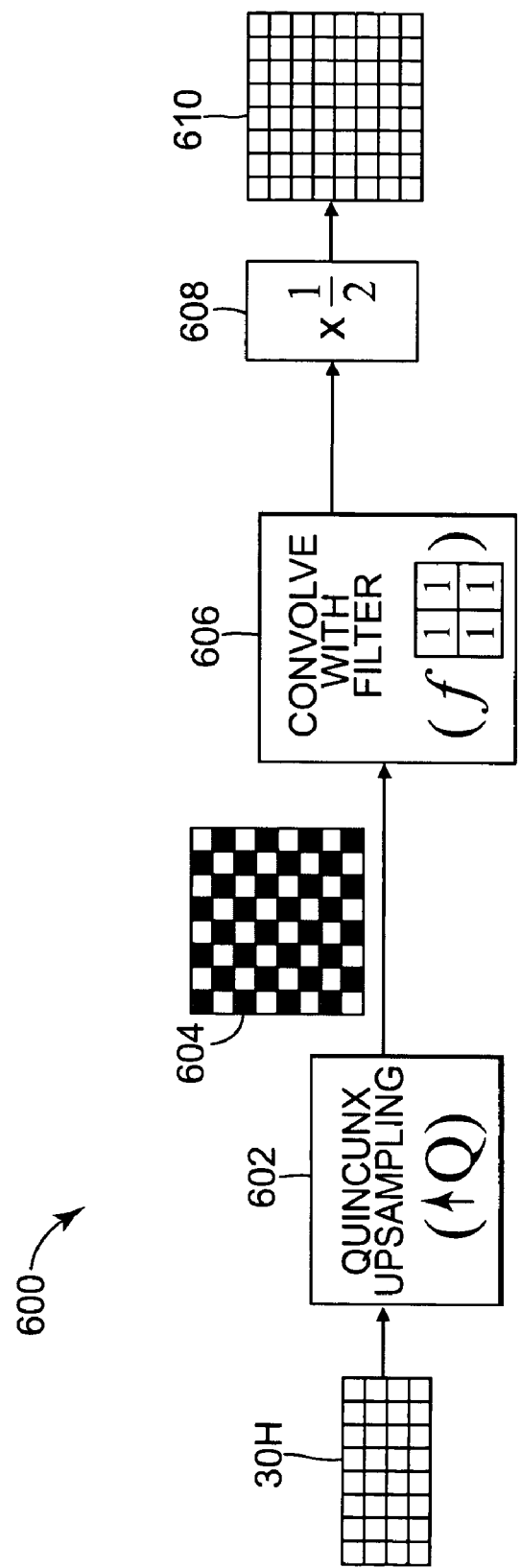
FIG. 9 is a block diagram illustrating a system for generating a simulated high resolution image for two-position processing based on non-separable upsampling according to one embodiment of the present invention.

FIG. 9 is a block diagram illustrating a system 600 for generating a simulated high resolution image 610 for two-position processing based on non-separable upsampling of an 8×4 pixel low resolution sub-frame 30H according to one embodiment of the present invention. System 600 includes quincunx upsampling stage 602, convolution stage 606, and multiplication stage 608. Sub-frame 30H is upsampled by quincunx upsampling stage 602 based on a quincunx sampling matrix, Q, thereby generating upsampled image 604. The dark pixels in upsampled image 604 represent the thirty-two pixels from sub-frame 30H, and the light pixels in upsampled image 604 represent zero values. Sub-frame 30H includes pixel data for two 4×4 pixel sub-frames for two-position processing. The dark pixels in the first, third, fifth, and seventh rows of upsampled image 604 represent pixels for a first 4×4 pixel sub-frame, and the dark pixels in the second, fourth, sixth, and eighth rows of upsampled image 604 represent pixels for a second 4×4 pixel sub-frame.

The upsampled image 604 is convolved with an interpolating filter at convolution stage 606, thereby generating a blocked image. In the illustrated embodiment, the interpolating filter is a 2×2 filter with filter coefficients of "1", and with the center of the convolution being the upper left position in the 2×2 matrix. The blocked image generated by convolution stage 606 is multiplied by a factor of 0.5 at multiplication stage 608, to generate the 8×8 pixel simulated high resolution image 610.

Figure 10:
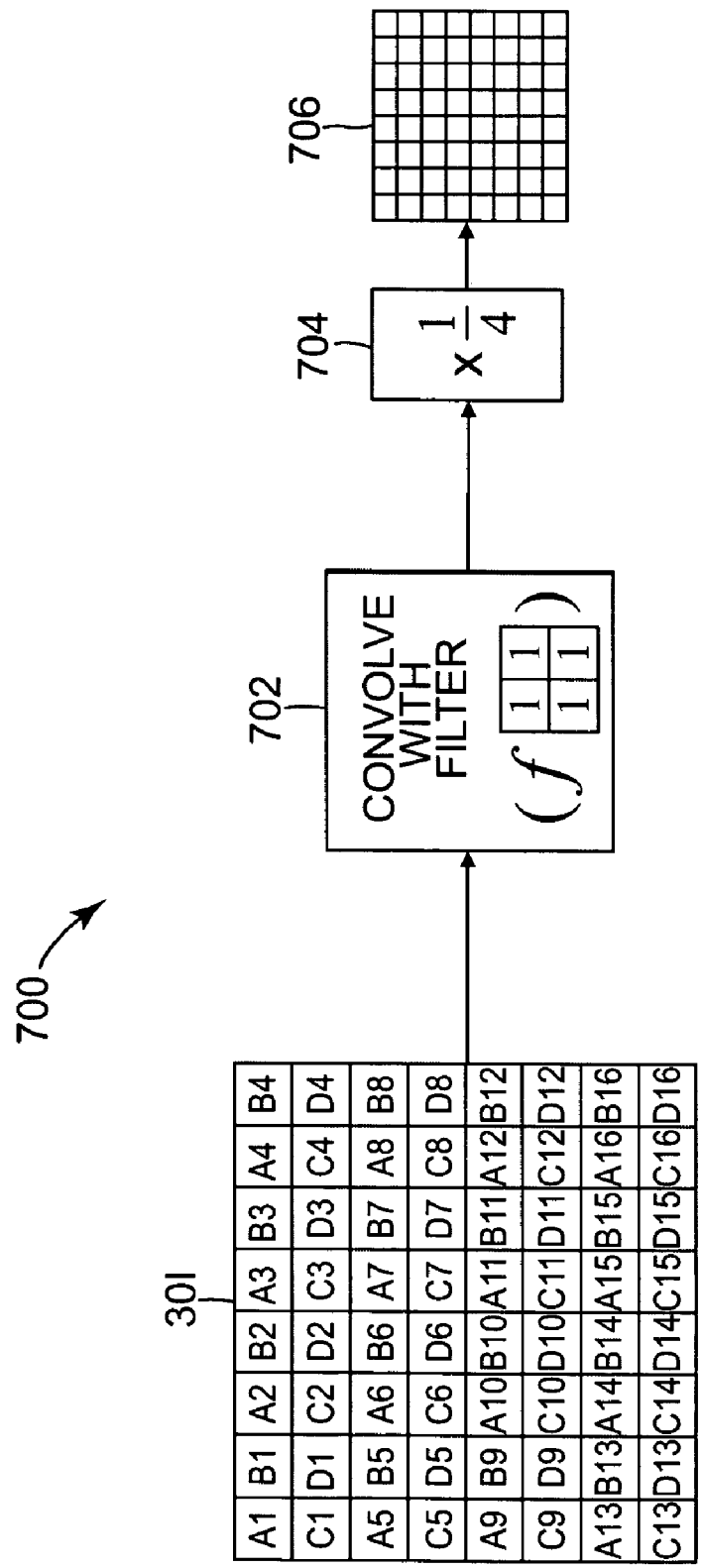
FIG. 10 is a block diagram illustrating a system for generating a simulated high resolution image for four-position processing according to one embodiment of the present invention.

FIG. 10 is a block diagram illustrating a system 700 for generating a simulated high resolution image 706 for four-position processing based on sub-frame 30I according to one embodiment of the present invention. In the embodiment illustrated in FIG. 10, sub-frame 30I is an 8×8 array of pixels. Sub-frame 30I includes pixel data for four 4×4 pixel sub-frames for four-position processing. Pixels A1-A16 represent pixels for a first 4×4 pixel sub-frame, pixels B1-B16 represent pixels for a second 4×4 pixel sub-frame, pixels C1-C16 represent pixels for a third 4×4 pixel sub-frame, and pixels D1-D16 represent pixels for a fourth 4×4 pixel sub-frame.

The sub-frame 30I is convolved with an interpolating filter at convolution stage 702, thereby generating a blocked image. In the illustrated embodiment, the interpolating filter is a 2×2 filter with filter coefficients of "1", and with the center of the convolution being the upper left position in the 2×2 matrix. The blocked image generated by convolution stage 702 is multiplied by a factor of 0.25 at multiplication stage 704, to generate the 8×8 pixel simulated high resolution image 706. The image data is multiplied by a factor of 0.25 at multiplication stage 704 because, in one embodiment, each of the four sub-frames represented by sub-frame 30I is displayed for only one fourth of the time slot per period allotted to a color. In another embodiment, rather than multiplying by a factor of 0.25 at multiplication stage 704, the filter coefficients of the interpolating filter are correspondingly reduced.

V. Generation of Sub-frames Based on Error Minimization

As described above, systems 400, 500, 600, and 700 generate simulated high resolution images 412, 512, 610, and 706, respectively, based on low resolution sub-frames. If the sub-frames are optimal, the simulated high resolution image will be as close as possible to the original high resolution image 28. Various error metrics may be used to determine how close a simulated high resolution image is to an original high resolution image, including mean square error, weighted mean square error, as well as others.

Figure 11:
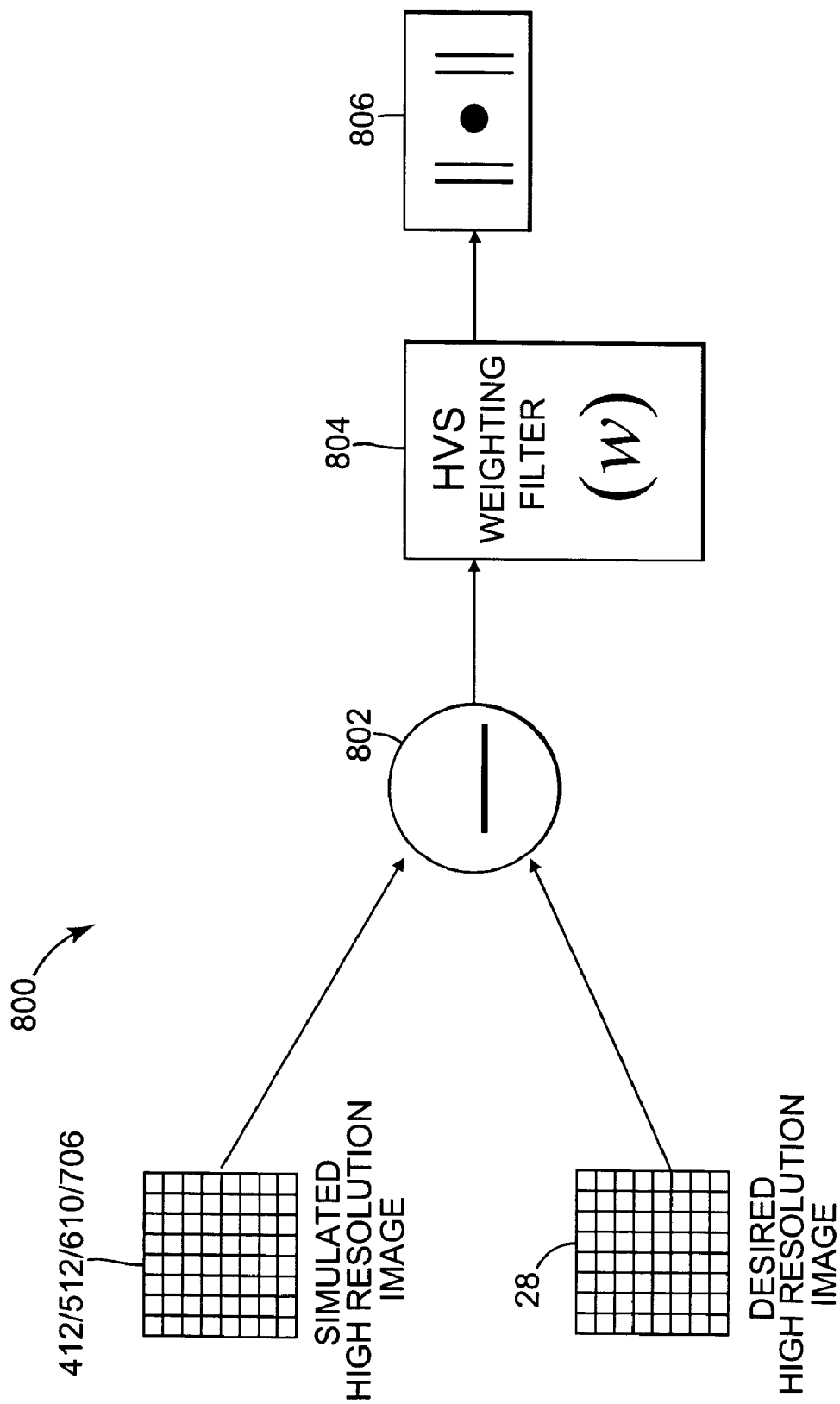
FIG. 11 is a block diagram illustrating the comparison of a simulated high resolution image and a desired high resolution image according to one embodiment of the present invention.

FIG. 11 is a block diagram illustrating the comparison of a simulated high resolution image 412/512/610/706 and a desired high resolution image 28 according to one embodiment of the present invention. A simulated high resolution image 412, 512, 610, or 706, is subtracted on a pixel-by-pixel basis from high resolution image 28 at subtraction stage 802. In one embodiment, the resulting error image data is filtered by a human visual system (HVS) weighting filter (W) 804. In one form of the invention, HVS weighting filter 804 filters the error image data based on characteristics of the human visual system. In one embodiment, HVS weighting filter 804 reduces or eliminates high frequency errors. The mean squared error of the filtered data is then determined at stage 806 to provide a measure of how close the simulated high resolution image 412, 512, 610, or 706 is to the desired high resolution image 28.

In one embodiment, systems 400, 500, 600, and 700 are represented mathematically in an error cost equation that measures the difference between a simulated high resolution image 412, 512, 610, or 706, and the original high resolution image 28. Optimal sub-frames are identified by solving the error cost equation for the sub-frame data that provides the minimum error between the simulated high resolution image and the desired high resolution image. In one embodiment, globally optimum solutions are obtained in the spatial domain and in the frequency domain, and a locally optimum solution is obtained using an adaptive multi-pass algorithm. The spatial domain, frequency domain, and adaptive multi-pass algorithms are described in further detail below with reference to FIGS. 12-18. The center adaptive multi-pass and simplified center adaptive multi-pass algorithms are described in further detail below with reference to FIGS. 19-23. The adaptive multi-pass with history, simplified center adaptive multi-pass with history, and center adaptive multi-pass with history algorithms are described in further detail below with reference to FIGS. 24-32.

VI. Spatial Domain

A spatial domain solution for generating optimal sub-frames according to one embodiment is described in the context of the system 600 shown in FIG. 9. The system 600 shown in FIG. 9 can be represented mathematically in an error cost function by the following Equation IX:

$$l^*_Q = \underset{l_Q}{\operatorname{argmin}} \quad \text{Equation IX}$$

$$J = \underset{l_Q}{\operatorname{argmin}} \sum_n \left( \sum_k l_Q(k) f(n-k) - h(n) \right)^2$$

where:
I*$_Q$=optimal low resolution data for sub-frame 30H;
J=error cost function to be minimized;
n and k=indices for identifying high resolution pixel locations for images 604 and 610;
$I_Q(k)$=image data from upsampled image 604 at location k;
$f(n-k)$=filter coefficient of the interpolating filter at a position n-k; and
$h(n)$=image data for desired high resolution image 28 at location n.

The summation of "$I_Q(k) f(n-k)$" in Equation IX represents the convolution of the upsampled image 604 and the interpolating filter, f, performed at stage 606 in system 600. The filter operation is performed by essentially sliding the lower right pixel of the 2×2 interpolating filter over each pixel of the upsampled image 604. The four pixels of the upsampled image 604 within the 2×2 interpolating filter window are multiplied by the corresponding filter coefficient (i.e., "1" in the illustrated embodiment). The results of the four multiplications are summed, and the value for the pixel of the upsampled image 604 corresponding to the lower right position of the interpolating filter is replaced by the sum of the four multiplication results. The high resolution data, h(n), from the high resolution image 28 is subtracted from the convolution value, $I_Q(k) f(n-k)$, to provide an error value. The summation of the squared error over all of the high resolution pixel locations provides a measure of the error to be minimized.

An optimal spatial domain solution can be obtained by taking the derivative of Equation 1× with respect to each of the low resolution pixels, and setting it equal to zero as shown in the following Equation X:

$$\frac{\partial J}{\partial l^*_Q(t)} = 0, t \in \Theta \quad \text{Equation X}$$

where:
Θ=the set of quincunx lattice points.

Thus, as can be seen from Equation X, the derivative is taken only at the set of quincunx lattice points, which correspond to the dark pixels in upsampled image 604 in FIG. 9. Inserting the equation for J given in Equation IX into Equation X, and taking the derivative as specified in Equation X, results in the following Equation XI:

$$\sum_k l^*_Q(k) C_{ff}(t-k) = \sum_n h(n) f(n-t), t \in \Theta \quad \text{Equation XI}$$

The symbol, $C_{ff}$, in Equation XI represents the auto-correlation coefficients of the interpolating filter, f, as defined by the following Equation XII:

$$C_{ff}(n) = \sum_k f(n) f(n+k) \quad \text{Equation XII}$$

Equation XI can be put into vector form as shown in the following Equation XIII:

$$C_{ff} I^*_Q = h_f, \; t \in \Theta \quad \text{Equation XIII}$$

where:
$C_{ff}$=matrix of auto-correlation coefficients of the interpolating filter, f.
I*$_Q$=vector representing the unknown image data for sub-frame 30H, as well as "don't care" data (i.e., the image data corresponding to the light pixels in upsampled image 604);
$h_f$=vector representing a filtered version of the simulated high resolution image 610 using the interpolating filter, f.

Deleting the rows and columns corresponding to "don't care" data (i.e., the data that is not in the set of quinincunx lattice points, Θ), results in the following Equation XIV:

$$\tilde{C}_{ff} \tilde{I}^*_Q = \tilde{h}_f \quad \text{Equation XIV}$$

where:
$\tilde{I}_Q^*$=vector representing only the unknown image data for sub-frame 30H.

The above Equation XIV is a sparse non-Toeplitz system representing a sparse system of linear equations. Since the matrix of auto-correlation coefficients is known, and the vector representing the filtered version of the simulated high resolution image 610 is known, Equation XIV can be solved to determine the optimal image data for sub-frame 30H. In one embodiment, sub-frame generation unit 36 is configured to solve Equation XIV to generate sub-frames 30.

VII. Frequency Domain

A frequency domain solution for generating optimal sub-frames 30 according to one embodiment is described in the context of the system 500 shown in FIG. 8. Before describing the frequency domain solution, a few properties of the fast fourier transform (FFT) that are applicable to the frequency domain solution are described with reference to FIGS. 12 and 13.

Figure 12:
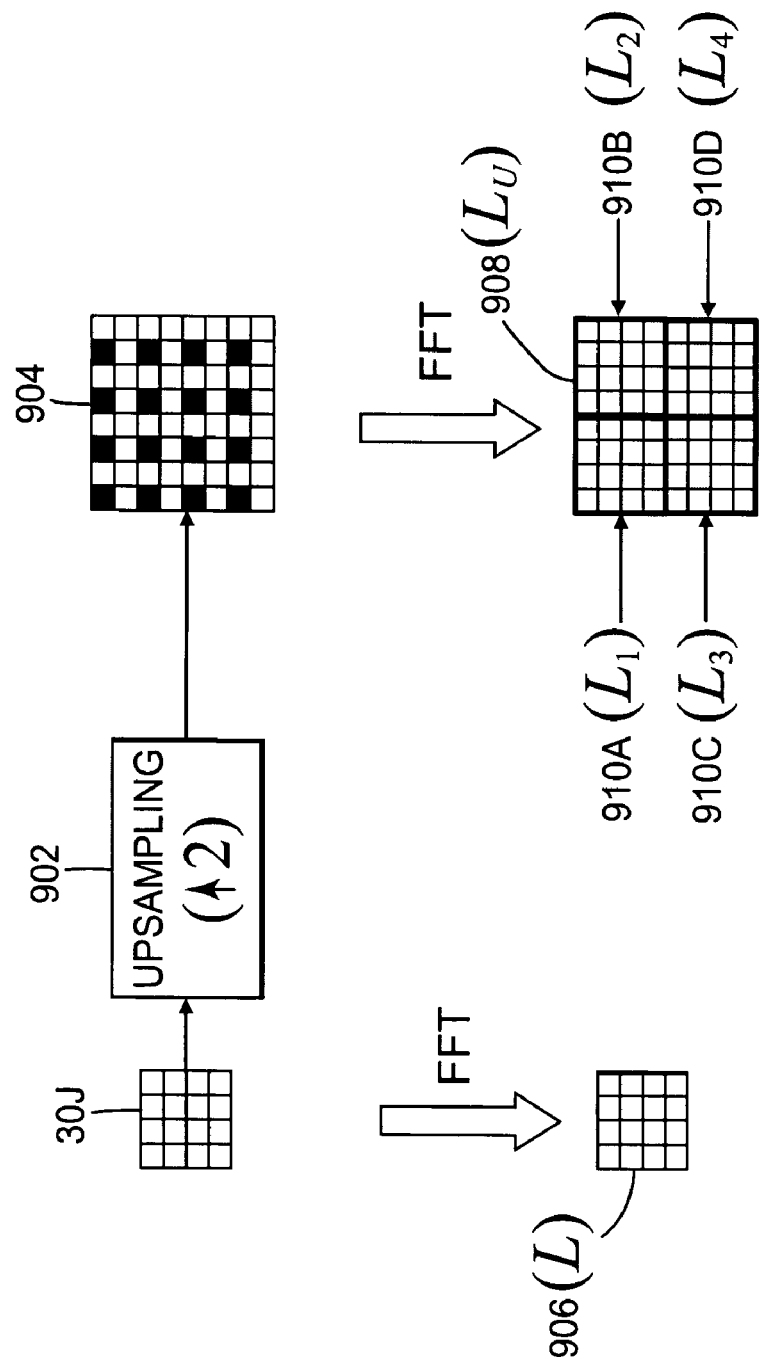
FIG. 12 is a diagram illustrating the effect in the frequency domain of the upsampling of a sub-frame according to one embodiment of the present invention.

FIG. 12 is a diagram illustrating the effect in the frequency domain of the upsampling of a 4×4 pixel sub-frame 30J according to one embodiment of the present invention. As shown in FIG. 12, sub-frame 30J is upsampled by a factor of two by upsampling stage 902 to generate an 8×8 pixel upsampled image 904. The dark pixels in upsampled image 904 represent the sixteen pixels from sub-frame 30J, and the light pixels in upsampled image 904 represent zero values. Taking the FFT of sub-frame 30J results in image (L) 906. Taking the FFT of upsampled image 904 results in image ($L_U$) 908. Image ($L_U$) 908 includes four 4×4 pixel portions, which are image portion ($L_1$) 910A, image portion ($L_2$) 910B, image portion ($L_3$) 910C, and image portion ($L_4$) 910D. As shown in FIG. 12, image portions 910A-910D are each the same as image 906 (i.e., $L_1 = L_2 = L_3 = L_4 = L$).

Figure 13:
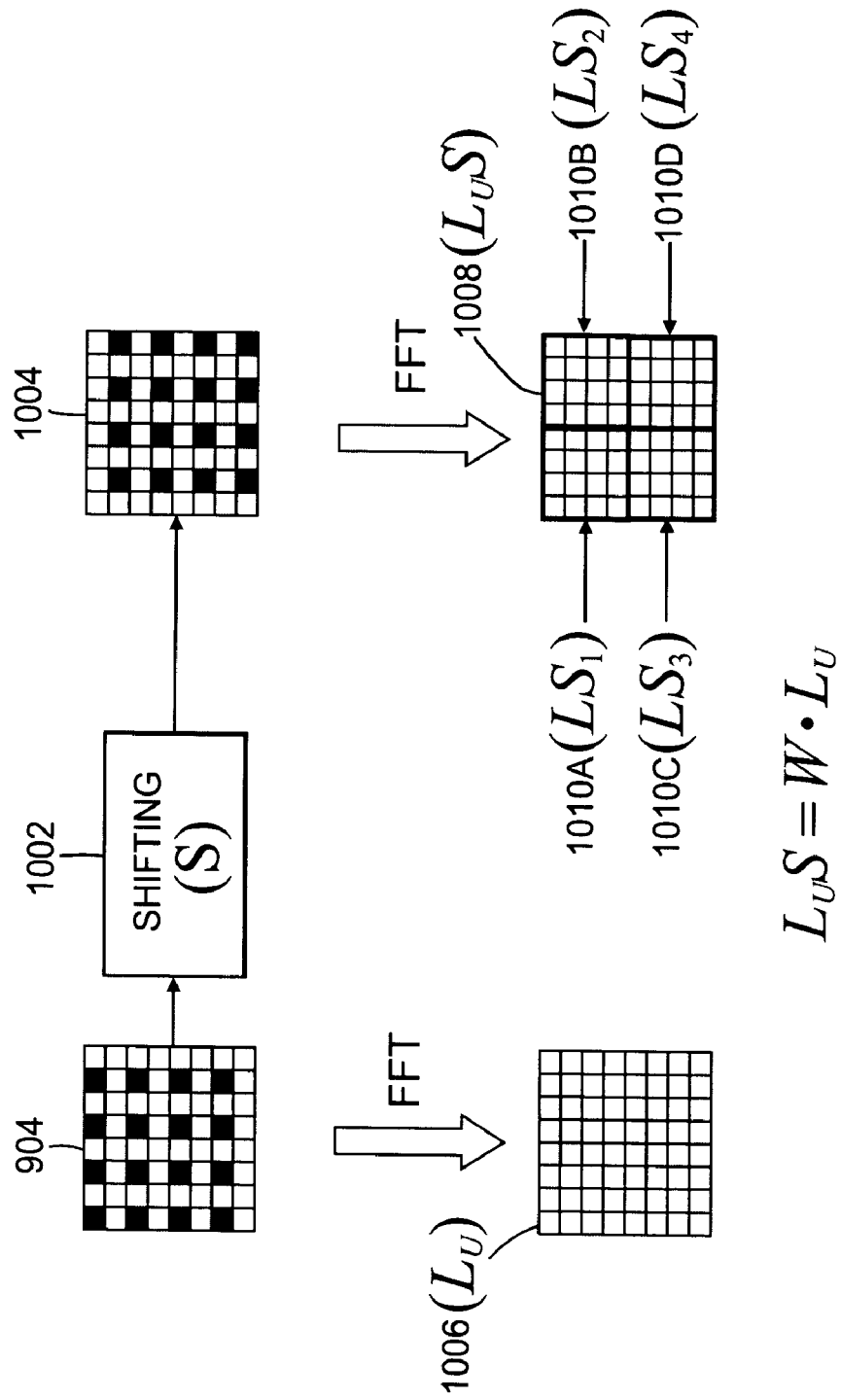
FIG. 13 is a diagram illustrating the effect in the frequency domain of the shifting of an upsampled sub-frame according to one embodiment of the present invention.

FIG. 13 is a diagram illustrating the effect in the frequency domain of the shifting of an 8×8 pixel upsampled sub-frame 904 according to one embodiment of the present invention. As shown in FIG. 13, upsampled sub-frame 904 is shifted by shifting stage 1002 to generate shifted image 1004. Taking the FFT of upsampled sub-frame 904 results in image ($L_U$) 1006. Taking the FFT of shifted image 1004 results in image ($L_U S$) 1008. Image ($L_U S$) 1008 includes four 4×4 pixel portions, which are image portion ($LS_1$) 1010A, image portion ($LS_2$) 1010B, image portion ($LS_3$) 1010C, and image portion ($LS_4$) 1010D. As shown in FIG. 13, image 1008 is the same as image 1006 multiplied by a complex exponential, W, (i.e., $L_U S = W \cdot L_U$), where "·" denotes pointwise multiplication. The values for the complex exponential, W, are given by the following Equation XV:

$$[W]_{(k_1, k_2)} = e^{-\frac{j2\pi(k_1 + k_2)}{MN}} \quad \text{Equation XV}$$

where:
 $k_1$=row coordinate in the FFT domain;
 $k_2$=column coordinate in the FFT domain;
 M=number of columns in the image; and
 N=number of rows in the image.

The system 500 shown in FIG. 8 can be represented mathematically in an error cost function by the following Equation XVI:

$$(L_A^*, L_B^*) = \operatorname*{argmin}_{(L_A, L_B)} J = \operatorname*{argmin}_{(L_A, L_B)} \quad \text{Equation XVI}$$

$$\sum_i \left[\hat{F}_i(L_A + \hat{W}_i L_B) - H_i\right]^H \left[\hat{F}_i(L_A + \hat{W}_i L_B) - H_i\right]$$

where:
 ($L_A^*$, $L_B^*$)=vectors representing the optimal FFT's of sub-frames 30F and 30G, respectively, shown in FIG. 8;
 J=error cost function to be minimized;
 i=index identifying FFT blocks that are averaged (e.g., for image 908 in FIG. 12, four blocks are averaged, with i=1 corresponding to block 910A, i=2 corresponding to block 910B, i=3 corresponding to block 910C, and i=4 corresponding to block 910D);
 F=matrix representing the FFT of the interpolating filter,
 $L_A$=vector representing the FFT of sub-frame 30F shown in FIG. 8;
 $L_B$=vector representing the FFT of sub-frame 30G shown in FIG. 8;
 W=matrix representing the FFT of the complex coefficient given by Equation XV;
 H=vector representing the FFT of the desired high resolution image 28.

The superscript "H" in Equation XVI represents the Hermitian (i.e., $X^H$ is the Hermitian of X). The "hat" over the letters in Equation XVI indicates that those letters represent a diagonal matrix, as defined in the following Equation XVII:

$$\hat{X} = diag(X) = \begin{pmatrix} X_1 & 0 & 0 & 0 \\ 0 & X_2 & 0 & 0 \\ 0 & 0 & X_3 & 0 \\ 0 & 0 & 0 & X_4 \end{pmatrix} \quad \text{Equation XVII}$$

Taking the derivative of Equation XVI with respect to the complex conjugate of $L_A$ and setting it equal to zero results in the following Equation XVIII:

$$\frac{\partial J}{\partial \overline{L_A}} = \underbrace{\sum_i \overline{\hat{F}_i} \hat{F}_i L_A}_{\hat{A}} + \underbrace{\sum_i \overline{\hat{F}_i} \hat{F}_i \hat{W}_i L_B}_{\hat{B}} - \underbrace{\sum_i \overline{\hat{F}_i} H_i}_{C} = 0 \quad \text{Equation XVIII}$$

Taking the derivative of Equation XVI with respect to the complex conjugate of $L_B$ and setting it equal to zero results in the following Equation XIX:

$$\frac{\partial J}{\partial \overline{L_B}} = \underbrace{\sum_i \overline{\hat{W}_i} \overline{\hat{F}_i} \hat{F}_i L_A}_{\overline{\hat{B}}} + \underbrace{\sum_i \overline{\hat{F}_i} \hat{F}_i L_B}_{\hat{A}} - \underbrace{\sum_i \overline{\hat{W}_i} \overline{\hat{F}_i} H_i}_{D} = 0 \quad \text{Equation XIX}$$

The horizontal bar over the letters in Equations XVIII and XIX indicates that those letters represent a complex conjugate (i.e., $\overline{A}$ represents the complex conjugate of A).

Solving Equations XVIII and XIX for $L_A$ and $L_B$ results in the following Equations XX and XXI $$L_B = (\overline{\hat{B}}^{-1} \hat{B})^{-1} (D - \hat{A}^{-1} C) \quad \text{Equation XX}$$

$$L_A = \hat{A}^{-1} (C - \hat{B} L_B) \quad \text{Equation XXI}$$

Equations XX and XXI may be implemented in the frequency domain using pseudo-inverse filtering. In one embodiment, sub-frame generation unit 36 is configured to generate sub-frames 30 based on Equations XX and XXI.

VIII. Adaptive Multi-Pass

An adaptive multi-pass algorithm for generating sub-frames 30 according to one embodiment uses past errors to update estimates for the sub-frame data, and provides fast convergence and low memory requirements. The adaptive multi-pass solution according to one embodiment is described in the context of the system 600 shown in FIG. 9. The system 600 shown in FIG. 9 can be represented mathematically in an error cost function by the following Equation XXII:

$$J^{(n)}(n) = |e^{(n)}(n)|^2 = \left(\sum_k l_Q^{(n)}(k) f(n-k) - h(n)\right)^2 \quad \text{Equation XXII}$$

where:
- n=index identifying the current iteration;
- $J^{(n)}(n)$=error cost function at iteration n;
- $e^{(n)}(n)$=square root of the error cost function, $J^{(n)}(n)$;
- n and k=indices for identifying high resolution pixel locations in images 604 and 610;
- $I_Q^{(n)}(k)$=image data from upsampled image 604 at location k;
- f(n−k)=filter coefficient of the interpolating filter at a position n−k; and
- h(n)=image data for desired high resolution image 28 at location n.

As can be seen from Equation XXII, rather than minimizing a global spatial domain error by summing over the entire high resolution image as shown in Equation IX above, a local spatial domain error, which is a function of n, is being minimized.

A least mean squares (LMS) algorithm is used in one embodiment to determine the update, which is represented in the following Equation XXIII:

$$l_Q^{(n+1)}(t) = l_Q^{(n)}(t) + \alpha \frac{\partial J^{(n)}(n)}{\partial l_Q^{(n)}(t)}, t \in \Theta \quad \text{Equation XXIII}$$

where:
- Θ=the set of quincunx lattice points (i.e., the dark pixels in upsampled image 604 in FIG. 9); and
- α=sharpening factor.

Taking the derivative of Equation XXII provides the value for the derivative in Equation XXIII, which is given in the following Equation XXIV:

$$\frac{\partial J^{(n)}(n)}{\partial l_Q^{(n)}(t)} = 2\left(\sum_k l_Q^{(n)}(k) f(n-k) - h(n)\right) f(n-t) \quad \text{Equation XXIV}$$

In one embodiment, a block-LMS algorithm using the average gradient over a "region of influence" is used to perform the update, as represented by the following Equation XXV:

$$l_Q^{(n+1)}(t) = l_Q^{(n)}(t) + \alpha \sum_{n \in \Omega} \frac{\partial J^{(n)}(n)}{\partial l_Q^{(n)}(t)} \quad \text{Equation XXV}$$

where:
- Ω=region of influence

Figure 14:
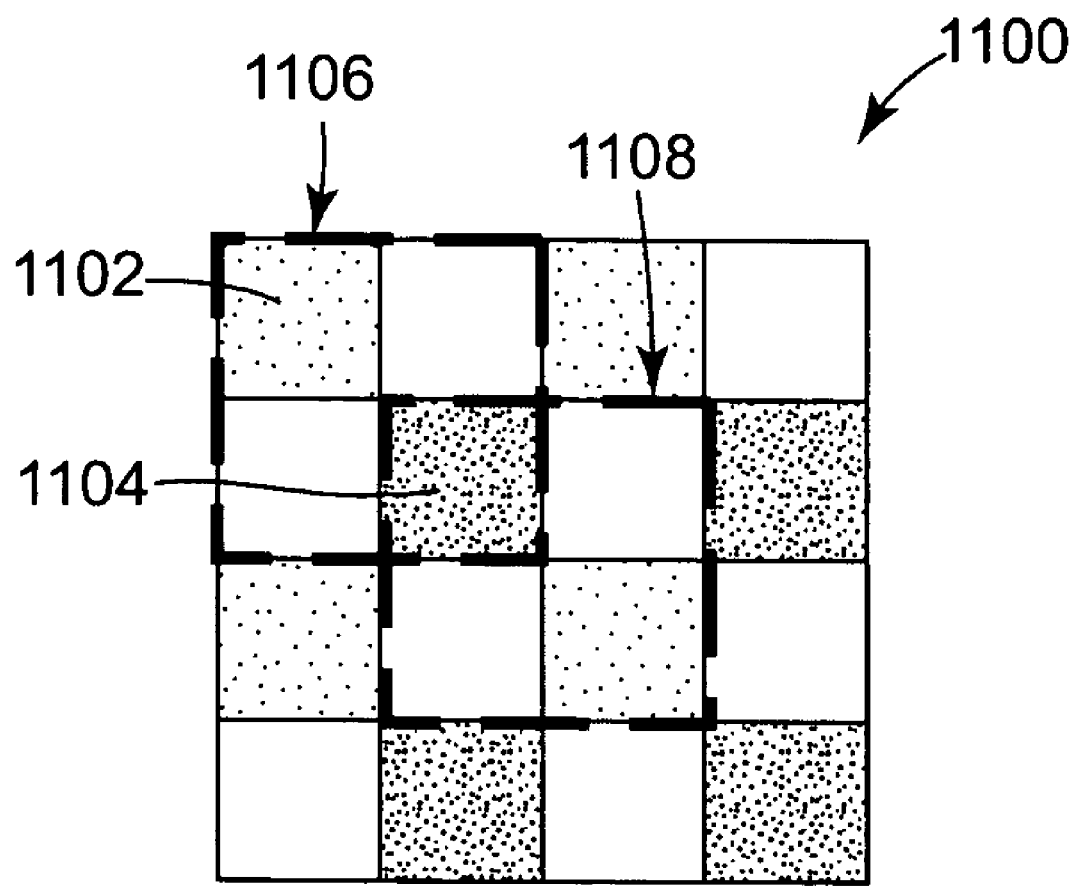
FIG. 14 is a diagram illustrating regions of influence for pixels in an upsampled image according to one embodiment of the present invention.

FIG. 14 is a diagram illustrating regions of influence (Ω) 1106 and 1108 for pixels in an upsampled image 1100 according to one embodiment of the present invention. Pixel 1102 of image 1100 corresponds to a pixel for a first sub-frame, and pixel 1104 of image 1100 corresponds to a pixel for a second sub-frame. Region 1106, which includes a 2×2 array of pixels with pixel 1102 in the upper left corner of the 2×2 array, is the region of influence for pixel 1102. Similarly, region 1108, which includes a 2×2 array of pixels with pixel 1104 in the upper left corner of the 2×2 array, is the region of influence for pixel 1104.

Figure 15:
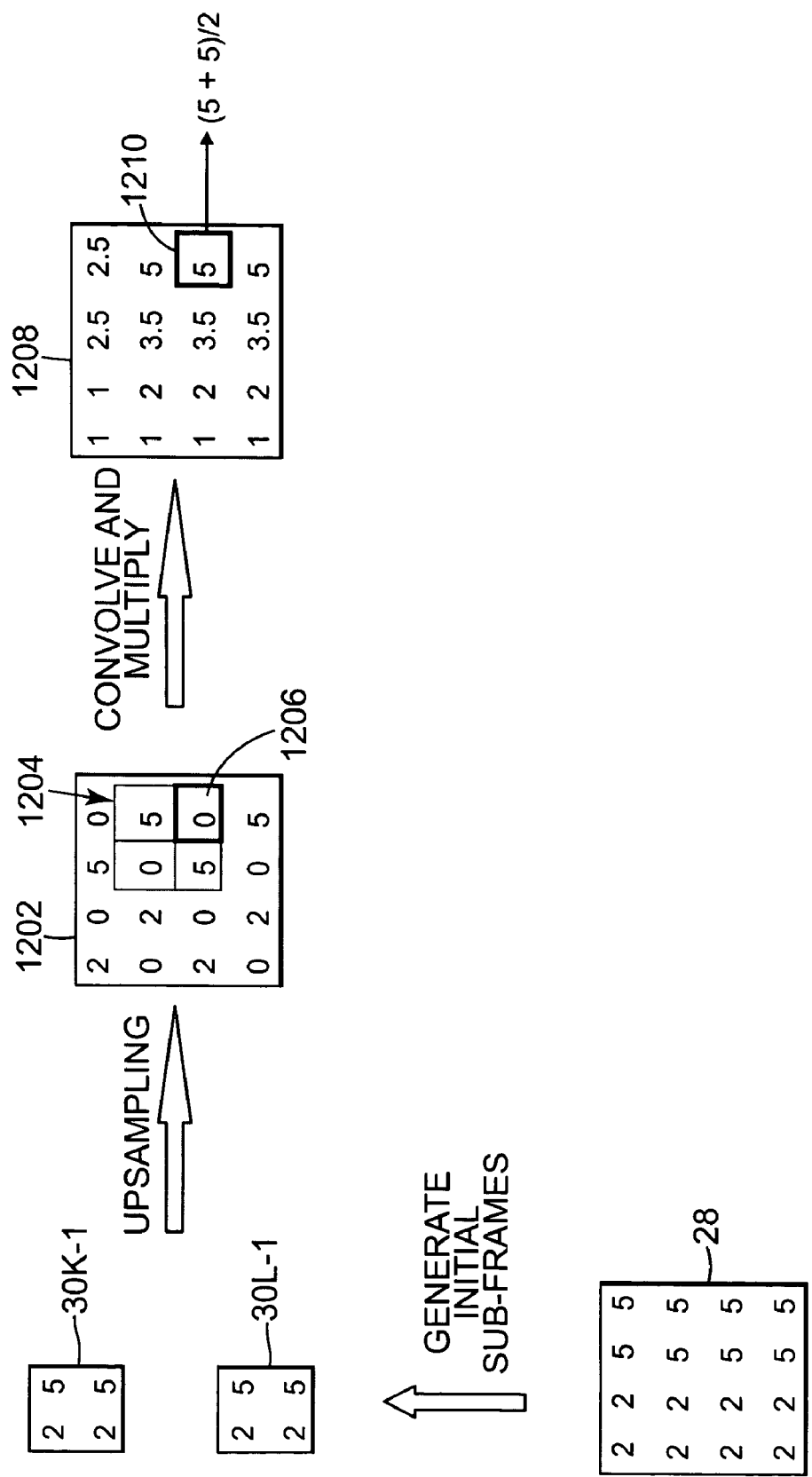
FIG. 15 is a diagram illustrating the generation of an initial simulated high resolution image based on an adaptive multi-pass algorithm according to one embodiment of the present invention.

FIG. 15 is a diagram illustrating the generation of an initial simulated high resolution image 1208 based on an adaptive multi-pass algorithm according to one embodiment of the present invention. An initial set of low resolution sub-frames 30K-1 and 30L-1 are generated based on an original high resolution image 28. In the illustrated embodiment, the initial set of sub-frames 30K-1 and 30L-1 are generated using an embodiment of the nearest neighbor algorithm described above with reference to FIG. 5. The sub-frames 30K-1 and 30L-1 are upsampled to generate upsampled image 1202. The upsampled image 1202 is convolved with an interpolating filter 1204, thereby generating a blocked image, which is then multiplied by a factor of 0.5 to generate simulated high resolution image 1208. In the illustrated embodiment, the interpolating filter 1204 is a 2×2 filter with filter coefficients of "1", and with the center of the convolution being the upper left position in the 2×2 matrix. The lower right pixel 1206 of the interpolating filter 1204 is positioned over each pixel in image 1202 to determine the blocked value for that pixel position. As shown in FIG. 15, the lower right pixel 1206 of the interpolating filter 1204 is positioned over the pixel in the third row and fourth column of image 1202, which has a value of "0". The blocked value for that pixel position is determined by multiplying the filter coefficients by the pixel values within the window of the filter 1204, and adding the results. Out-of-frame values are considered to be "0". For the illustrated embodiment, the blocked value for the pixel in the third row and fourth column of image 1202 is given by the following Equation XXVI $$(1 \times 0) + (1 \times 5) + (1 \times 5) + (1 \times 0) = 10 \quad \text{Equation XXVI}$$

The value in Equation XXVI is then multiplied by the factor 0.5, and the result (i.e., 5) is the pixel value for the pixel 1210 in the third row and the fourth column of the initial simulated high resolution image 1208.

Figure 16:
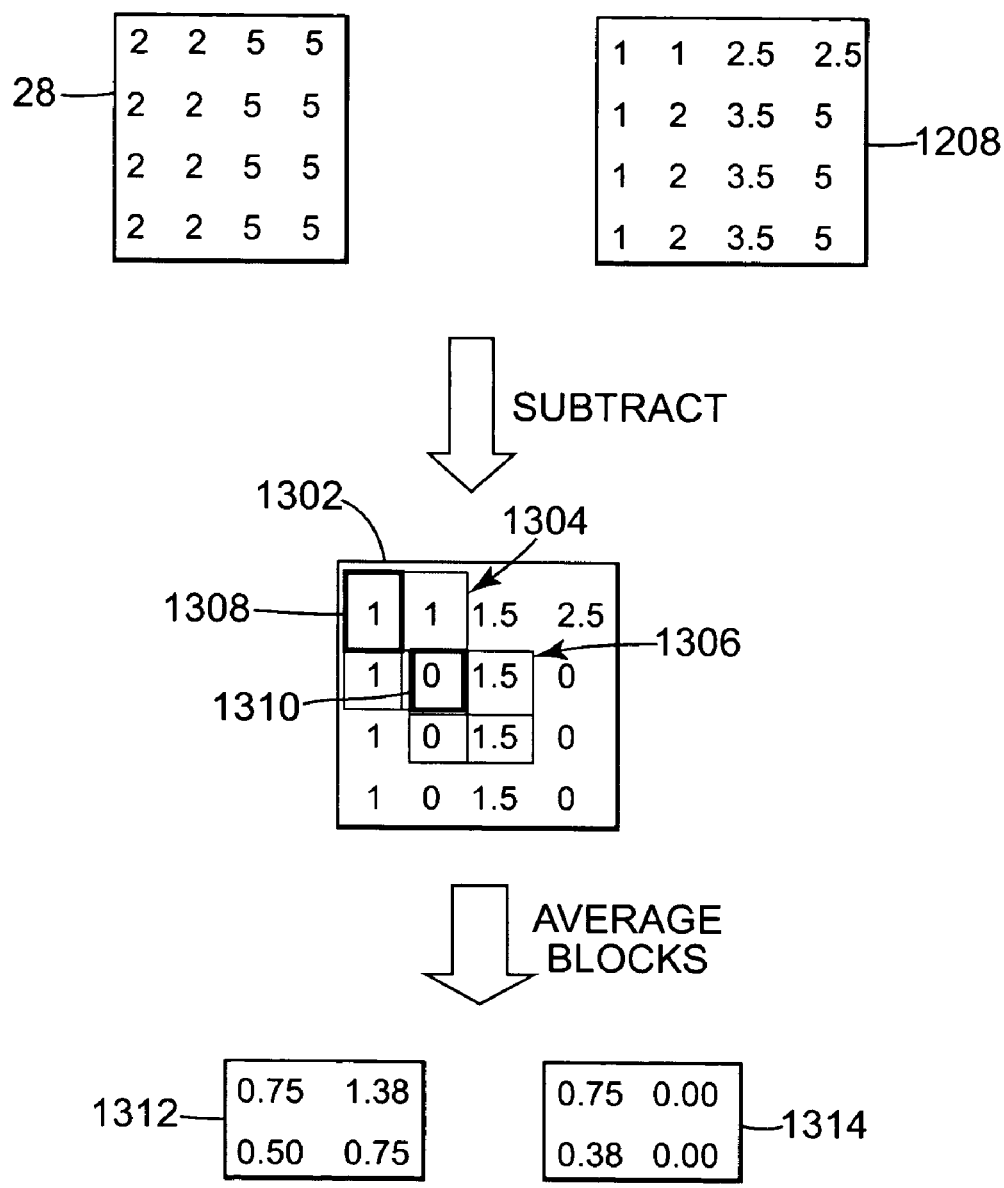
FIG. 16 is a diagram illustrating the generation of correction data based on an adaptive multi-pass algorithm according to one embodiment of the present invention.

After the initial simulated high resolution image 1208 is generated, correction data is generated. FIG. 16 is a diagram illustrating the generation of correction data based on the adaptive multi-pass algorithm according to one embodiment of the present invention. As shown in FIG. 16, the initial simulated high resolution image 1208 is subtracted from the original high resolution image 28 to generate an error image 1302. Correction sub-frames 1312 and 1314 are generated by averaging 2×2 blocks of pixels in error image 1302. For example, the pixel 1308 in the first column and first row of error image 1302 has a region of influence 1304. The pixel values within the region of influence 1304 are averaged to generate a first correction value (i.e., 0.75). The first correction value is used for the pixel in the first column and the first row of correction sub-frame 1312. Similarly, the pixel 1310 in the second column and second row of error image 1302 has a region of influence 1306. The pixel values within the region of influence 1306 are averaged to generate a second correction value (i.e., 0.75). The second correction value is used for the pixel in the first column and the first row of correction sub-frame 1314.

The correction value in the first row and second column of correction sub-frame 1312 (i.e., 1.38) is generated by essentially sliding the illustrated region of influence box 1304 two columns to the right and averaging those four pixels within the box 1304. The correction value in the second row and first column of correction sub-frame 1312 (i.e., 0.50) is generated by essentially sliding the illustrated region of influence box 1304 two rows down and averaging those four pixels within the box 1304. The correction value in the second row and second column of correction sub-frame 1312 (i.e., 0.75) is generated by essentially sliding the illustrated region of influence box 1304 two columns to the right and two rows down and averaging those four pixels within the box 1304.

The correction value in the first row and second column of correction sub-frame 1314 (i.e., 0.00) is generated by essentially sliding the illustrated region of influence box 1306 two columns to the right and averaging those pixels within the box 1306. Out-of-frame values are considered to be "0". The correction value in the second row and first column of correction sub-frame 1314 (i.e., 0.38) is generated by essentially sliding the illustrated region of influence box 1306 two rows down and averaging those pixels within the box 1306. The correction value in the second row and second column of correction sub-frame 1314 (i.e., 0.00) is generated by essentially sliding the illustrated region of influence box 1306 two columns to the right and two rows down and averaging those four pixels within the box 1306.

Figure 17:
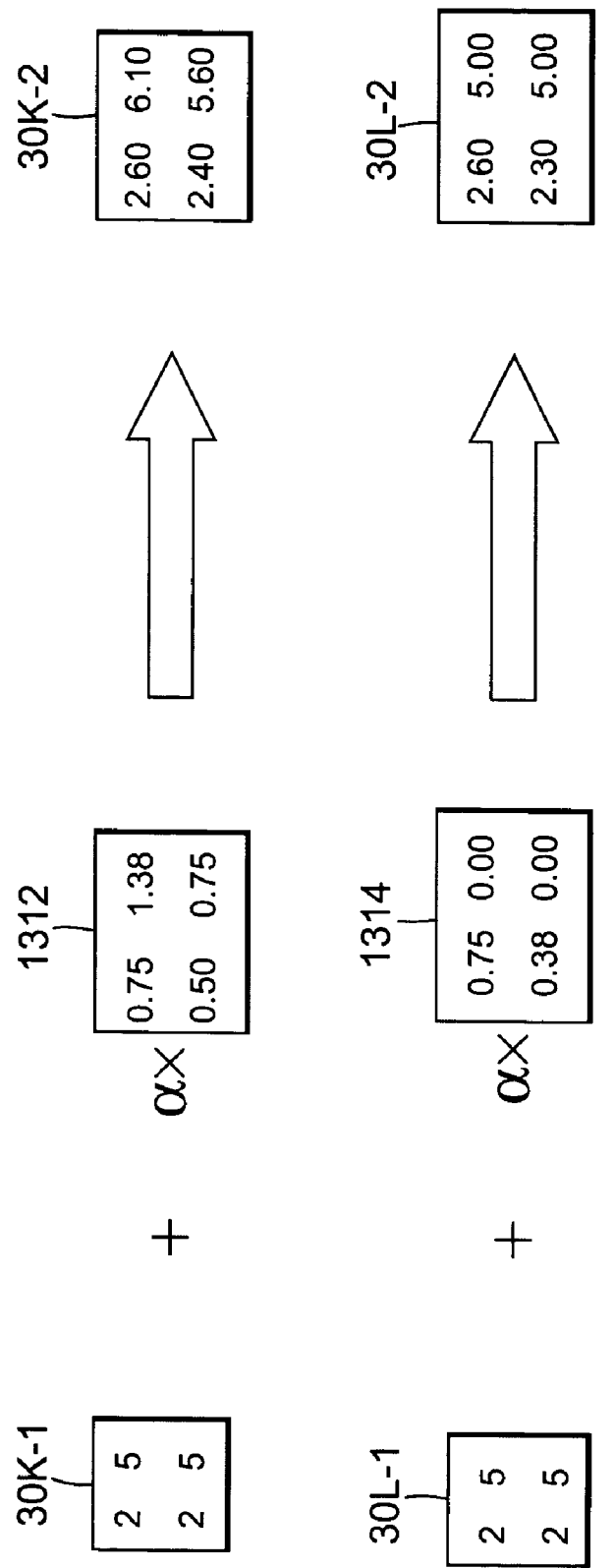
FIG. 17 is a diagram illustrating the generation of updated sub-frames based on an adaptive multi-pass algorithm according to one embodiment of the present invention.

The correction sub-frames 1312 and 1314 are used to generate updated sub-frames. FIG. 17 is a diagram illustrating the generation of updated sub-frames 30K-2 and 30L-2 based on the adaptive multi-pass algorithm according to one embodiment of the present invention. As shown in FIG. 17, the updated sub-frame 30K-2 is generated by multiplying the correction sub-frame 1312 by the sharpening factor, $\alpha$, and adding the initial sub-frame 30K-1. The updated sub-frame 30L-2 is generated by multiplying the correction sub-frame 1314 by the sharpening factor, $\alpha$, and adding the initial sub-frame 30L-1. In the illustrated embodiment, the sharpening factor, $\alpha$, is equal to 0.8.

In one embodiment, updated sub-frames 30K-2 and 30L-2 are used in the next iteration of the adaptive multi-pass algorithm to generate further updated sub-frames. Any desired number of iterations may be performed. After a number of iterations, the values for the sub-frames generated using the adaptive multi-pass algorithm converge to optimal values. In one embodiment, sub-frame generation unit 36 is configured to generate sub-frames 30 based on the adaptive multi-pass algorithm.

The embodiment of the adaptive multi-pass algorithm described above with reference to FIGS. 15-17 is for two-position processing. For four-position processing, Equation XXIV becomes the following Equation XXVII:

$$\frac{\partial J^{(n)}(n)}{\partial l^{(n)}(t)} = 2\left(\sum_k l^{(n)}(k)f(n-k) - h(n)\right)f(n-t) \qquad \text{Equation XXVII}$$

where:
  $l^{(n)}$=low resolution data for the four sub-frames 30;

And Equation XXIII becomes the following Equation XXVIII:

$$l^{(n+1)}(t) = l^{(n)}(t) + \alpha \frac{\partial J^{(n)}(n)}{\partial l^{(n)}(t)} \qquad \text{Equation XXVIII}$$

For four-position processing, there are four sub-frames, so the amount of low resolution data is the same as the amount of high resolution data. Each high resolution grid point contributes one error, and there is no need to average gradient update as represented in Equation XXV above. Rather, the error at a given location directly gives the update.

As described above, in one embodiment, the adaptive multi-pass algorithm uses a least mean squares (LMS) technique to generate correction data. In another embodiment, the adaptive multi-pass algorithm uses a projection on a convex set (POCS) technique to generate correction data. The adaptive multi-pass solution based on the POCS technique according to one embodiment is described in the context of the system 600 shown in FIG. 9. The system 600 shown in FIG. 9 can be represented mathematically in an error cost function by the following Equation XXIX:

$$|e(n)| = \left|\left(\sum_k l_Q(k)f(n-k) - h(n)\right)\right| \qquad \text{Equation XXIX}$$

where:
  e(n)=error cost function;
  n and k=indices identifying high resolution pixel locations;
  $I_Q(k)$=image data from upsampled image 604 at location k;
  f(n−k)=filter coefficient of the interpolating filter at a position n−k; and
  h(n)=image data for desired high resolution image 28 at location n.

A constrained set for the POCS technique is defined by the following Equation XXX:

$$C(n) = \left\{ l_Q(n) : \left|\left(\sum_k l_Q(k)f(n-k) - h(n)\right)\right| \le \eta \right\} \qquad \text{Equation XXX}$$

where:
  C(n)=constrained set that includes all sub-frame data from upsampled image 604 that is bounded by parameter, $\eta$; and
  $\eta$=error magnitude bound constraint.

The sub-frame pixel values for the current iteration are determined based on the following Equation XXXI:

$$l_Q^{(n+1)}(t) = \begin{cases} (1-\lambda)l_Q^{(n)}(t) + \lambda \dfrac{e(n^*) - \eta}{\|f\|^2} & e(n^*) > \eta \quad (t \in \Theta) \\ (1-\lambda)l_Q^{(n)}(t) + \lambda \dfrac{e(n^*) + \eta}{\|f\|^2} & e(n^*) < \eta \\ l_Q^{(n)}(t) & e(n^*) = \eta \end{cases} \qquad \text{Equation XXXI}$$

where:
  $\eta$=index identifying the current iteration;
  $\lambda$=relaxation parameter; and
  $\|f\|$=norm of the coefficients of the interpolating filter.

The symbol, n*, in Equation XXXI represents the location in the region of influence, Ω, where the error is a maximum, and is defined by the following Equation XXXII:

$$n^* = \text{argmax}\{n \in \Omega: |e(n)|\} \quad \text{Equation XXXII}$$

Figure 18:
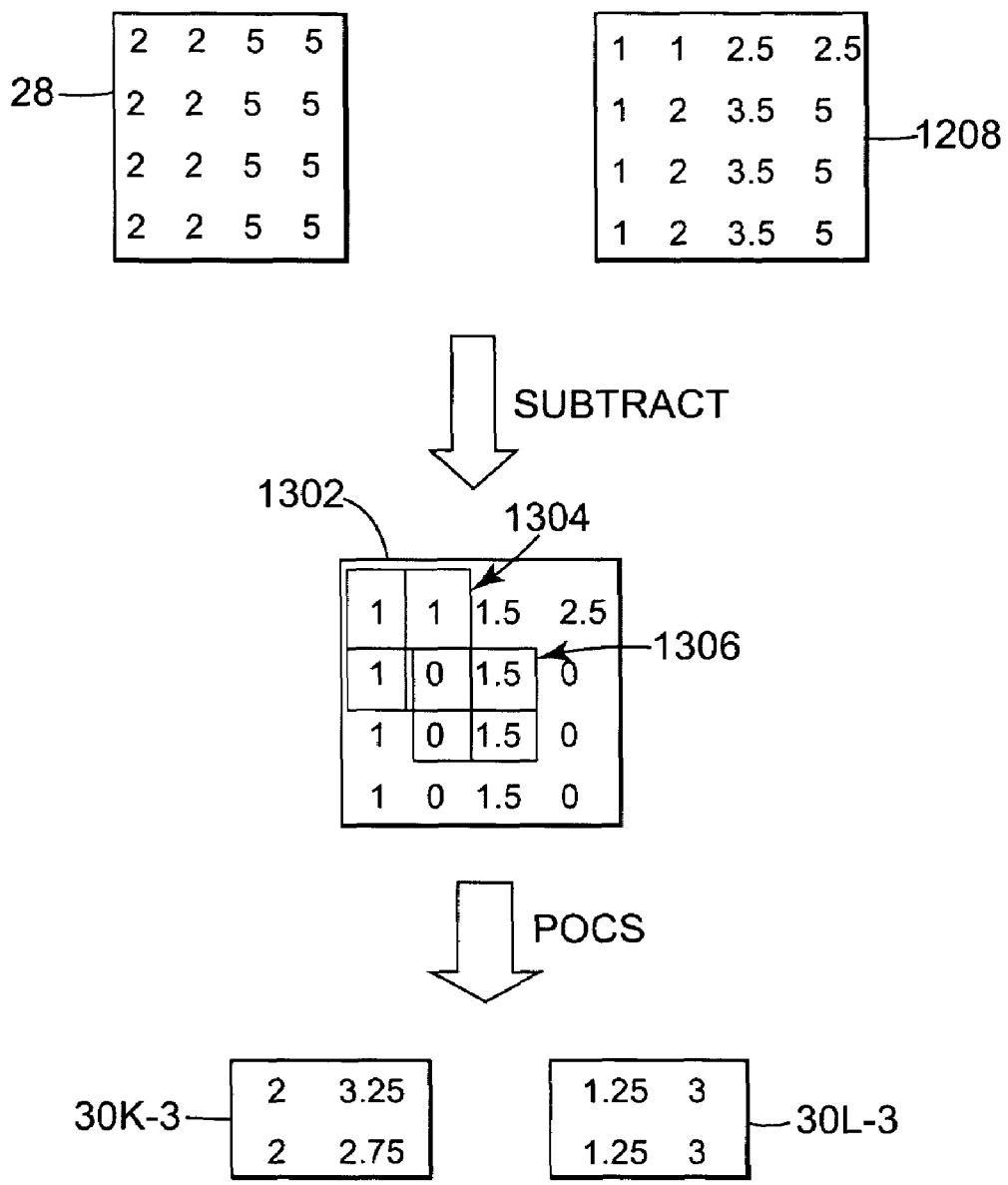
FIG. 18 is a diagram illustrating the generation of correction data based on an adaptive multi-pass algorithm according to another embodiment of the present invention.

FIG. 18 is a diagram illustrating the generation of correction data based on the adaptive multi-pass algorithm using a POCS technique according to one embodiment of the present invention. In one embodiment, an initial simulated high resolution image 1208 is generated in the same manner as described above with reference to FIG. 15, and the initial simulated high resolution image 1208 is subtracted from the original high resolution image 28 to generate an error image 1302. The Equation XXXI above is then used to generate updated sub-frames 30K-3 and 30L-3 from the data in error image 1302. For the illustrated embodiment, it is assumed that relaxation parameter, λ, in Equation XXXI is equal to 0.5, and the error magnitude bound constraint, η, is equal to 1.

With the POCS technique, rather than averaging the pixel values within the region of influence to determine a correction value as described above with reference to FIG. 16, the maximum error, e(n*), within the region of influence is identified. An updated pixel value is then generated using the appropriate formula from Equation XXXI, which will depend on whether the maximum error, e(n*), within the region of influence is greater than 1, less than 1, or equal to 1 (since η=1 for this example).

For example, the pixel in the first column and first row of error image 1302 has a region of influence 1304. The maximum error within this region of influence 1304 is 1 (i.e., e(n*)=1). Referring to Equation XXXI, for the case where e(n*)=1, the updated pixel value is equal to the previous value for this pixel. Referring to FIG. 15, the previous value for the pixel in the first column and the first row of sub-frame 30K-1 was 2, so this pixel remains with a value of 2 in updated sub-frame 30K-3. The pixel in the second column and second row of error image 1302 has a region of influence 1306. The maximum error within this region of influence 1306 is 1.5 (i.e., e(n*)=1.5). Referring to Equation XXXI, for the case where e(n*)>1, the updated pixel value is equal to half the previous value for this pixel, plus half of the quantity (e(n*)−1), which is equal to 1.25. Referring to FIG. 15, the previous value for the pixel in the first column and the first row of sub-frame 30L-1 was 2, so the updated value for this pixel is 1.25 in updated sub-frame 30L-3.

The region of influence boxes 1302 and 1304 are essentially moved around the error image 1302 in the same manner as described above with reference to FIG. 16 to generate the remaining updated values in updated sub-frames 30K-3 and 30L-3 based on Equation XXXI.

IX. Center Adaptive Multi-Pass

A center adaptive multi-pass algorithm for generating sub-frames 30 according to one embodiment uses past errors to update estimates for sub-frame data and may provide fast convergence and low memory requirements. The center adaptive multi-pass algorithm modifies the four-position adaptive multi-pass algorithm described above. With the center adaptive multi-pass algorithm, each pixel in each of four sub-frames 30 is centered with respect to a pixel in an original high resolution image 28. The four sub-frames are displayed with display device 26 using four-position processing as described above with reference to FIGS. 3A-3E.

Figure 19A:
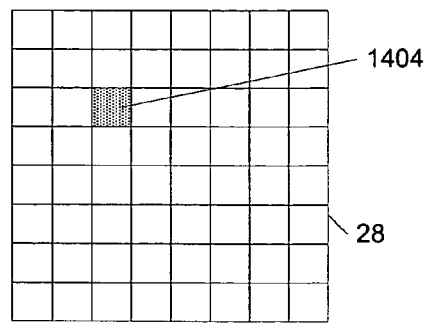
FIGS. 19A-19E are schematic diagrams illustrating the display of four sub-frames with respect to an original high resolution image according to one embodiment of the present invention.

FIGS. 19A-19E are schematic diagrams illustrating the display of four sub-frames 1412A, 1422A, 1432A, and 1442A with respect to an original high resolution image 28 according to one embodiment of the present invention. As shown in FIG. 19A, image 28 comprises 8×8 pixels with a pixel 1404 shaded for illustrative purposes.

Figure 19B:
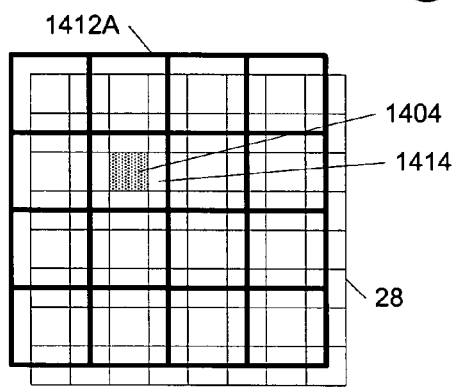

FIG. 19B illustrates the first sub-frame 1412A with respect to image 28. Sub-frame 1412A comprises 4×4 pixels centered on a first set of pixels in image 28. For example, a pixel 1414 in sub-frame 1412A is centered with respect to pixel 1404 from image 28.

Figure 19C:
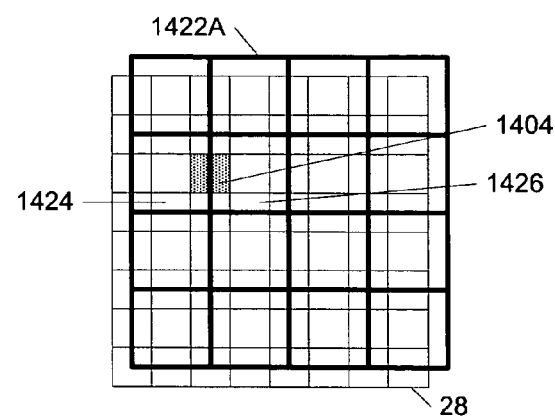

FIG. 19C illustrates the second sub-frame 1422A with respect to image 28. Sub-frame 1422A comprises 4×4 pixels centered on a second set of pixels in image 28. For example, a pixel in sub-frame 1422A is centered with respect to a pixel to the right of pixel 1404 from image 28. Two pixels 1424 and 1426 in sub-frame 1422A overlap pixel 1404 from image 28.

Figure 19D:
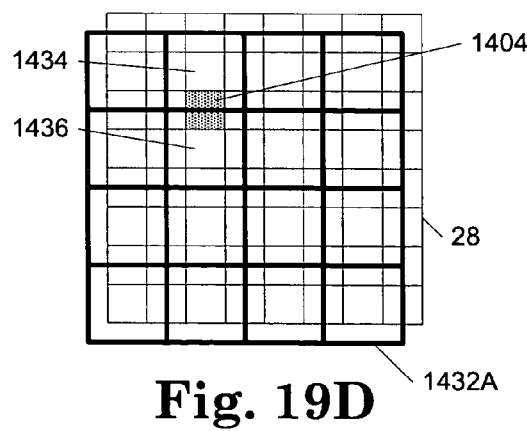

FIG. 19D illustrates the third sub-frame 1432A with respect to image 28. Sub-frame 1432A comprises 4×4 pixels centered on a third set of pixels in image 28. For example, a pixel in sub-frame 1432A is centered with respect to a pixel below pixel 1404 from image 28. Pixels 1434 and 1436 in sub-frame 1432A overlap pixel 1404 from image 28.

Figure 19E:
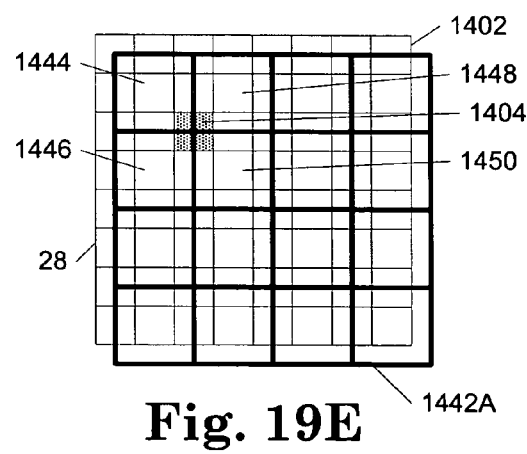

FIG. 19E illustrates the fourth sub-frame 1442A with respect to image 28. Sub-frame 1442A comprises 4×4 pixels centered on a fourth set of pixels in image 28. For example, a pixel in sub-frame 1442A is centered with respect to a pixel diagonally to the right of and below pixel 1404 from image 28. Pixels 1444, 1446, 1448, and 1450 in sub-frame 1442A overlap pixel 1404 from image 28.

When the four sub-frames 1412A, 1422A, 1432A, and 1442A are displayed, nine sub-frame pixels combine to form the displayed representation of each pixel from the original high resolution image 28. For example, nine sub-frame pixels-pixel 1414 from sub-frame 1412A, pixels 1424 and 1426 from sub-frame 1422A, pixels 1434 and 1436 from sub-frame 1432A, and pixels 1444, 1446, 1448, and 1450 from sub-frame 1442A-combine to form the displayed representation of pixel 1404 from the original high resolution image 28. These nine sub-frame pixels, however, contribute different amounts of light to the displayed representation of pixel 1404. In particular, pixels 1424, 1426, 1434, and 1436 from sub-frames 1422A and 1432A, respectively, each contribute approximately one-half as much light as pixel 1414 from sub-frame 1412A as illustrated by only a portion of pixels 1424, 1426, 1434, and 1436 overlapping pixel 1404 in FIGS. 19C and 19D. Similarly, pixels 1444, 1446, 1448, and 1450 from sub-frame 1442A each contribute approximately one-fourth as much light as pixel 1414 from sub-frame 1412A as illustrated by only a portion of pixels 1444, 1446, 1448, and 1450 overlapping pixel 1404 in FIGS. 19C and 19D.

Sub-frame generation unit 36 generates the initial four sub-frames 1412A, 1422A, 1432A, and 1442A from the high resolution image 28. In one embodiment, sub-frames 1412A, 1422A, 1432A, and 1442A may be generated using an embodiment of the nearest neighbor algorithm described above with reference to FIG. 5. In other embodiments, sub-frames 1412A, 1422A, 1432A, and 1442A may be generated using other algorithms. For error processing, the sub-frames 1412A, 1422A, 1432A, and 1442A are upsampled to generate an upsampled image, shown as sub-frame 30M in FIG. 20.

Figure 20:
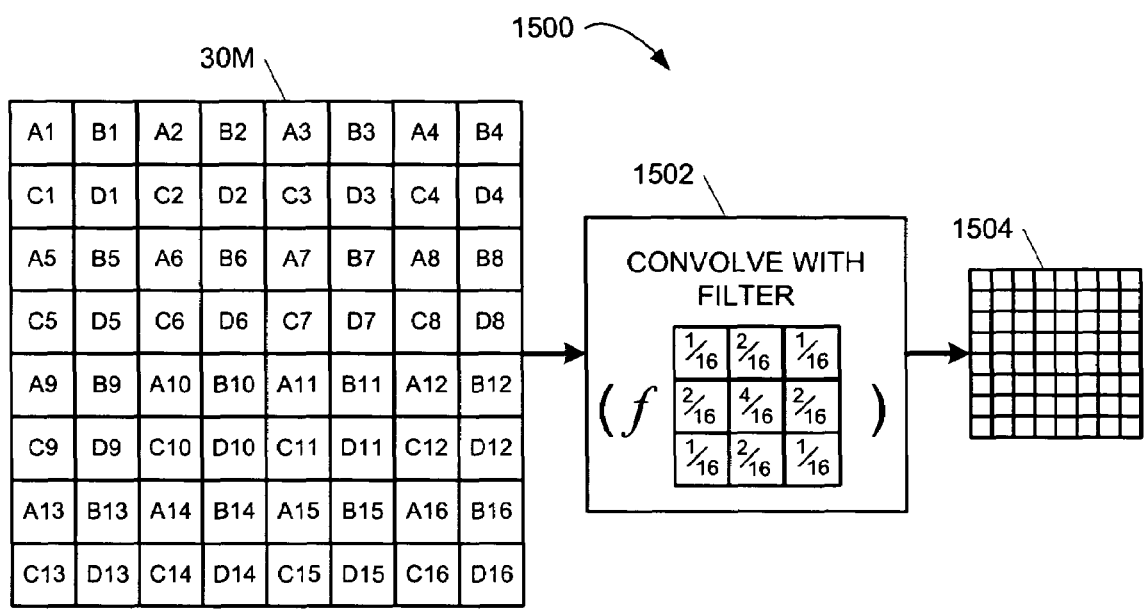
FIG. 20 is a block diagram illustrating a system for generating a simulated high resolution image for four-position processing using a center adaptive multi-pass algorithm according to one embodiment of the present invention.

FIG. 20 is a block diagram illustrating a system 1500 for generating a simulated high resolution image 1504 for four-position processing based on sub-frame 30M using a center adaptive multi-pass algorithm according to one embodiment of the present invention. In the embodiment illustrated in FIG. 20, sub-frame 30M is an 8×8 array of pixels. Sub-frame 30M includes pixel data for four 4×4 pixel sub-frames for four-position processing. Pixels A1-A16 represent pixels from sub-frame 1412A, pixels B1-B16 represent pixels from sub-frame 1422A, pixels C1-C16 represent pixels from sub-frame 1432A, and pixels D1-D16 represent pixels from sub-frame 1442A.

The sub-frame 30M is convolved with an interpolating filter at convolution stage 1502, thereby generating the simulated high resolution image 1504. In the illustrated embodiment, the interpolating filter is a 3×3 filter with the center of the convolution being the center position in the 3×3 matrix. The filter coefficients of the first row are "1/16", "2/16", "1/16", the filter coefficients of the second row are "2/16", "4/16", "2/16", and the filter coefficients of the last row are "1/16", "2/16", "1/16".

The filter coefficients represent the relative proportions that nine sub-frame pixels make toward the displayed representation of a pixel of the high resolution image 28. Recalling the example of FIG. 19 above, pixels 1424, 1426, 1434, and 1436 from sub-frames 1422A and 1432A, respectively, each contribute approximately one-half as much light as pixel 1414 from sub-frame 1412A, and pixels 1444, 1446, 1448, and 1450 from sub-frame 1442A each contribute approximately one-fourth as much light as pixel 1414 from sub-frame 1412A. The values of the sub-frame pixels 1414, 1424, 1426, 1434, 1436, 1444, 1446, 1448, and 1450 correspond to the A6, B5, B6, C2, C6, D1, D5, D2, and D6 pixels in sub-frame image 30M, respectively. Thus, the pixel $A6_{SIM}$ for the simulated image 1504 (which corresponds to pixel 1404 in FIG. 19) is calculated from the values in the sub-frame image 30M as follows in Equation XXXIII:

$$A6_{SIM} = ((1 \times D1) + (2 \times C2) + (1 \times D2) + (2 \times B5) + (4 \times A6) + (2 \times B6) + (1 \times D5) + (2 \times C6) + (1 \times D6))/16 \quad \text{Equation XXXIII}$$

The image data is divided by a factor of 16 to compensate for the relative proportions that the nine sub-frame pixels contribute to each displayed pixel.

Figure 21:
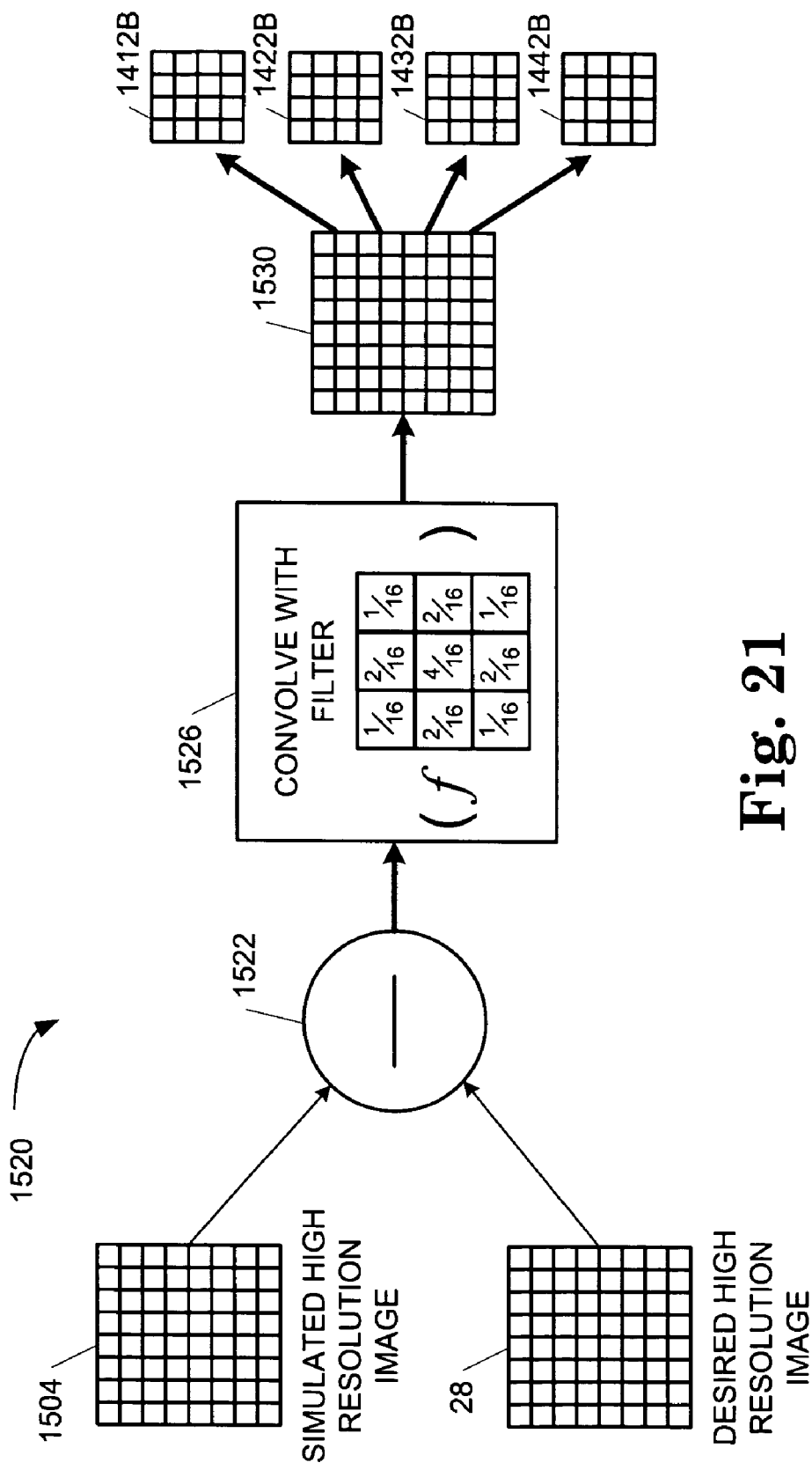
FIG. 21 is a block diagram illustrating the generation of correction data using a center adaptive multi-pass algorithm according to one embodiment of the present invention.

After the simulated high resolution image 1504 is generated, correction data is generated. FIG. 21 is a block diagram illustrating the generation of correction data using a center adaptive multi-pass algorithm in a system 1520 according to one embodiment of the present invention. The simulated high resolution image 1504 is subtracted on a pixel-by-pixel basis from high resolution image 28 at subtraction stage 1522. In one embodiment, the resulting error image data is filtered by an error filter 1526 to generate an error image 1530. In the illustrated embodiment, the error filter is a 3×3 filter with the center of the convolution being the center position in the 3×3 matrix. The filter coefficients of the first row are "1/16", "2/16", "1/16", the filter coefficients of the second row are "2/16", "4/16", "2/16", and the filter coefficients of the last row are "1/16", "2/16", "1/16". The filter coefficients represent the proportionate differences between a low resolution sub-frame pixel and the nine pixels of the high resolution image 28. As illustrated in FIGS. 19B, the error value in error image 1530 for low resolution sub-frame pixel 1414 is measured against pixel 1404 of the high resolution image 28 and the eight high resolution pixels immediately adjacent to pixel 1404. With the above filter coefficients, the high resolution pixels above, below, to the left, and the right of pixel 1404 are weighted twice as much as the high resolution pixels adjacent to the corners of pixel 1404 in calculating the error value corresponding to pixel 1414. Similarly, pixel 1404 is weighted twice as much as the four high resolution pixels above, below, to the left, and the right of pixel 1404 in calculating the error value corresponding to pixel 1414.

Four correction sub-frames (not shown) associated with the initial sub-frames 1412A, 1422A, 1432A, and 1442A, respectively, are generated from the error image 1530. Four updated sub-frames 1412B, 1422B, 1432B, and 1442B are generated by multiplying the correction sub-frames by the sharpening factor, α, and adding the initial sub-frames 1412A, 1422A, 1432A, and 1442A, respectively. The sharpening factor, α, may be different for different iterations of the center adaptive multi-pass algorithm. In one embodiment, the sharpening factor, α, may decrease between successive iterations. For example, the sharpening factor, α, may be "3" for a first iteration, "1.8" for a second iteration, and "0.5" for a third iteration.

In one embodiment, updated sub-frames 1412B, 1422B, 1432B, and 1442B are used in the next iteration of the center adaptive multi-pass algorithm to generate further updated sub-frames. Any desired number of iterations may be performed. After a number of iterations, the values for the sub-frames generated using the center adaptive multi-pass algorithm converge to optimal values. In one embodiment, sub-frame generation unit 36 is configured to generate sub-frames 30 based on the center adaptive multi-pass algorithm.

In the embodiment of the center adaptive multi-pass algorithm described above, the numerator and denominator values of the filter coefficient were selected to be powers of 2. By using powers of 2, processing in digital systems may be expedited. In other embodiments of the center adaptive multi-pass algorithm, other filter coefficient values may be used.

In other embodiments, the center adaptive multi-pass algorithm just described may be modified to generate two sub-frames for two-position processing. The two sub-frames are displayed with display device 26 using two-position processing as described above with reference to FIGS. 2A-2C. With two-position processing, pixels B1-B16 and C1-C16 in image 30M (shown in FIG. 20) are zero, and the interpolating filter comprises a 3×3 array with the first row of values being "1/8", "2/8", "1/8", the second row of values being "2/8", "4/8", "2/8", and the third row of values being "1/8", "2/8", "1/8". The error filter for two-position processing is the same as the error filter for four-position processing.

In other embodiments, the center adaptive multi-pass algorithm may be performed in one pass for any number of iterations by merging the calculations of each iteration into a single step for each sub-frame pixel value. In this way, each sub-frame pixel value is generated without explicitly generating simulation, error, and correction sub-frames for each iteration. Rather, each sub-frame pixel value is independently calculated from intermediate values which are calculated from the original image pixel values.

X. Simplified Center Adaptive Multi-Pass

A simplified center adaptive multi-pass algorithm for generating sub-frames 30 according to one embodiment uses past errors to update estimates for sub-frame data and provides fast convergence and low memory requirements. The simplified center adaptive multi-pass algorithm modifies the four-position adaptive multi-pass algorithm described above. With the simplified center adaptive multi-pass algorithm, each pixel in each of four sub-frames 30 is centered with respect to a pixel in an original high resolution image 28 as described above with reference to FIGS. 19A-19E. The four sub-frames are displayed with display device 26 using four-position processing as described above with reference to FIGS. 3A-3E.

Referring to FIGS. 19A-19E, sub-frame generation unit 36 generates the initial four sub-frames 1412A, 1422A, 1432A, and 1442A from the high resolution image 28. In one embodiment, sub-frames 1412A, 1422A, 1432A, and 1442A may be generated using an embodiment of the nearest neighbor algorithm described above with reference to FIG. 5. In other embodiments, sub-frames 1412A, 1422A, 1432A, and 1442A may be generated using other algorithms. For error processing, the sub-frames 1412A, 1422A, 1432A, and 1442A are upsampled to generate an upsampled image, shown as sub-frame 30M in FIG. 22.

Figure 22:
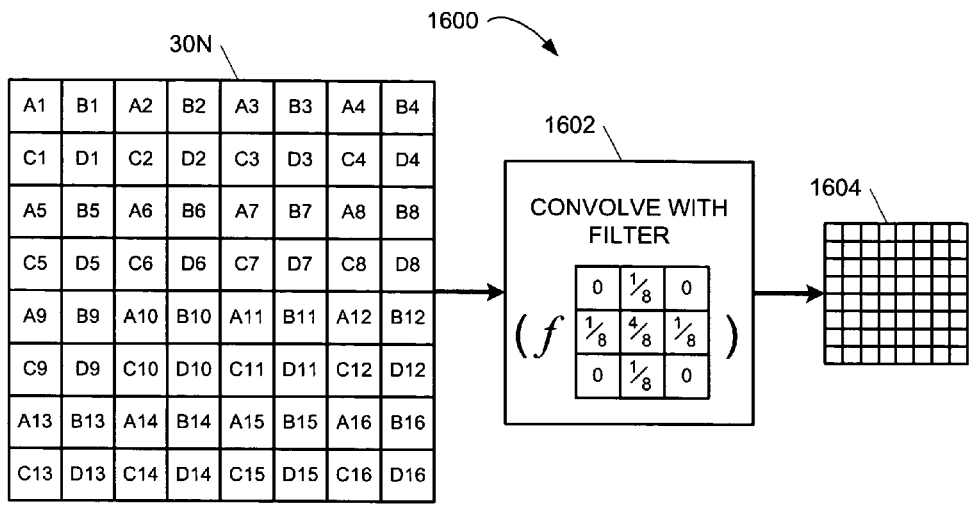
FIG. 22 is a block diagram illustrating a system for generating a simulated high resolution image for four-position processing using a simplified center adaptive multi-pass algorithm according to one embodiment of the present invention.

FIG. 22 is a block diagram illustrating a system 1600 for generating a simulated high resolution image 1604 for four-position processing based on sub-frame 30N using a simplified center adaptive multi-pass algorithm according to one embodiment of the present invention. In the embodiment illustrated in FIG. 22, sub-frame 30N is an 8×8 array of pixels. Sub-frame 30N includes pixel data for four 4×4 pixel sub-frames for four-position processing. Pixels A1-A16 represent pixels from sub-frame 1412A, pixels B1-B16 represent pixels from sub-frame 1422A, pixels C1-C16 represent pixels from sub-frame 1432A, and pixels D1-D16 represent pixels from sub-frame 1442A.

The sub-frame 30N is convolved with an interpolating filter at convolution stage 1602, thereby generating the simulated high resolution image 1604. In the illustrated embodiment, the interpolating filter is a 3×3 filter with the center of the convolution being the center position in the 3×3 matrix. The filter coefficients of the first row are "0", "⅛", "0", the filter coefficients of the second row are "⅛", "⅜", "⅛", and the filter coefficients of the last row are "0", "⅛", "0".

The filter coefficients approximate the relative proportions that five sub-frame pixels make toward the displayed representation of a pixel of the high resolution image 28. Recalling the example of FIG. 19 above, pixels 1424, 1426, 1434, and 1436 from sub-frames 1422A and 1432A, respectively, each contribute approximately one-half as much light as pixel 1414 from sub-frame 1412A, and pixels 1444, 1446, 1448, and 1450 from sub-frame 1442A each contribute approximately one-fourth as much light as pixel 1414 from sub-frame 1412A. With the simplified center adaptive multi-pass algorithm, the contributions from pixels 1444, 1446, 1448, and 1450, referred to as the "corner pixels", are ignored in calculating the pixel value for pixel 1414 as indicated by the filter coefficients of 0 associated with the corner pixels.

The values of the sub-frame pixels 1414, 1424, 1426, 1434, 1436, 1444, 1446, 1448, and 1450 correspond to the A6, B5, B6, C2, C6, D1, D5, D2, and D6 pixels in sub-frame image 30N, respectively. Thus, the pixel $A6_{SIM}$ for the simulated image 1504 (which corresponds to pixel 1404 in FIG. 19) is calculated from the values in the sub-frame image 30N as follows in Equation XXXIV:

$$A6_{SIM}=((0\times D1)+(1\times C2)+(0\times D2)+(1\times B5)+(4\times A6)+(1\times B6)+(0\times D5)+(1\times C6)+(0\times D6))/8 \quad \text{Equation XXXIV}$$

Equation XXXIV simplifies to Equation XXXV:

$$A6_{SIM}=(C2+B5+(4\times A6)+B6+C6)/8 \quad \text{Equation XXXV}$$

The image data is divided by a factor of 8 to compensate for the relative proportions that the five sub-frame pixels contribute to each displayed pixel.

Figure 23:
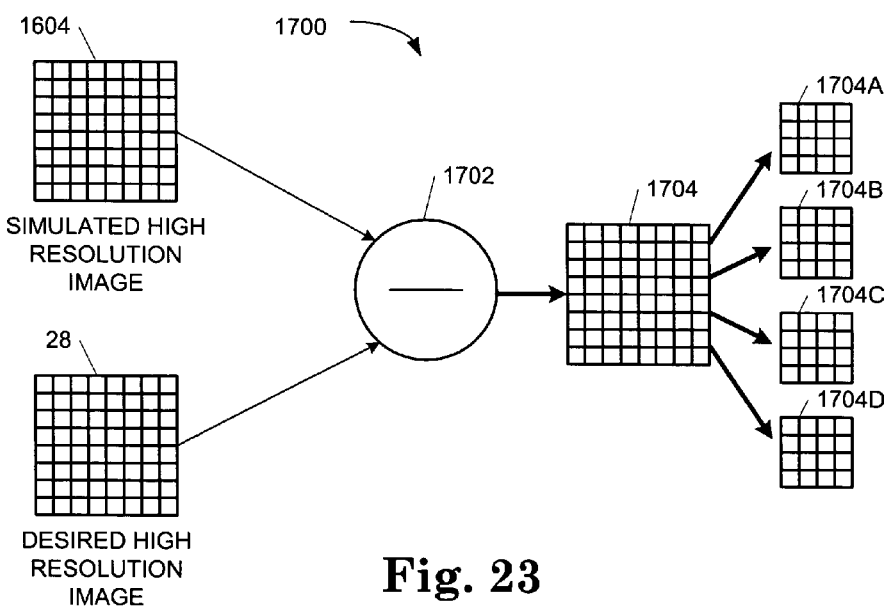
FIG. 23 is a block diagram illustrating the generation of correction data using a simplified center adaptive multi-pass algorithm according to one embodiment of the present invention.

After the simulated high resolution image 1604 is generated, correction data is generated. FIG. 23 is a block diagram illustrating the generation of correction data using a center adaptive multi-pass algorithm in a system 1700 according to one embodiment of the present invention. The simulated high resolution image 1604 is subtracted on a pixel-by-pixel basis from high resolution image 28 at subtraction stage 1702 to generate an error image 1704.

Four correction sub-frames (not shown) associated with the initial sub-frames 1412A, 1422A, 1432A, and 1442A, respectively, are generated from the error image 1704. Four updated sub-frames 1704A, 1704B, 1704C, and 1704D are generated by multiplying the correction sub-frames by the sharpening factor, $\alpha$, and adding the initial sub-frames 1412A, 1422A, 1432A, and 1442A, respectively. The sharpening factor, $\alpha$, may be different for different iterations of the simplified center adaptive multi-pass algorithm. In one embodiment, the sharpening factor, $\alpha$, may decrease between successive iterations. For example, the sharpening factor, $\alpha$, may be "3" for a first iteration, "1.8" for a second iteration, and "0.5" for a third iteration.

In one embodiment, updated sub-frames 1704A, 1704B, 1704C, and 1704D are used in the next iteration of the simplified center adaptive multi-pass algorithm to generate further updated sub-frames. Any desired number of iterations may be performed. After a number of iterations, the values for the sub-frames generated using the simplified center adaptive multi-pass algorithm converge to optimal values. In one embodiment, sub-frame generation unit 36 is configured to generate sub-frames 30 based on the center adaptive multi-pass algorithm.

In the embodiment of the simplified center adaptive multi-pass algorithm described above, the numerator and denominator values of the filter coefficient were selected to be powers of 2. By using powers of 2, processing in digital systems may be expedited. In other embodiments of the simplified center adaptive multi-pass algorithm, other filter coefficient values may be used.

In other embodiments, the simplified center adaptive multi-pass algorithm may be performed in one pass for any number of iterations by merging the calculations of each iteration into a single step for each sub-frame pixel value. In this way, each sub-frame pixel value is generated without explicitly generating simulation, error, and correction sub-frames for each iteration. Rather, each sub-frame pixel value is independently calculated from intermediate values which are calculated from the original image pixel values.

XI. Adaptive Multi-Pass with History

An adaptive multi-pass algorithm with history for generating sub-frames 30 according to one embodiment uses past errors to update estimates for sub-frame data and may provide fast convergence and low memory requirements. The adaptive multi-pass algorithm with history modifies the four-position adaptive multi-pass algorithm described above by using history values to generate sub-frames in one pass of the algorithm. The four sub-frames are displayed with display device 26 using four-position processing as described above with reference to FIGS. 3A-3E.

At least two methods for implementing the adaptive multi-pass algorithm may be used. First, the adaptive multi-pass algorithm may be performed in multiple iterations as described above for the adaptive multi-pass, the center adaptive multi-pass, and the simplified center adaptive multi-pass algorithms. With multiple iterations, (1) initial sub-frames are generated, (2) a simulated image is generated, (3) correction data is calculated by comparing the simulated image with the original image, and (4) updated sub-frames are generated using the correction data. Steps (2) through (4) are then repeated for each iteration.

Figure 24A:
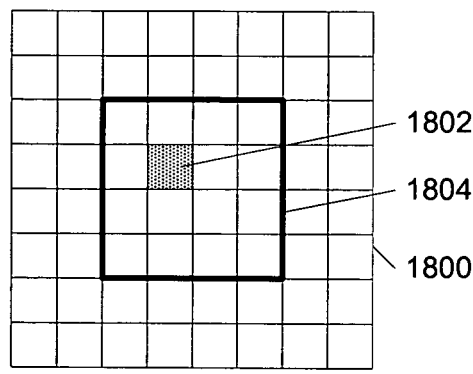
FIGS. 24A-24C are block diagrams illustrating regions of influence for a pixel for different numbers of iterations of the adaptive multi-pass algorithm according to one embodiment of the present invention.
Figure 24B:
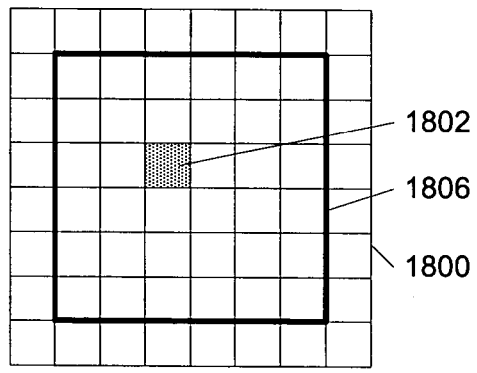
Figure 24C:
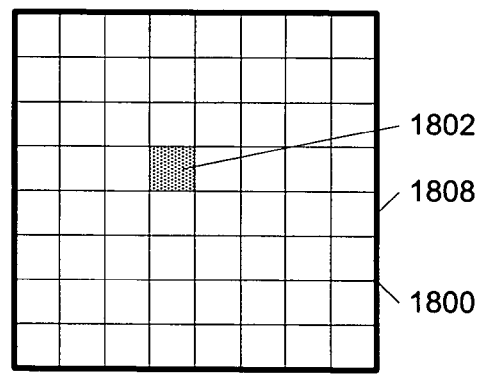
Figure 27:
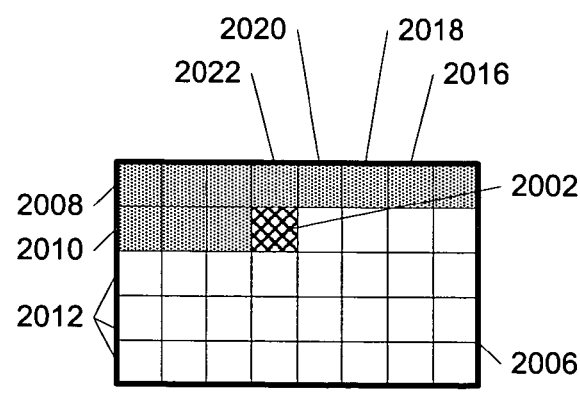
FIG. 27 is a block diagram illustrating calculated history values in a simplified region of influence of a pixel according to one embodiment of the present invention.
Figure 31:
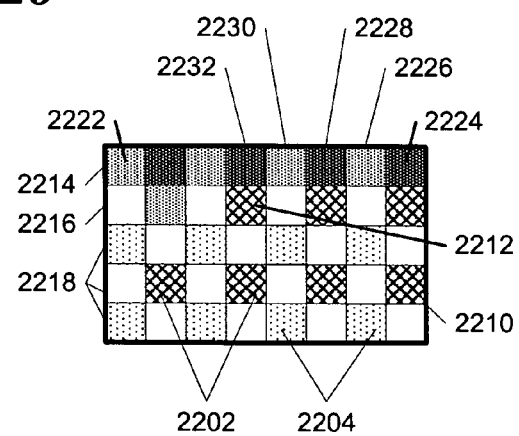
FIG. 31 is a block diagram illustrating calculated history and error values in a simplified region of influence of a pixel according to one embodiment of the present invention.

The adaptive multi-pass algorithm may also be implemented by calculating each final sub-frame pixel value in one pass using a region of influence for each final sub-frame pixel value. With this method, the size of the region of influence corresponds to the number of iterations to be performed as shown in FIGS. 24A-24C. As will be described below, the region of influence may be simplified as shown in FIGS. 27 and 31.

FIGS. 24A-24C are block diagrams illustrating regions of influence for a pixel 1802 for different numbers of iterations of the adaptive multi-pass algorithm. FIG. 24A illustrates a region of influence 1804 for pixel 1802 in an image 1800 for one iteration of the adaptive multi-pass algorithm. As shown in FIG. 24A, the region of influence 1804 comprises a 4×4 array of pixels with pixel 1802 centered in the region of influence 1804 as shown. The region of influence 1804 encompasses the pixel values used to generate the initial, simulation, and correction values for pixel 1802 using one iteration of the adaptive multi-pass algorithm.

For two iterations of the adaptive multi-pass algorithm, a region of influence 1806 expands to a 6×6 array with pixel 1802 centered in the region of influence 1806 as shown in FIG. 24B. The region of influence 1806 for pixel 1802 comprises a 6×6 array of pixels and encompasses the pixel values used to generate the initial, simulation, and correction values for pixel 1802 using two iterations of the adaptive multi-pass algorithm.

As shown in FIG. 24C, a region of influence 1808 further expands to an 8×8 array for three iterations of the adaptive multi-pass algorithm. The region of influence 1808 for pixel 1802 comprises an 8×8 array of pixels with pixel 1802 centered in the region of influence 1808 as shown and encompasses the pixel values used to generate the initial, simulation, and correction values for pixel 1802 using three iterations of the adaptive multi-pass algorithm. In particular, the region of influence 1808 covers eight rows of the image 1800.

The size of a region of influence may be generalized by noting that for n iterations, the region of influence comprises a (2n+2)×(2n+2) array.

Figure 25:
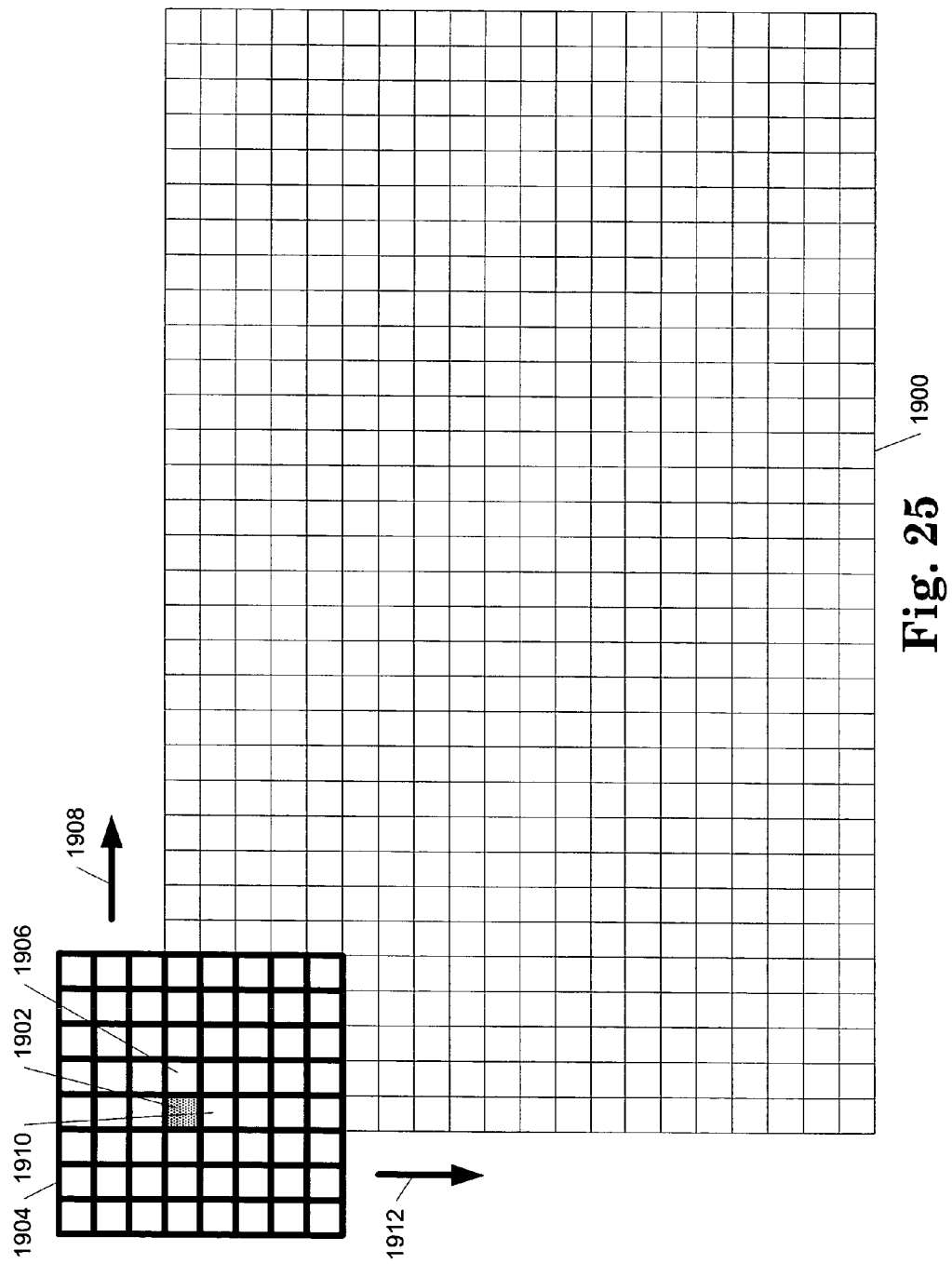
FIG. 25 is a block diagram illustrating a region of influence of a pixel with respect to an image according to one embodiment of the present invention.

With the one pass method for implementing the adaptive multi-pass algorithm, each final sub-frame pixel value is calculated by shifting the region of influence with respect to the pixel value corresponding to the final sub-frame pixel value. FIG. 25 is a block diagram illustrating a region of influence 1904 of a pixel 1902 with respect to an image 1900 for three iterations of the adaptive multi-pass algorithm. In FIG. 25, the final sub-frame pixel value corresponding to pixel 1902 is calculated using the pixel values encompassed by the region of influence 1904. To calculate the final sub-frame pixel value corresponding to a pixel 1906, the region of influence 1904 is shifted by one pixel to the right (not shown) as indicated by an arrow 1908. Similarly, the region of influence 1904 is shifted down by one pixel (not shown) as indicated by an arrow 1912 to calculate the final sub-frame pixel value corresponding to a pixel 1910.

In one embodiment, the final sub-frame pixel values of image 1900 may be calculated in a raster pattern where the values are calculated row-by-row from left to right beginning with the top row and finishing with the bottom row. In other embodiments, the final sub-frame pixel values may be calculated according to other patterns or in other orders.

Figure 26:
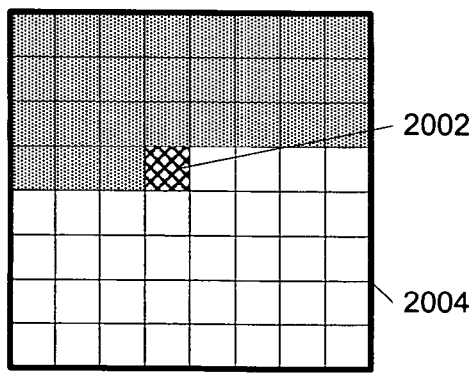
FIG. 26 is a block diagram illustrating calculated history values in a region of influence of a pixel according to one embodiment of the present invention.

FIG. 26 is a block diagram illustrating calculated history values in a region of influence 2004 of a pixel 2002 for three iterations of the adaptive multi-pass algorithm where the final sub-frame pixel values are calculated in a raster pattern. The shaded pixels in the region of influence 2004 comprise history values, i.e., final sub-frame pixel values calculated prior to calculating the final sub-frame pixel value for pixel 2002. With a raster pattern, the final sub-frame pixel values are calculated for each row above pixel 2002 and for each pixel on the same row and to the left of pixel 2002.

By using history values and ignoring the last row of initial values, the region of influence 2004 shown in FIG. 26 for pixel 2002 may be simplified. FIG. 27 is a block diagram illustrating calculated history values in a simplified region of influence 2006 of pixel 2002 for three iterations of the adaptive multi-pass algorithm with history where the final sub-frame pixel values are calculated in a raster pattern. The simplified region of influence 2006 comprises five rows—one row 2008 of history values, one row 2010 of both history values and initial values, and three rows 2012 of initial values. The simplified region of influence 2006 does not include the first two rows of history values and the last row of initial values from the region of influence 2004.

The initial history values 2008 may be set to be equal to the corresponding pixel values from the first row of the original image or may be set to zero. The initial values in rows 2010 and 2012 may be set to zero initially or may be set to be equal to the calculated initial values from a column 2016. The final sub-frame pixel value corresponding to pixel 2002 may be calculated using the history and initial values from the simplified region of influence 2006 using the following algorithm.

First, the initial pixel values for the pixels in column 2016 of the region of influence 2006 are calculated using the original image pixel values. In one embodiment, the initial pixel values are calculated by averaging each pixel value with three other pixel values. Other algorithms may be used in other embodiments. Next, the simulated pixel values for the pixels in column 2016 are calculated by convolving the initial pixel values with a simulation kernel. The simulation kernel comprises a 3×3 array with the first row of values being "¼", "¼", and "0", the second row of values being "¼", "¼", and "0", and the third row of values being "0", "0", and "0". Error values are generated for each pixel in column 2016 by subtracting the simulated pixel values from the original image pixel values.

After the error values of column 2016 are calculated, the simulated pixel values for the pixels in a column 2018 are calculated by convolving the initial pixel values with the simulation kernel. Error values are generated for each pixel in column 2018 by subtracting the simulated pixel values from the original image pixel values. The correction values for the pixels in column 2018 are calculated by convolving the error values with an error kernel. The error kernel comprises a 3×3 array with the first row of values being "0", "0", and "0", the second row of values being "0", "¼", and "¼", and the third row of values being "0", "¼", and "¼". The adaptive pixel values for the pixels in column 2018 are calculated by multiplying the correction values by a sharpening factor, $\alpha$, and adding the product to the initial values.

After the adaptive pixel values of column 2018 are calculated, the simulated pixel values for the pixels in a column 2020 are calculated by convolving the initial pixel values with the simulation kernel. Error values are generated for each pixel in column 2020 by subtracting the simulated pixel values from the original image pixel values. The correction values for the pixels in column 2020 are calculated by convolving the error values with the error kernel. The adaptive pixel values for the pixels in column 2020 are calculated by multiplying the correction values by a sharpening factor, $\alpha$, and adding the product to the initial values.

After the adaptive pixel values of column 2020 are calculated, the simulated pixel values for the pixels in a column 2022 are calculated by convolving the initial pixel values with the simulation kernel. Error values are generated for each pixel in column 2022 by subtracting the simulated pixel values from the original image pixel values. The correction values for the pixels in column 2022 are calculated by convolving the error values with the error kernel.

The final sub-frame pixel value corresponding to pixel 2002 is calculated using the values generated by the above algorithm, the history values, and a sharpening factor, α.

Intermediate calculations used in calculating the final sub-frame pixel value corresponding to a given pixel may be re-used in calculating the final sub-frame pixel value corresponding to a pixel adjacent to the given pixel. For example, intermediate calculations used in calculating the final sub-frame pixel value for pixel 2002 may be re-used in calculating the final sub-frame pixel value of a pixel to the right of pixel 2002. As a result, certain redundant calculations may be omitted.

The sharpening factor, α, in the above algorithm may be different in calculating values of different columns using the adaptive multi-pass algorithm with history. For example, the sharpening factor, α, may be "3" for calculating the adaptive pixel values of column 2018, "1.8" for calculating the adaptive pixel values of column 2020, and "0.5" for calculating the final sub-frame pixel value corresponding to pixel 2002.

Although the above algorithm was described for three iterations of the adaptive multi-pass algorithm, the algorithm can be expanded or reduced to apply to any number of iterations by increasing or decreasing the number of columns and/or the number of pixels in each column used in the above algorithm in accordance with the region of influence for the number of iterations.

Figure 28:
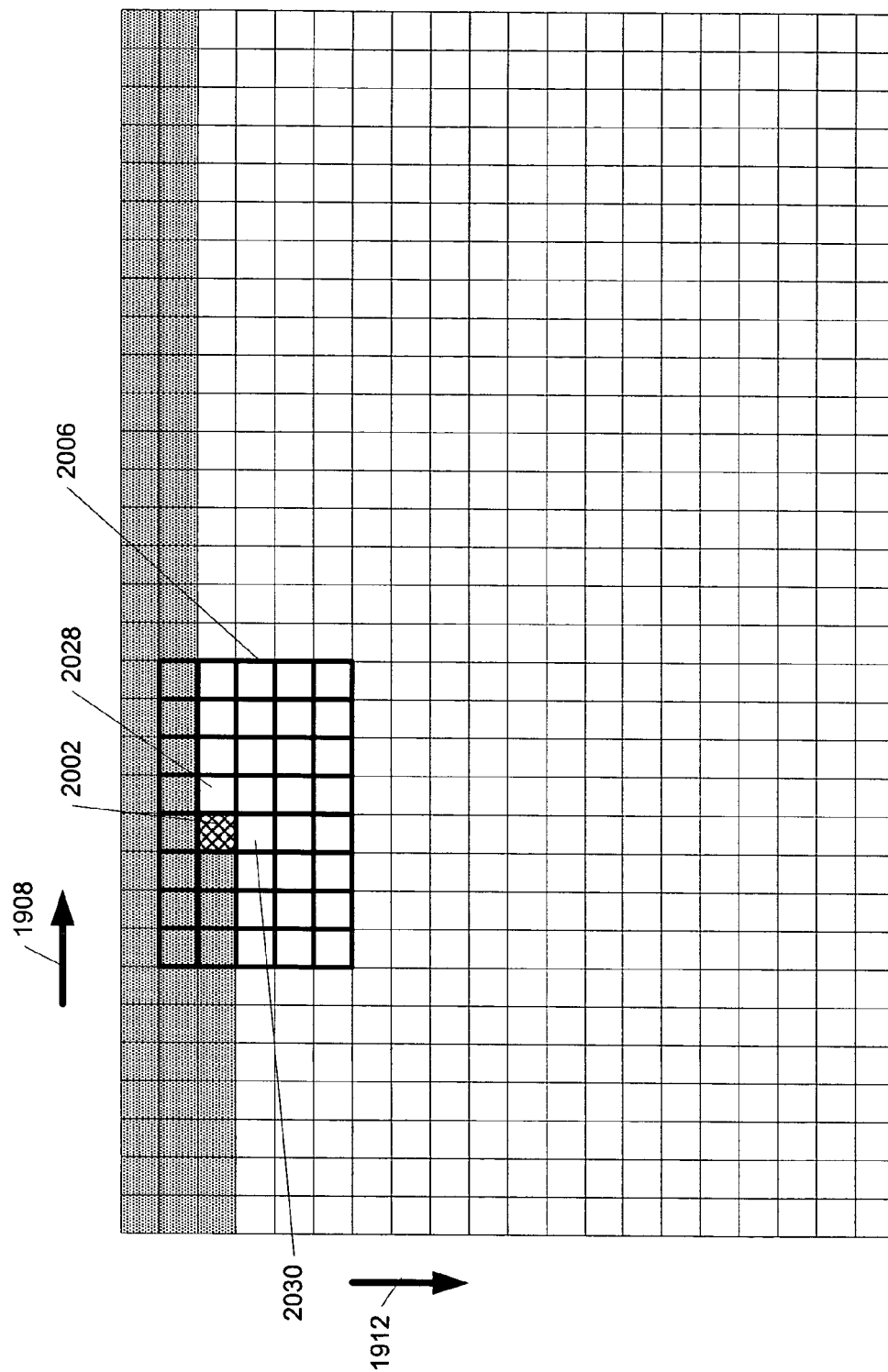
FIG. 28 is a block diagram illustrating a simplified region of influence of a pixel with respect to an image according to one embodiment of the present invention.

FIG. 28 is a block diagram illustrating the simplified region of influence 2006 of pixel 2002 with respect to image 1900 for three iterations of the adaptive multi-pass algorithm with history where the final sub-frame pixel values are calculated in a raster pattern. In FIG. 28, the final sub-frame pixel value corresponding to pixel 2002 is calculated using the pixel values encompassed by the region of influence 2006 as just described in the above algorithm. To calculate the final sub-frame pixel value corresponding to a pixel 2028, the region of influence 2006 is shifted by one pixel to the right (not shown) as indicated by the arrow 1908. Similarly, the region of influence 2006 is shifted down by one pixel (not shown) as indicated by the arrow 1912 to calculate the final sub-frame pixel value corresponding to a pixel 2030.

Figure 29:
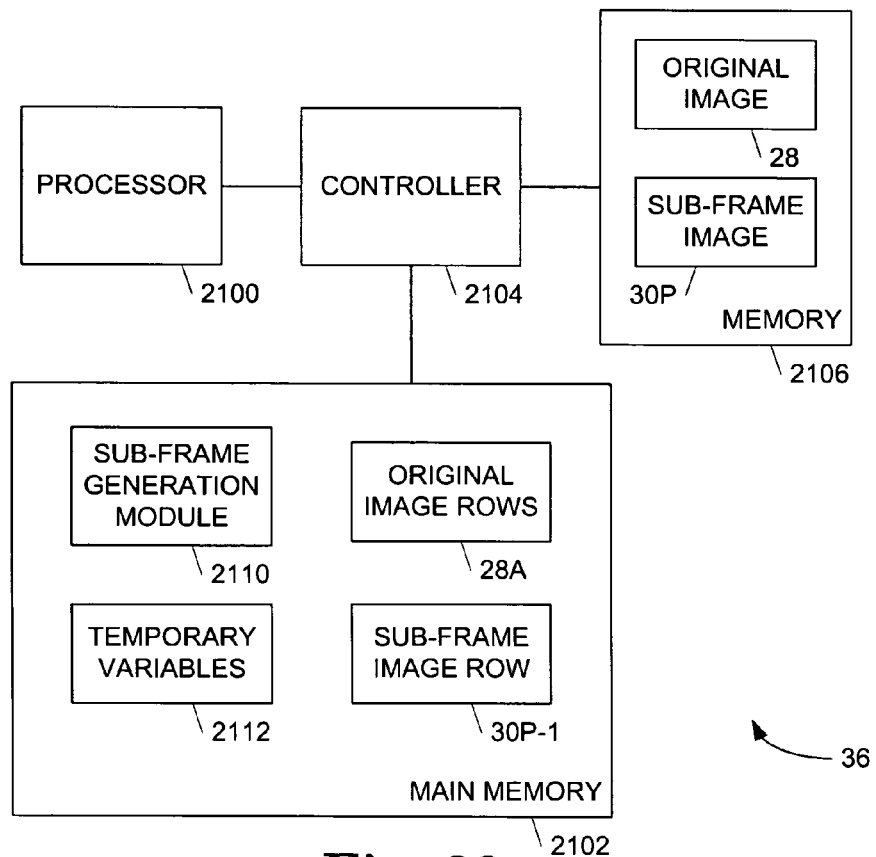
FIG. 29 is a block diagram illustrating portions of a sub-frame generation unit according to one embodiment of the present invention.

FIG. 29 is a block diagram illustrating portions of sub-frame generation unit 36 according to one embodiment. In this embodiment, sub-frame generation unit 36 comprises a processor 2100, a main memory 2102, a controller 2104, and a memory 2106. Controller 2104 is coupled to processor 2100, main memory 2102, and a memory 2106. Memory 2106 comprises a relatively large memory that includes an original image 28 and a sub-frame image 30P. Main memory 2102 comprises a relatively fast memory that includes a sub-frame generation module 2110, temporary variables 2112, original image rows 28A from original image 28, and a sub-frame image row 30P-1 from sub-frame image 30P.

Processor 2100 accesses instructions and data from main memory 2102 and memory 2106 using controller 2104. Processor 2100 executes instructions and stores data in main memory 2102 and memory 2106 using controller 2104.

Sub-frame generation module 2110 comprises instructions that are executable by processor 2100 to implement the adaptive multi-pass algorithm with history. In response to being executed by processor 2100, sub-frame generation module 2110 causes a set of original image rows 28A and a sub-frame image row 30P-1 to be copied into main memory 2102. Sub-frame generation module 2110 causes the final sub-frame pixel values to be generated for each row using the pixel values in original image rows 28A and sub-frame image row 30P-1 according to the adaptive multi-pass algorithm with history. In generating the final sub-frame pixel values, sub-frame generation module 2110 causes temporary values to be stored as temporary variables 2112. After generating the final sub-frame pixel values for a sub-frame image row, sub-frame generation module 2110 causes the row to be stored as sub-frame image 30P and causes a next row of pixel values to be read from original image 28 and stored in original image rows 28A.

In one embodiment where sub-frame generation module 2110 implements three iterations of the adaptive multi-pass algorithm with history, original image rows 28A comprises four rows of original image 28. In other embodiments, original image rows 28A comprises other numbers of rows of original image 28.

In one embodiment, sub-frame generation unit 36 generates four sub-frames from sub-frame image 30P. The four sub-frames are displayed with display device 26 using four-position processing as described above with reference to FIGS. 3A-3E.

In other embodiments, sub-frame generation unit 36 comprises an application-specific integrated circuit (ASIC) that incorporates the functions of the components shown in FIG. 29 into an integrated circuit. In these embodiments, main memory 2102 may be included in the ASIC and memory 2106 may be included in or external to the ASIC. The ASIC may comprise any combination of hardware and software or firmware components.

In other embodiments, the adaptive multi-pass algorithm with history may be used to generate two sub-frames for two-position processing. The two sub-frames are displayed with display device 26 using two-position processing as described above with reference to FIGS. 2A-2C. With two-position processing, the simulation kernel comprises a 3×3 array with the first row of values being "½", "½", "0", the second row of values being "½", "½", "0", and the third row of values being "0", "0", "0".

XII. Simplified Center Adaptive Multi-Pass with History

A simplified center adaptive multi-pass algorithm with history for generating sub-frames 30 according to one embodiment uses past errors to update estimates for sub-frame data and may provide fast convergence and low memory requirements. The simplified center adaptive multi-pass algorithm with history modifies the adaptive multi-pass algorithm with history by changing the values in the simulation kernel and omitting the error kernel in generating four sub-frames in one pass of the algorithm. The four sub-frames are displayed with display device 26 using four-position processing as described above with reference to FIGS. 3A-3E.

With reference to FIG. 27, the initial history values 2008 may be set to be equal to the corresponding pixel values from the first row of the original image or may be set to zero. The initial values in rows 2010 and 2012 may be set to zero initially or may be set to be equal to the calculated initial values from column 2016. The final sub-frame pixel value corresponding to pixel 2002 may be calculated using the history and initial values from the simplified region of influence 2006 using the following algorithm. The simplified center adaptive multi-pass algorithm with history may be implemented as follows.

First, the initial pixel values for the pixels in column 2016 are calculated. The initial pixel values may be calculated using the nearest neighbor algorithm or any other suitable algorithm.

After the initial pixel values of column 2016 are calculated, the simulated pixel values for the pixels in a column 2018 are calculated by convolving the initial pixel values with a simulation kernel. The simulation kernel comprises a 3×3 array with the first row of values being "0", "⅛", and "0", the second row of values being "⅛", "4/8", and "⅛", and the third row of values being "0", "⅛", and "0". The correction values for the pixels in column 2018 are calculated by subtracting the simulated pixel values from the original image pixel values. The adaptive pixel values for the pixels in column 2018 are calculated by multiplying the correction values by a sharpening factor, α, and adding the product to the initial values.

After the simulation values of column 2018 are calculated, the simulated pixel values for the pixels in a column 2020 are calculated by convolving the initial pixel values with the simulation kernel. The correction values for the pixels in column 2020 are calculated by subtracting the simulated pixel values from the original image pixel values. The adaptive pixel values for the pixels in column 2020 are calculated by multiplying the correction values by a sharpening factor, α, and adding the product to the initial values.

After the simulation values of column 2020 are calculated, the simulated pixel values for the pixels in a column 2022 are calculated by convolving the initial pixel values with the simulation kernel. The correction values for the pixels in column 2022 are calculated by subtracting the simulated pixel values from the original image pixel values.

The final sub-frame pixel value corresponding to pixel 2002 is calculated using the values generated by the above algorithm, the history values, and a sharpening factor, α.

Intermediate calculations used in calculating the final sub-frame pixel value corresponding to a given pixel may be re-used in calculating the final sub-frame pixel value corresponding to a pixel adjacent to the given pixel. For example, intermediate calculations used in calculating the final sub-frame pixel value for pixel 2002 may be re-used in calculating the final sub-frame pixel value of a pixel to the right of pixel 2002. As a result, certain redundant calculations may be omitted.

The sharpening factor, α, in the above algorithm may be different in calculating values of different columns using the simplified center adaptive multi-pass algorithm with history. For example, the sharpening factor, α, may be "3" for calculating the adaptive pixel values of column 2018, "1.8" for calculating the adaptive pixel values of column 2020, and "0.5" for calculating the final sub-frame pixel value corresponding to pixel 2002.

Although the above algorithm was described for three iterations of the simplified center adaptive multi-pass algorithm, the algorithm can be expanded or reduced to apply to any number of iterations by increasing or decreasing the number of columns and the number of pixels in each column used in the above algorithm in accordance with the region of influence for the number of iterations.

In one embodiment of sub-frame generation unit 36 (shown in FIG. 29), sub-frame generation module 2110 implements the simplified center adaptive multi-pass algorithm with history. In another embodiment, sub-frame generation unit 36 comprises an ASIC that implements the simplified center adaptive multi-pass algorithm with history.

XIII. Center Adaptive Kernel with History

A center adaptive multi-pass algorithm with history for generating sub-frames 30 according to one embodiment uses past errors to update estimates for sub-frame data and may provide fast convergence and low memory requirements. The center adaptive multi-pass algorithm with history generates two sub-frames in one pass of the algorithm and modifies the adaptive multi-pass algorithm with history by changing simulation and error kernels. The center adaptive multi-pass algorithm with history also generates error values associated with the row of history values used in the simplified region of influence and stores these values along with the row of history values. The two sub-frames are displayed with display device 26 using two-position processing as described above with reference to FIGS. 2A-2C.

Figure 30:
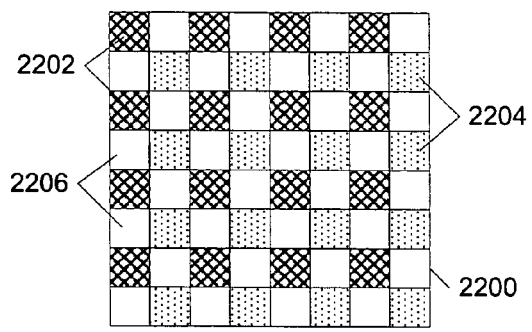
FIG. 30 is a block diagram illustrating intertwined sub-frames for two position processing.

With two-position processing, the two sub-frames may be intertwined into a single sub-frame image 2200 as illustrated in FIG. 30. Within the image 2200, a set of pixels 2202, illustrated with a first type of shading, comprises the first sub-frame, and a set of pixels 2204, illustrated with a second type of shading, comprises the second sub-frame. The remaining set of un-shaded pixels 2206 comprise zero values that represent unused sub-frames.

FIG. 31 is a block diagram illustrating pixels 2202, pixels 2204, history values 2222 (illustrated with a third type of shading), and error values 2224 (illustrated with a fourth type of shading) in a simplified region of influence 2210 of a pixel 2212 for three iterations of the center adaptive multi-pass algorithm with history where the final sub-frame pixel values are calculated in a raster pattern. The simplified region of influence 2210 comprises five rows-one row 2214 of history values and error values, one row 2216 of history values and initial values, and three rows 2218 of initial values. The simplified region of influence 2210 does not include the two rows of history and error values above row 2214 and the row of initial values below rows 2218.

The error values 2224 are each calculated using Equation XXXVI.

$$error = ((1 \times error_{left\_pixel}) + (2 \times error) + (1 \times error_{right\_pixel}))/4 \qquad \text{Equation XXXVI}$$

Because the error values 2224 are signed values that may contain more bits than a pixel value, the error values 2224 calculated using Equation XXXVI are adjusted using a mapping or a look-up table before being stored in row 2214 as shown in FIG. 31. The following pseudo code may be used to map the error values 2224 according to one embodiment.

temp=error_left+2*error+error_right; //1×2×1×
temp=temp/4; //divide by 4
if(temp <−127) temp=−127; //clip value
if(temp>127) temp=127; //clip value
temp+=127; //shift to make non-zero The initial history values 2222 may be set to be equal to the corresponding pixel values from the first row of the original image or may be set to zero. The initial error values 2224 may be set to zero. The initial values in rows 2216 and 2218 may be set to zero initially or may be set to be equal to the calculated initial values from a column 2226. The final sub-frame pixel value corresponding to pixel 2212 may be calculated using the history, error, and initial values from the simplified region of influence 2210 using the following algorithm.

First, the initial pixel values for the pixels in column 2226 of the region of influence 2210 are calculated using the original image pixel values. In one embodiment, the initial pixel values are calculated using the nearest neighbor algorithm. Other algorithms may be used in other embodiments. Next, the simulated pixel values for the pixels in column 2226 are calculated by convolving the initial pixel values with one of two simulation kernels. The first simulation kernel is used when pixel 2212 comprises a non-zero value and comprises a 3×3 array with the first row of values being "⅛", "0", and "⅛", the second row of values being "0", "4/8", and "0", and the third row of values being "⅛", "0", and "⅛". The second simulation kernel is used when pixel 2212 comprises a zero value and comprises a 3×3 array with the first row of values being "0", "2/8", and "0", the second row of values being "2/8", "0", and "2/8", and the third row of values being "0", "2/8", and "0". Error values are generated for each pixel in column 2226 by subtracting the simulated pixel values from the original image pixel values.

After the error values of column 2226 are calculated, the simulated pixel values for the pixels in a column 2228 are calculated by convolving the initial pixel values with the appropriate simulation kernel. Error values are generated for each pixel in column 2228 by subtracting the simulated pixel values from the original image pixel values. The correction values for the pixels in column 2228 are calculated by convolving the error values with an error kernel. The error kernel comprises a 3×3 array with the first row of values being "1/16", "2/16", and "1/16", the second row of values being "2/16", "4/16", and "2/16", and the third row of values being "1/16", "2/16", and "1/16". The adaptive pixel values for the pixels in column 2228 are calculated by multiplying the correction values by a sharpening factor, $\alpha$, and adding the product to the initial values.

After the adaptive pixel values of column 2228 are calculated, the simulated pixel values for the pixels in a column 2230 are calculated by convolving the initial pixel values with the appropriate simulation kernel. Error values are generated for each pixel in column 2230 by subtracting the simulated pixel values from the original image pixel values. The correction values for the pixels in column 2230 are calculated by convolving the error values with the error kernel. The adaptive pixel values for the pixels in column 2230 are calculated by multiplying the correction values by a sharpening factor, $\alpha$, and adding the product to the initial values.

After the adaptive pixel values of column 2230 are calculated, the simulated pixel values for the pixels in a column 2232 are calculated by convolving the initial pixel values with the appropriate simulation kernel. Error values are generated for each pixel in column 2232 by subtracting the simulated pixel values from the original image pixel values. The correction values for the pixels in column 2232 are calculated by convolving the error values with the error kernel.

The final sub-frame pixel value corresponding to pixel 2212 is calculated using the values generated by the above algorithm, the history values 2222, the error values 2224, and a sharpening factor, $\alpha$.

Intermediate calculations used in calculating the final sub-frame pixel value corresponding to a given pixel may be re-used in calculating the final sub-frame pixel value corresponding to a pixel adjacent to the given pixel. For example, intermediate calculations used in calculating the final sub-frame pixel value for pixel 2002 may be re-used in calculating the final sub-frame pixel value of a pixel to the right of pixel 2002. As a result, certain redundant calculations may be omitted.

The sharpening factor, $\alpha$, in the above algorithm may be different in calculating values of different columns using the center adaptive multi-pass algorithm with history. For example, the sharpening factor, $\alpha$, may be "3" for calculating the adaptive pixel values of column 2228, "1.8" for calculating the adaptive pixel values of column 2230, and "0.5" for calculating the final sub-frame pixel value corresponding to pixel 2212.

Although the above algorithm was described for three iterations of the center adaptive multi-pass algorithm, the algorithm can be expanded or reduced to apply to any number of iterations by increasing or decreasing the number of columns and the number of pixels in each column used in the above algorithm in accordance with the region of influence for the number of iterations.

Figure 32:
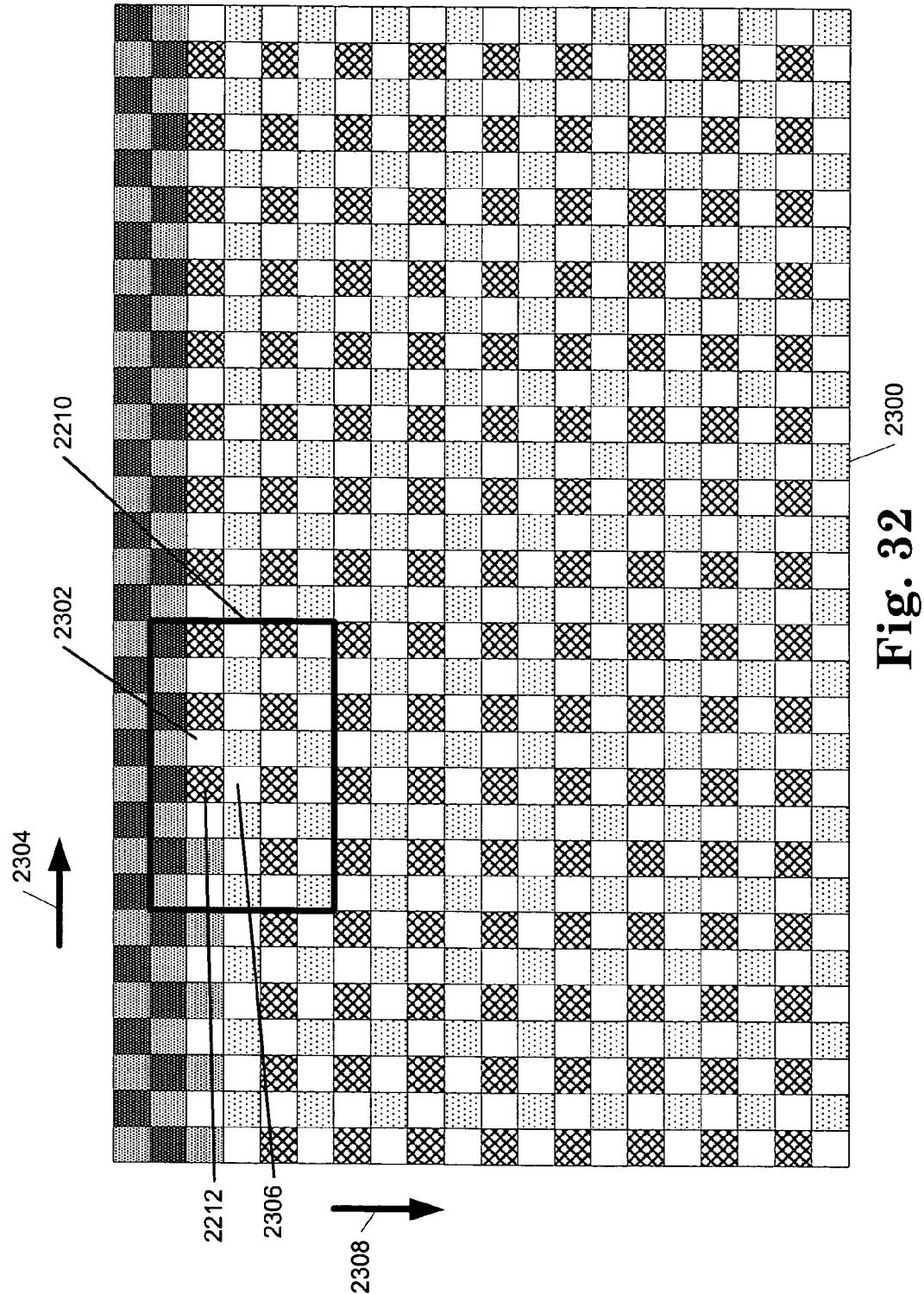
FIG. 32 is a block diagram illustrating a simplified region of influence of a pixel with respect to an image according to one embodiment of the present invention.

FIG. 32 is a block diagram illustrating the simplified region of influence 2210 of the pixel 2212 with respect to an image 2300 for three iterations of the center adaptive multi-pass algorithm with history where the final sub-frame pixel values are calculated in a raster pattern. In FIG. 32, the final sub-frame pixel value corresponding to pixel 2212 is calculated using the pixel values encompassed by the region of influence 2210 as just described in the above algorithm. To calculate the final sub-frame pixel value corresponding to a pixel 2302, the region of influence 2210 is shifted by one pixel to the right (not shown) as indicated by the arrow 2304. Similarly, the region of influence 2210 is shifted down by one pixel (not shown) as indicated by the arrow 2308 to calculate the final sub-frame pixel value corresponding to a pixel 2306.

In other embodiments, the center adaptive multi-pass algorithm with history may be used to generate four sub-frames for four-position processing. The four sub-frames are displayed with display device 26 using four-position processing as described above with reference to FIGS. 3A-3E. With four-position processing, the simulation and error kernels each comprise a 3×3 array with the first row of values being "1/16", "2/16", "1/16", the second row of values being "2/16", "4/16", "2/16", and the third row of values being "1/16", "2/16", "1/16". In addition, a row of error values separate from a row of history values is used in the algorithm described above.

In other embodiments, the error kernel of the center adaptive multi-pass algorithm with history may be omitted. In these embodiments, the row of error values is not stored as shown in FIG. 31, and the simulation kernel comprises a 3×3 array with the first row of values being "1/16", "2/16", "1/16", the second row of values being "2/16", "4/16", "2/16", and the third row of values being "1/16", "2/16", "1/16". With these modifications, the center adaptive multi-pass algorithm with history may be implemented in a manner similar to that described above for the simplified center adaptive multi-pass algorithm with history.

In one embodiment of sub-frame generation unit 36 (shown in FIG. 29), sub-frame generation module 2110 implements the center adaptive multi-pass algorithm with history. In another embodiment, sub-frame generation unit 36 comprises an ASIC that implements the center adaptive multi-pass algorithm with history.

XIV. Color Space Conversion

In the algorithms described above for generating sub-frames, such as the various adaptive multi-pass algorithms, sub-frame generation unit 36 processes initial pixel values from image 12 to generate final sub-frame pixel values for two or more sub-frames 30. Sub-frame generation unit 36 may process the initial pixel values to generate final sub-frame pixel values for each component of a color space associated with the pixel values. For example, each pixel value may comprise a red component, a green component, and a blue component in embodiments where the image comprises data in the RGB color space. Accordingly, sub-frame generation unit 36 may process the initial pixel values to generate final sub-frame pixel values for each of the red, green, and blue components of the RGB color space.

In some color spaces, certain components or color planes contain more resolution information with respect to the human eye than other components. In the RGB color space, for example, the green (or G) component contains more resolution information with respect to the human eye than the red (or R) and blue (or B) components, and the red component contains more resolution information with respect to the human eye than the blue component. In the YUV color space (also referred to as the Y'CbCr or the YPbPr color space), the difference in the amount of resolution information between the components with respect to the human eye is greater than the RGB color space. The luminance (or Y) component contains more resolution information with respect to the human eye than either of the chrominance (Cb or Cr) components.

To reduce the amount of processing performed by sub-frame generation unit 36 in generating sub-frames 30, sub-frame generation unit 36 may be configured to perform different types of processing on different components of a color space of image 12. In addition, image 12 may be converted from a first color space to a second color space prior to being provided to sub-frame generation unit 36. Further, sub-frames 30 generated by sub-frame generation unit 36 in the second color space may be converted back to the first color space prior to being displayed by display device 26.

Figure 33:
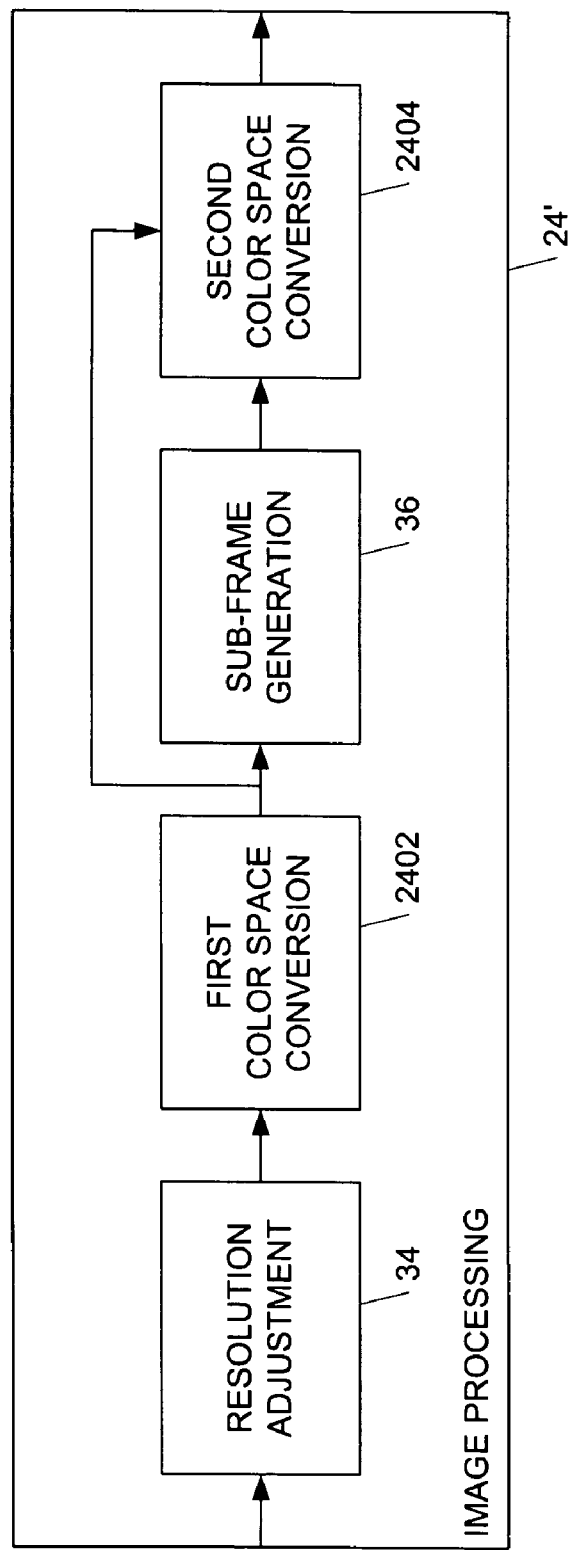
FIG. 33 is a block diagram illustrating an image processing unit according to one embodiment of the present invention.
Figure 34:
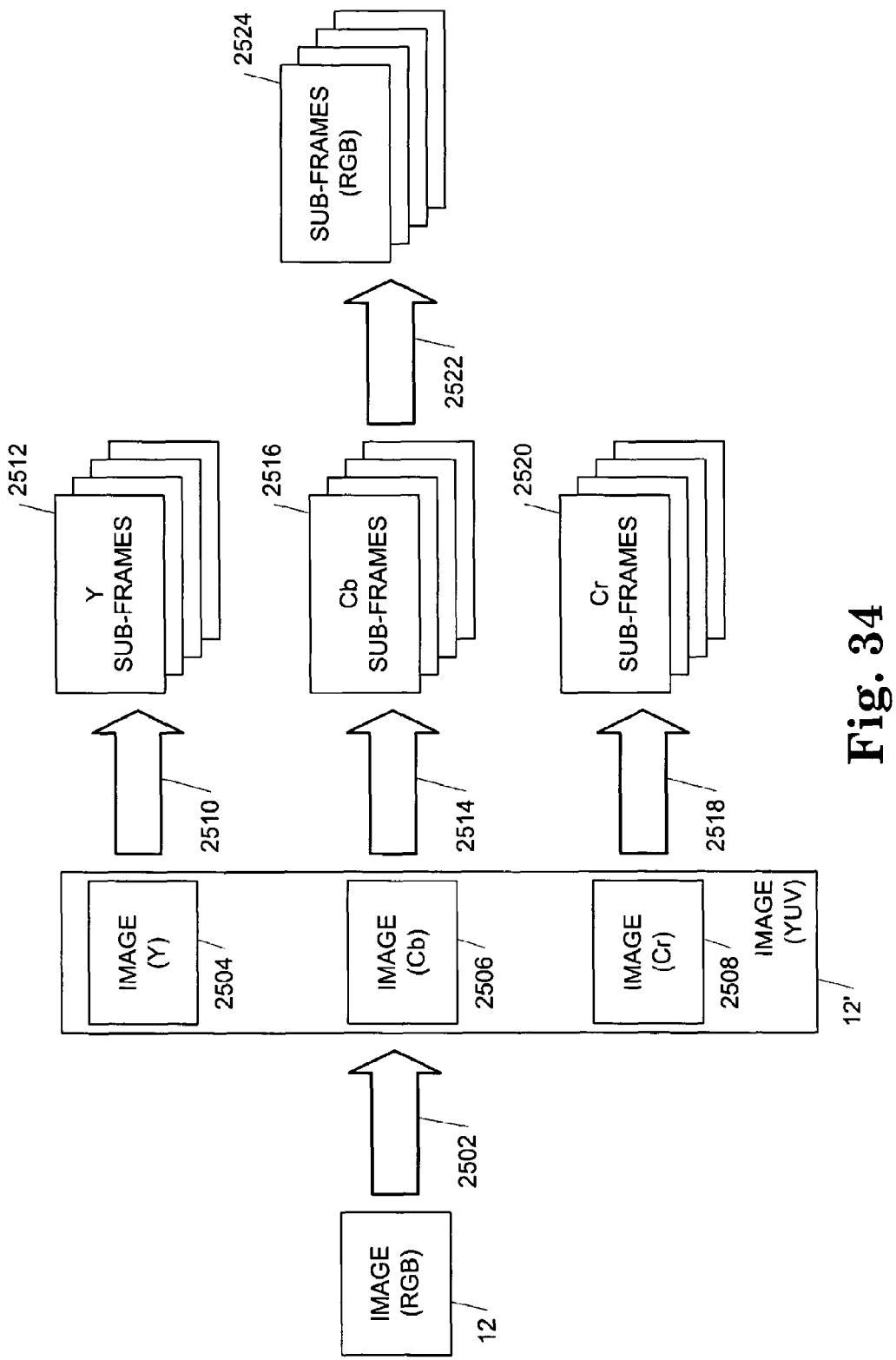
FIG. 34 is a block diagram illustrating data generated by an image processing unit according to one embodiment of the present invention.
Figure 35:
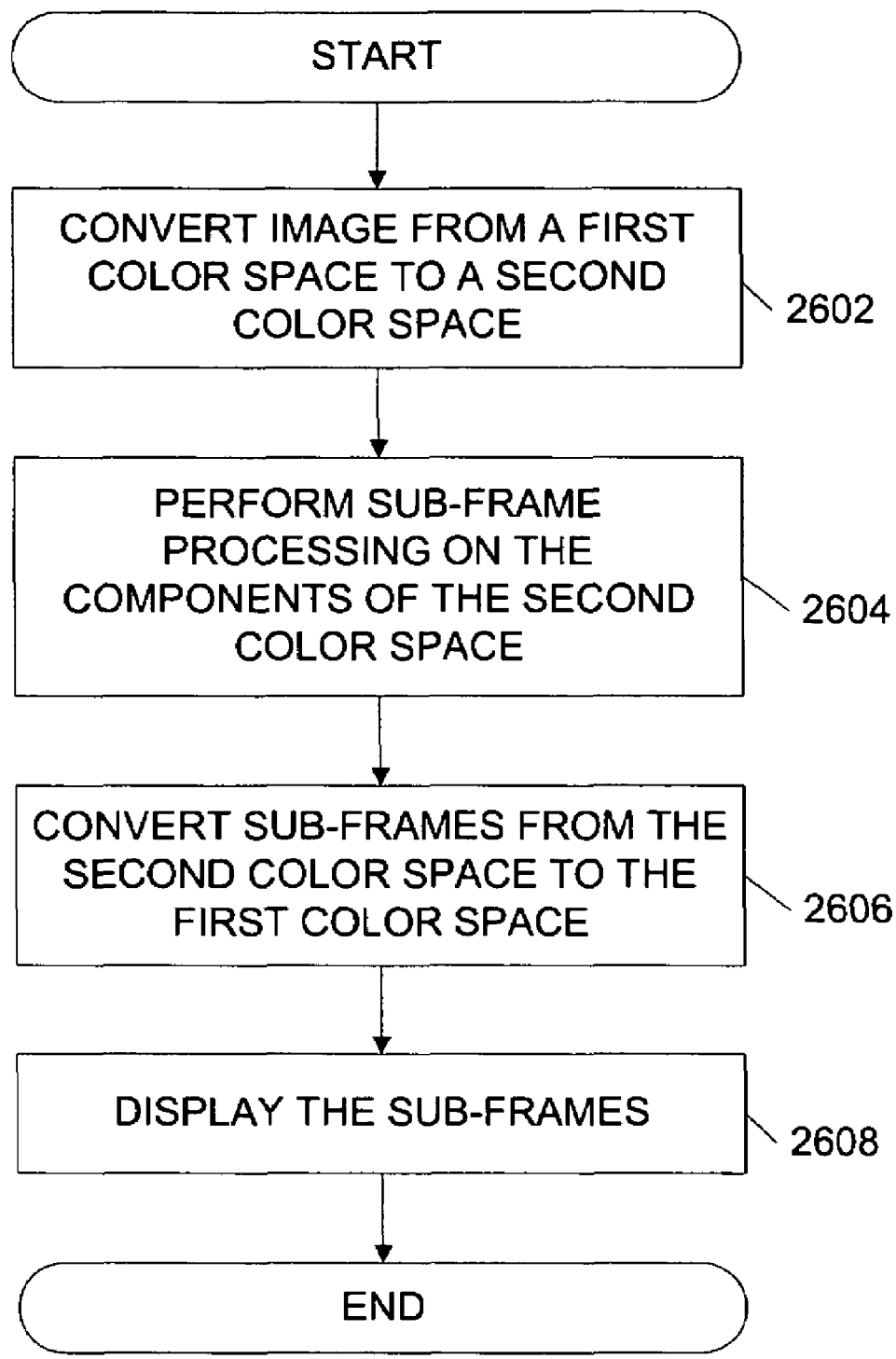
FIG. 35 is a flow chart illustrating a method for generating sub-frames according to one embodiment of the present invention.

FIG. 33 is a block diagram illustrating an image processing unit 24' according to one embodiment of the present invention. In the embodiment shown in FIG. 33, image processing unit 24' comprises a first color space conversion unit 2402 and a second color space conversion unit 2404 in addition to resolution adjustment unit 34 and sub-frame generation unit 36. FIG. 33 will be described with reference to FIGS. 34 and 35. FIG. 34 is a block diagram illustrating data generated by image processing unit 24' according to one embodiment of the present invention, and FIG. 35 is a flow chart illustrating a method for generating sub-frames 2524 according to one embodiment of the present invention.

In response to receiving image data of image 12 from resolution adjustment unit 34, first color space conversion unit 2402 converts the image data from a first color space to a second color space as indicated in a block 2602. For example, first color space conversion unit 2402 may convert the image data from image 12 from the RGB color space to image data in the YUV color space as indicated by an arrow 2502 in FIG. 34. The converted image data comprises of image 12' comprises a luminance portion 2504, a first chrominance portion (Cb) 2506, and a second chrominance portion (Cr) 2508. Luminance portion 2504 and chrominance portions 2506 and 2508 are associated with the luminance and chrominance components of the YUV color space, respectively. First color space conversion unit 2402 provides the converted image data to sub-frame generation unit 36.

In response to receiving the converted image data, sub-frame generation unit 36 performs sub-frame processing on the components of the second color space as indicated in a block 2604. Sub-frame generation unit 36 may perform different types of processing on the different components of the second color space to generate sets of sub-frames for each component. In the example shown in FIG. 34, sub-frame generation unit 36 generates four luminance sub-frames 2512 using one of the various adaptive multi-pass algorithms described above (e.g., using a simulation and/or error kernel) as indicated by an arrow 2510. Sub-frame generation unit 36 generates four chrominance sub-frames 2516 and four chrominance sub-frames 2520 using the nearest neighbor algorithm (i.e., pixel selection) described above as indicated by arrows 2514 and 2518, respectively. In other embodiments, sub-frame generation unit 36 may generate luminance sub-frames 2512, chrominance sub-frames 2516, and chrominance sub-frames 2520 using different algorithms for each set of sub-frames. In further embodiments, sub-frame generation unit 36 may generate luminance sub-frames 2512, chrominance sub-frames 2516, and chrominance sub-frames 2520 using different numbers of passes of the same algorithm for each set of sub-frames. For example, sub-frame generation unit 36 may generate luminance sub-frames 2512 using three passes of the adaptive multi-pass algorithm, and sub-frame generation unit 36 may generate chrominance sub-frames 2516 and chrominance sub-frames 2520 using one pass of the adaptive multi-pass algorithm. Sub-frame generation unit 36 provides the sets of sub-frames 2512, 2516, and 2520 to second color space conversion unit 2404.

In embodiments where the nearest neighbor algorithm is used for one or more components of a color space (e.g., the chrominance components of the YUV color space), the portion of the image data associated with the one or more components (e.g., the portion of the image data associated with chrominance components of the YUV color space) may bypass sub-frame generation unit 36 and be provided directly from first color space conversion unit 2402 to second color space conversion unit 2404. Sub-frame generation unit 36 receives the other portion or portions of the image data associated with the remaining component or components of the color space (e.g., the portion of the image data associated with luminance component of the YUV color space) and performs processing on these portions to generate sub-frames associated with these portions. These sub-frames are combined with the portions provided directly from first color space conversion unit 2402 to second color space conversion unit 2404 and converted to another color space in second color space conversion unit 2404.

In response to receiving the sets of sub-frames 2512, 2516, and 2520, second color space conversion unit 2404 converts the sets of sub-frames 2512, 2516, and 2520 from the second color space to the first color space as indicated in a block 2606. In the example shown in FIG. 34, second color space conversion unit 2404 converts the sub-frames 2512, 2516, and 2520 from the YUV color space to the RGB color space to generate sub-frames 2524 as indicated by an arrow 2522. Second color space conversion unit 2404 provides the converted sub-frames to display device 26.

In response to receiving the converted sub-frames, display device 26 displays the sub-frames as indicated by a block 2608.

By performing different types of processing on different components of a color space, the amount of processing used by sub-frame generation unit 36 to generate sub-frames for display may be reduced. In particular, less processing may be performed on the one or more components of a color space that contains less resolution information with respect to the human eye than one or more other components of the color space.

In other embodiments, first color space conversion unit 2402 and the function of block 2602 may be omitted. For example, image 12 may be provided to system 10 in the YUV color space in the embodiment shown in FIG. 34. In this example, sub-frames may be generated in the YUV color space and converted to the RGB color space for display by display device 26.

In still other embodiments, second color space conversion unit 2404 and the function of block 2606 may be omitted. For example, display device 26 may be configured to display sub-frames using the YUV color space. In this example, sub-frames generated in the YUV color space are displayed by display device 26.

In further embodiments, sub-frames 2524 may comprise two sub-frames.

Although the above examples highlighted the use of the RGB and YUV color spaces, other color spaces may be used in other embodiments.

Embodiments described herein may provide advantages over prior solutions. For example, the display of various types of graphical images including natural images and high contrast images such as business graphics may be enhanced.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of displaying an image with a display device, the method comprising:
    receiving first image data for the image with an image processing unit, the first image data associated with a first color space;
    converting the first image data to second image data associated with a second color space having a first component and a second component with the image processing unit;
    generating first and second sub-frames with the image processing unit from the first component of the second image data with a first type of image processing;
    generating third and fourth sub-frames from the second component of the second image data with a second type of image processing that differs from the first type of image processing;
    converting the first and the third sub-frames into a fifth sub-frame in the first color space with the image processing unit;
    converting the second and the fourth sub-frames into a sixth sub-frame in the first color space; and
    alternating between displaying the fifth sub-frame in a first position and displaying the sixth sub-frame in a second position spatially offset from the first position with the display device.

2. The method of claim 1 further comprising:
    generating seventh and eighth sub-frames with the image processing unit from the first component of the second image data with the first type of image processing;
    generating ninth and tenth sub-frames from the second component of the second image data with the second type of image processing;
    converting the seventh and the ninth sub-frames into an eleventh sub-frame in the first color space with the image processing unit;
    converting the eighth and the tenth sub-frames into a twelfth sub-frame in the first color space; and
    alternating between displaying the fifth sub-frame in the first position, displaying the sixth sub-frame in the second position spatially offset from the first position, displaying the eleventh sub-frame in a third position spatially offset from the first position and the second position, and displaying the twelfth sub-frame in a fourth position spatially offset from the first position, the second position, and the third position with the display device.

3. The method of claim 1 wherein the first color space comprises an RGB color space, and wherein the second color space comprises a YUV color space.

4. The method of claim 1 further comprising:
    generating the first and the second sub-frames with the image processing unit using a simulation kernel.

5. The method of claim 1 further comprising:
    generating the first and the second sub-frames with the image processing unit using an error kernel.

6. The method of claim 1 wherein the image comprises a set of image pixels, wherein the first and the second sub-frames comprise a set of sub-frame pixels, and wherein each of the set of sub-frame pixels is centered relative to a respective one of the set of image pixels.

7. The method of claim 1 wherein the first image data comprises a plurality of pixels at a first resolution, and wherein the first and the second sub-frames comprise a second plurality of pixels at a second resolution that is less than the first resolution.

8. A system for displaying an image, the system comprising:
    a buffer adapted to receive first image data for the image, the first image data associated with a first color space;
    an image processing unit configured to convert the first image data to second image data associated with a second color space with a first component and a second component, generate first and second sub-frames from the first component of the second image data with a first type of image processing, generate third and fourth sub-frames from the second component of the second image data with a second type of image processing that differs from the first type of image processing, convert the first and the third sub-frames into a fifth sub-frame in the first color space, and convert the second and the fourth sub-frames into a sixth sub-frame in the first color space; and
    a display device adapted to alternately display the fifth sub-frame in a first position and the sixth sub-frame in a second position spatially offset from the first position.

9. The system of claim 8 wherein the first component of the second image data comprises luminance data, and wherein the second component of the second image data comprises chrominance data.

10. The system of claim 8 wherein the first color space comprises an RGB color space, and wherein the second color space comprises a YUV color space.

11. The system of claim 8 wherein the image processing unit is configured to generate the first and the second sub-frames using a simulation kernel.

12. The system of claim 8 wherein the image processing unit is configured to generate the first and the second sub-frames using an error kernel.

13. A system for displaying an image, the system comprising:
    means for receiving image data corresponding to the image, the image data comprising a first portion associated with a first component of a first color space and a second portion associated with a second component of the first color space;
    means for generating first and second sub-frames from the first component of the image data with a first type of processing that includes convolving the first portion of the image data without convolving the second portion of the image data using an interpolating filter;
    means for generating third and fourth sub-frames from the second component of the image data with a second type of image processing that differs from the first type of image processing;
    means for converting the first and the third sub-frames into a fifth sub-frame in a second color space that differs from the first color space;
    converting the second and the fourth sub-frames into a sixth sub-frame in the second color space; and means for alternating between displaying the fifth sub-frame in a first position and displaying the sixth sub-frame in a second position spatially offset from the first position.

14. The system of claim 13 wherein the first color space comprises a YUV color space, wherein the first component of the first color space comprises a luminance component, and wherein the second component of the first color space comprises a chrominance component.

15. The system of claim 13 wherein the first color space comprises a YUV color space, and wherein the second color space comprises an RGB color space.

16. The system of claim 13 wherein the means for convolving the first portion of the image data further comprises means for convolving the first portion of the image data using an error filter to generate the first and the second sub-frame.

17. A computer-readable medium storing computer-executable instructions, which, when executed by a computer processing system, cause the system to perform a method of generating a sub-frame image which comprises a first plurality of sub-frames for display at spatially offset positions to generate the appearance of an image, comprising:
receiving first image data corresponding to the image, the first image data associated with a first color space;
converting the first image data to second image data associated with a second color space, the second image data comprising a first portion associated with a first component of the second color space and a second portion associated with a second component of the second color space;
generating a second plurality of sub-frames from the first component of the second image data with a first type of processing that includes convolving the first portion of the second image data without convolving the second portion of the second image data using an interpolating filter;
generating a third plurality of sub-frames from the second component of the second image data with a second type of image processing that differs from the first type of image processing;
converting a first one of the second plurality of sub-frames and a first one of the third plurality of sub-frames into a first one of the first plurality of sub-frames in the first color space; and
converting a second one of the second plurality of sub-frames and a second one of the third plurality of sub-frames into a second one of the first plurality of sub-frames in the first color space.

18. The computer-readable medium of claim 17 wherein the first color space comprises an RGB color space, wherein the second color space comprises a YUV color space, wherein the first component of the second color space comprises a luminance component, and wherein the second component of the second color space comprises a chrominance component.

19. The computer-readable medium of claim 17 storing computer-executable instructions, which, when executed by the computer processing system, cause the system to for perform the method farther comprising:
generating the second plurality of sub-frames from the first component of the second image data with the first type of processing that includes convolving the first portion of the second image data using an error filter.

20. The method of claim 1 wherein the first component of the second image data is a luminance component, and wherein the second component of the second image data is a chrominance component.

21. The method of claim 1 further comprising:
generating the first and the second sub-frames to include first and second sub-frame pixel values, respectively, and wherein the first sub-frame pixel value is calculated using the first component of the second image data and the second sub-frame pixel value with the image processing unit;
wherein a region of influence associated with the first sub-frame pixel value comprises a number of pixel values in the first component of the second image data that corresponds to a number of iterations used to generate the first and the second sub-frames.

22. The method of claim 1 further comprising:
generating the first and the second sub-frames with the image processing unit, wherein the first and the second sub-frames comprise a plurality of sub-frame pixel values and a plurality of error values, and wherein at least a first one of the plurality of sub-frame pixel values is calculated using the first component of the second image data, at least a second one of the plurality of sub-frame pixel values, and at least one of the plurality of error values;
wherein a region of influence associated with the first one of the plurality of sub-frame pixel values comprises a number of pixel values in the first component of the second image data that corresponds to a number of iterations used to generate the first and the second sub-frames.

23. The system of claim 8 wherein the image processing unit is configured to generate the first and the second sub-frames to include first and second sub-frame pixel values, respectively, and wherein the first sub-frame pixel value is calculated using the first component of the second image data and the second sub-frame pixel value, and wherein a region of influence associated with the first sub-frame pixel value comprises a number of pixel values in the first component of the second image data that corresponds to a number of iterations used to generate the first and second sub-frames.

24. The system of claim 8 wherein the first and the second sub-frames comprise a plurality of sub-frame pixel values and a plurality of error values, wherein at least a first one of the plurality of sub-frame pixel values is calculated using the first component of the second image data, at least a second one of the plurality of sub-frame pixel values, and at least one of the plurality of error values, and wherein a region of influence associated with the first one of the plurality of sub-frame pixel values comprises a number of pixel values in the first component of the second image data that corresponds to a number of iterations used to generate the first and the second sub-frames.

* * * * *

UNITED STATES PATENT AND TRADEMARK OFFICE
CERTIFICATE OF CORRECTION

PATENT NO. : 7,657,118 B2  Page 1 of 1
APPLICATION NO. : 10/864125
DATED : February 2, 2010
INVENTOR(S) : Richard E. Aufranc, Jr. et al.

It is certified that error appears in the above-identified patent and that said Letters Patent is hereby corrected as shown below:

On the Title page, in Item (75), Inventors, in column 1, line 1, delete "Richard E. Aufranc," and insert -- Richard E. Aufranc JR., --, therefor.

IN THE CLAIMS:

In column 39, line 58, in Claim 19, after "to" delete "for".

In column 39, line 59, in Claim 19, delete "farther" and insert -- further --, therefor.

Signed and Sealed this

Seventh Day of September, 2010

David J. Kappos
*Director of the United States Patent and Trademark Office*